US012121838B2

(12) United States Patent
Peterson et al.

(10) Patent No.: US 12,121,838 B2
(45) Date of Patent: *Oct. 22, 2024

(54) LOW-GRAVITY WATER CAPTURE DEVICE WITH WATER STABILIZATION

(71) Applicant: Sierra Space Corporation, Broomfield, CO (US)

(72) Inventors: Michael Peterson, Waunakee, WI (US); Mark Milton Weislogel, Newberg, OR (US); John P. Wetzel, Verona, WI (US); Daniel Aaron Wyman, Madison, WI (US)

(73) Assignee: Sierra Space Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,501

(22) Filed: Apr. 18, 2023

(65) Prior Publication Data

US 2023/0364541 A1    Nov. 16, 2023

Related U.S. Application Data

(63) Continuation of application No. 17/267,413, filed as application No. PCT/US2019/046918 on Aug. 16, 2019, now Pat. No. 11,660,557.

(Continued)

(51) Int. Cl.
*B01D 45/16* (2006.01)
*B04C 3/06* (2006.01)
(Continued)

(52) U.S. Cl.
CPC ............. *B01D 45/16* (2013.01); *B04C 3/06* (2013.01); *E03B 3/28* (2013.01); *B01D 45/02* (2013.01); *B04C 2003/006* (2013.01)

(58) Field of Classification Search
CPC ...... B01D 45/16; B01D 45/02; B01D 5/0021; B04C 3/06; B04C 2003/006; B04C 3/00; E03B 3/28; Y02A 20/00
See application file for complete search history.

(56) References Cited

U.S. PATENT DOCUMENTS 2,661,076 A    12/1953  Walker
2,664,966 A *  1/1954  Moore ..................... B04C 3/00
                                                           55/456

(Continued)

FOREIGN PATENT DOCUMENTS

GB    1 298 879 A    12/1972
JP    S58-170597 U   11/1983
(Continued)

OTHER PUBLICATIONS

Hoerr, Orbitec Water Capture Device (WCD) Parabolic Flight Test, NASA, available at https://flightopportunities.nasa.gov/technologies/167/, Dec. 8, 2016 (1 p.).

(Continued)

*Primary Examiner* — Dung H Bui
(74) *Attorney, Agent, or Firm* — Mintz Levin Cohn Ferris Glovsky and Popeo, P.C.

(57) ABSTRACT

An apparatus to separate water droplets from an air stream. The apparatus includes an elongated tube, a reservoir, and a helix structure. The elongated tube has a first end, a second end, a longitudinal axis, an inner surface, an inlet opening at the first end of the elongated tube, the inlet opening arranged to accept the air stream tangentially relative to the longitudinal axis, and an outlet opening at the second end of the elongated tube. The reservoir is positioned at a second end of the elongated tube. The helix structure is positioned within the elongated tube and includes an upper surface, a lower surface arranged opposite the upper surface, an outer edge, and a variable pitch along a length of the elongated (Continued)

tube, the variable pitch providing a variable interior angle between an inner wall of the elongated tube and the upper surface of the helix structure.

20 Claims, 38 Drawing Sheets

Related U.S. Application Data

(60) Provisional application No. 62/723,087, filed on Aug. 27, 2018.

(51) Int. Cl.
*E03B 3/28* (2006.01)
*B01D 45/02* (2006.01)
*B04C 3/00* (2006.01)

(56) References Cited

U.S. PATENT DOCUMENTS

| | | | | |
|---|---|---|---|---|
| 2,806,551 | A * | 9/1957 | Heinrich | B04C 3/04 |
| | | | | 55/340 |
| 3,199,269 | A * | 8/1965 | Oehlrich | B04C 5/12 |
| | | | | 96/372 |
| 3,232,341 | A | 2/1966 | Woodworth | |
| 3,394,533 | A * | 7/1968 | Yi | B01D 53/26 |
| | | | | 55/438 |
| 3,413,776 | A * | 12/1968 | Vytlacil | B04C 5/12 |
| | | | | 95/271 |
| 3,423,294 | A | 1/1969 | Sephton | |
| 3,667,600 | A * | 6/1972 | Oi | B04C 5/181 |
| | | | | 209/719 |
| 3,850,816 | A | 11/1974 | Koch | |
| 3,859,063 | A | 1/1975 | Porter et al. | |
| 3,885,935 | A | 5/1975 | Nutter | |
| 4,011,068 | A | 3/1977 | Llewelyn et al. | |
| 4,149,861 | A * | 4/1979 | Sogo | B01D 45/12 |
| | | | | 96/372 |
| 4,162,150 | A | 7/1979 | Carson | |
| 4,334,986 | A * | 6/1982 | Frykhult | B01D 33/727 |
| | | | | 209/250 |
| 4,481,020 | A | 11/1984 | Lee et al. | |
| 4,629,481 | A | 12/1986 | Echols | |
| 4,848,993 | A | 7/1989 | Elkjaer | |
| 4,971,603 | A | 11/1990 | Prinsloo et al. | |
| 4,976,748 | A | 12/1990 | Prinsloo et al. | |
| 5,403,367 | A | 4/1995 | De Villiers et al. | |
| 5,466,384 | A * | 11/1995 | Prevost | B01D 29/902 |
| | | | | 210/512.3 |
| 5,472,463 | A | 12/1995 | Herman et al. | |
| 5,518,695 | A | 5/1996 | Goodspeed et al. | |
| 5,526,684 | A | 6/1996 | Liu et al. | |
| 5,957,672 | A | 9/1999 | Aber | |
| 6,036,749 | A | 3/2000 | Ribeiro et al. | |
| 6,138,757 | A * | 10/2000 | Latos | E21B 21/14 |
| | | | | 166/265 |
| 6,254,359 | B1 | 7/2001 | Aber | |
| 6,332,239 | B1 * | 12/2001 | Dubos | A47L 9/104 |
| | | | | 15/327.2 |
| 6,540,802 | B2 | 4/2003 | Trautmann et al. | |
| 6,619,054 | B1 | 9/2003 | Cargnelli et al. | |
| 6,827,862 | B1 | 12/2004 | Brockhoff et al. | |
| 7,001,448 | B1 | 2/2006 | West | |
| 7,266,958 | B2 | 9/2007 | Milde et al. | |
| 7,311,744 | B2 * | 12/2007 | Elliott | B23Q 11/10 |
| | | | | 55/423 |
| 7,931,719 | B2 | 4/2011 | Sams et al. | |
| 8,425,641 | B2 | 4/2013 | Chaudhari et al. | |
| 9,416,026 | B2 | 8/2016 | Californiaa | |
| 2003/0000186 | A1 | 1/2003 | West | |
| 2005/0044825 | A1 | 3/2005 | Bazzarella et al. | |
| 2009/0139938 | A1 | 6/2009 | Larnholm et al. | |
| 2009/0242490 | A1 | 10/2009 | Hopper | |
| 2009/0301699 | A1 | 12/2009 | Karrs et al. | |
| 2009/0314161 | A1 | 12/2009 | Al-Alusi et al. | |
| 2010/0205949 | A1 * | 8/2010 | Bolda | F02M 35/10222 |
| | | | | 60/309 |
| 2010/0255738 | A1 | 10/2010 | Woods | |
| 2011/0011796 | A1 | 1/2011 | Nickson | |
| 2012/0000168 | A1 * | 1/2012 | Chaudhari | B04C 3/06 |
| | | | | 55/319 |
| 2012/0180662 | A1 | 7/2012 | Missalla et al. | |
| 2015/0075124 | A1 | 3/2015 | Guerry et al. | |
| 2015/0265960 | A1 | 9/2015 | Girondi | |
| 2016/0123227 | A1 * | 5/2016 | Murray | B01D 45/16 |
| | | | | 55/339 |
| 2016/0177893 | A1 | 6/2016 | Finn et al. | |
| 2018/0133634 | A1 * | 5/2018 | Zager | F25B 9/004 |
| 2018/0266371 | A1 | 9/2018 | Rotter | |
| 2018/0303135 | A1 * | 10/2018 | Tribelsky | B01D 21/283 |
| 2018/0361289 | A1 * | 12/2018 | Suzuki | F02M 26/35 |
| 2018/0361290 | A1 | 12/2018 | Suzuki et al. | |
| 2019/0015772 | A1 | 1/2019 | Duennwald et al. | |
| 2020/0147535 | A1 | 5/2020 | Hoerr et al. | |

FOREIGN PATENT DOCUMENTS

| | | | | |
|---|---|---|---|---|
| JP | WO2017104532 A1 * | 6/2017 | | B04C 3/06 |
| WO | WO-2017/104531 A1 | 6/2017 | | |
| WO | WO-2018/144499 A1 | 8/2018 | | |

OTHER PUBLICATIONS

International Search Report and International Preliminary Report on Patentability from Int'l Pat. App. No. PCT/US2018/016076, Mar. 28, 2018 (9 pp.).

International Search Report issued in PCT/US19/46918 on Dec. 23, 2019, 4 pgs.

Weislogel, et al., "A Novel Device Addressing Design Challenges for Passive Fluid Phase Separations Aboard Spacecraft," Microgravity Science and Technology, vol. 21, Aug. 6, 2008, pp. 257-268 (13 pp.).

Written Opinion issued in PCT/US19/46918 on Dec. 23, 2019, 10 pgs.

* cited by examiner

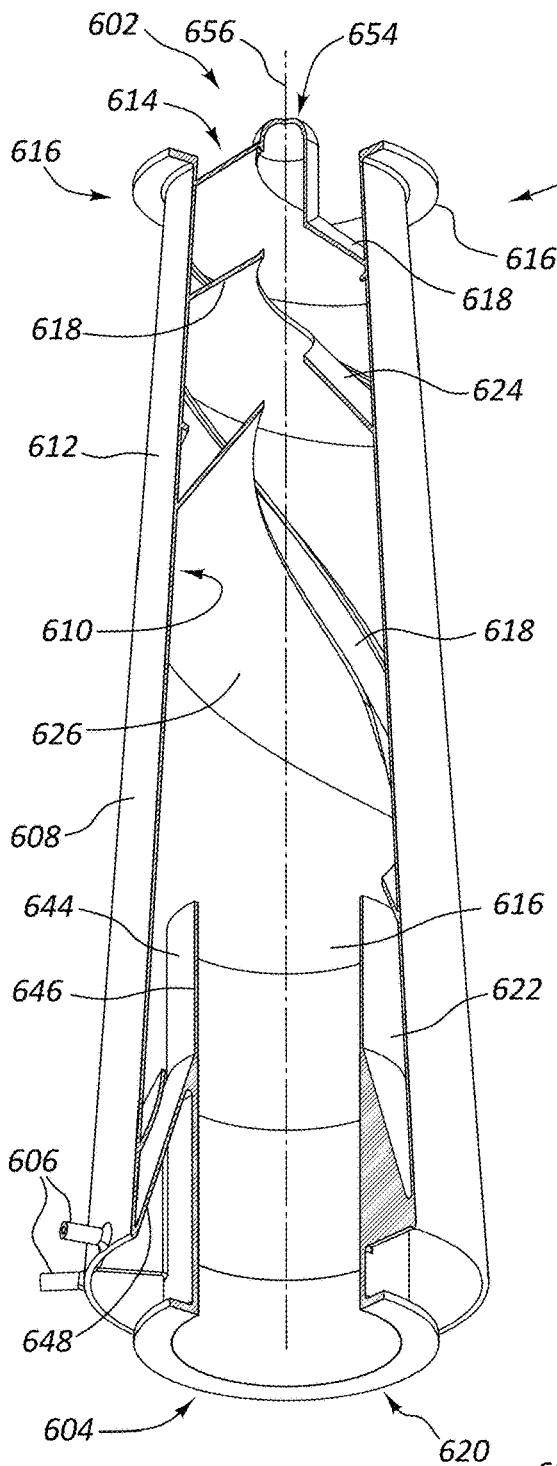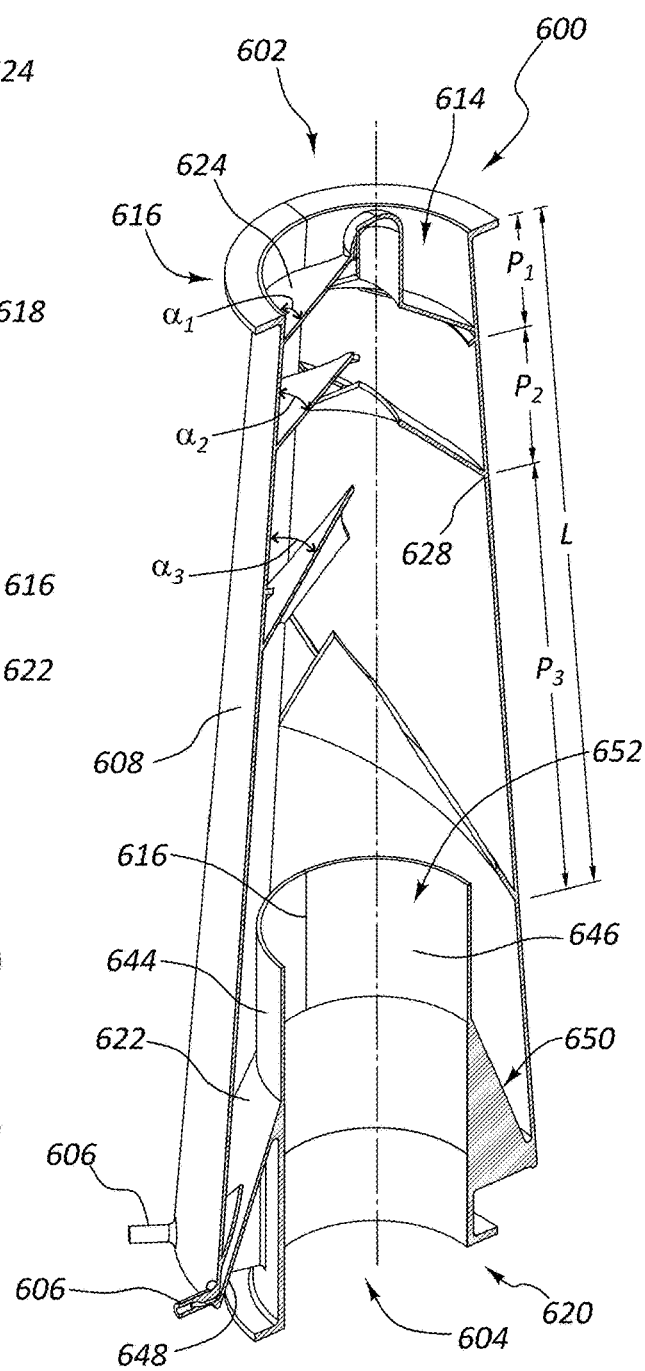
FIG. 9A
FIG. 9B

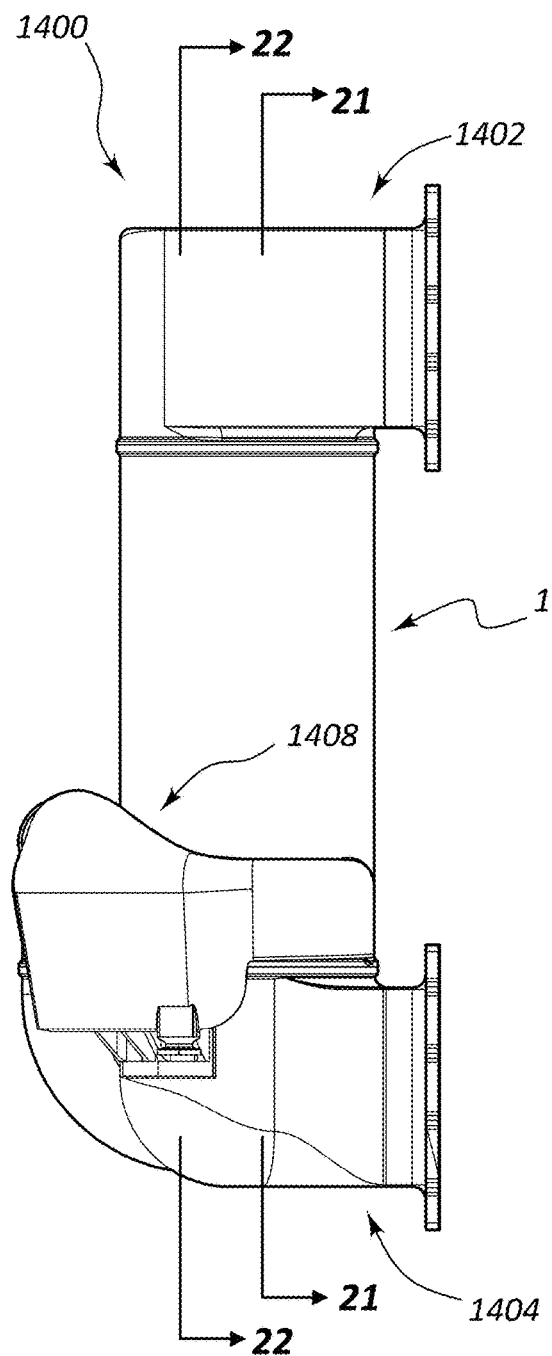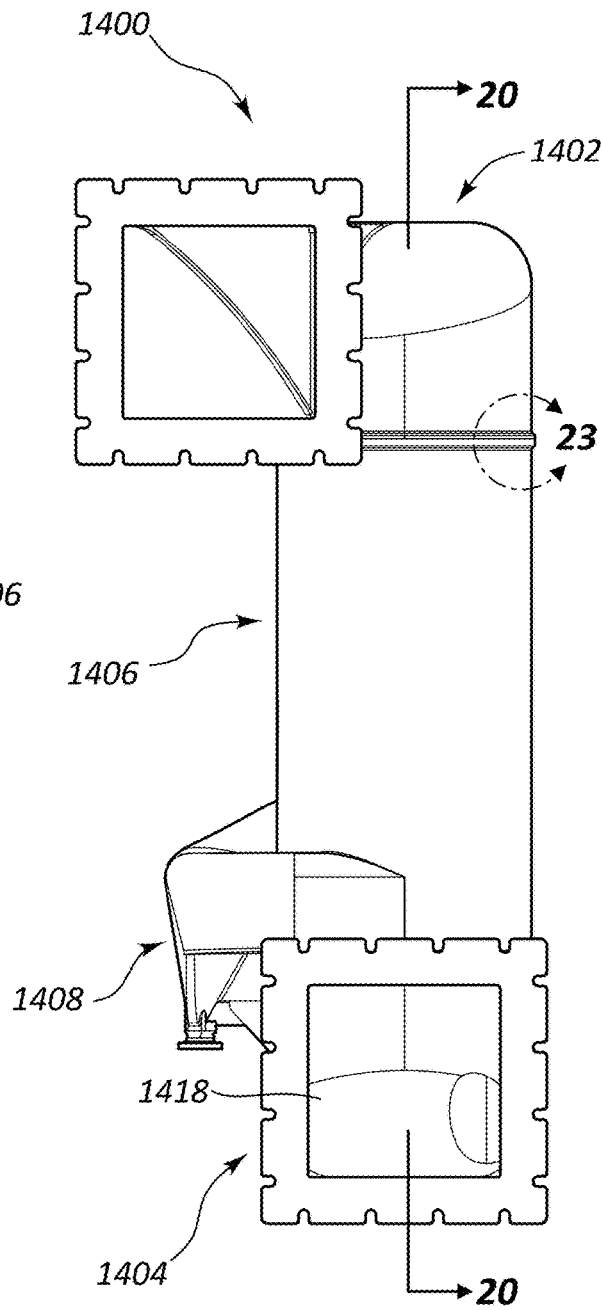
FIG. 18
FIG. 17

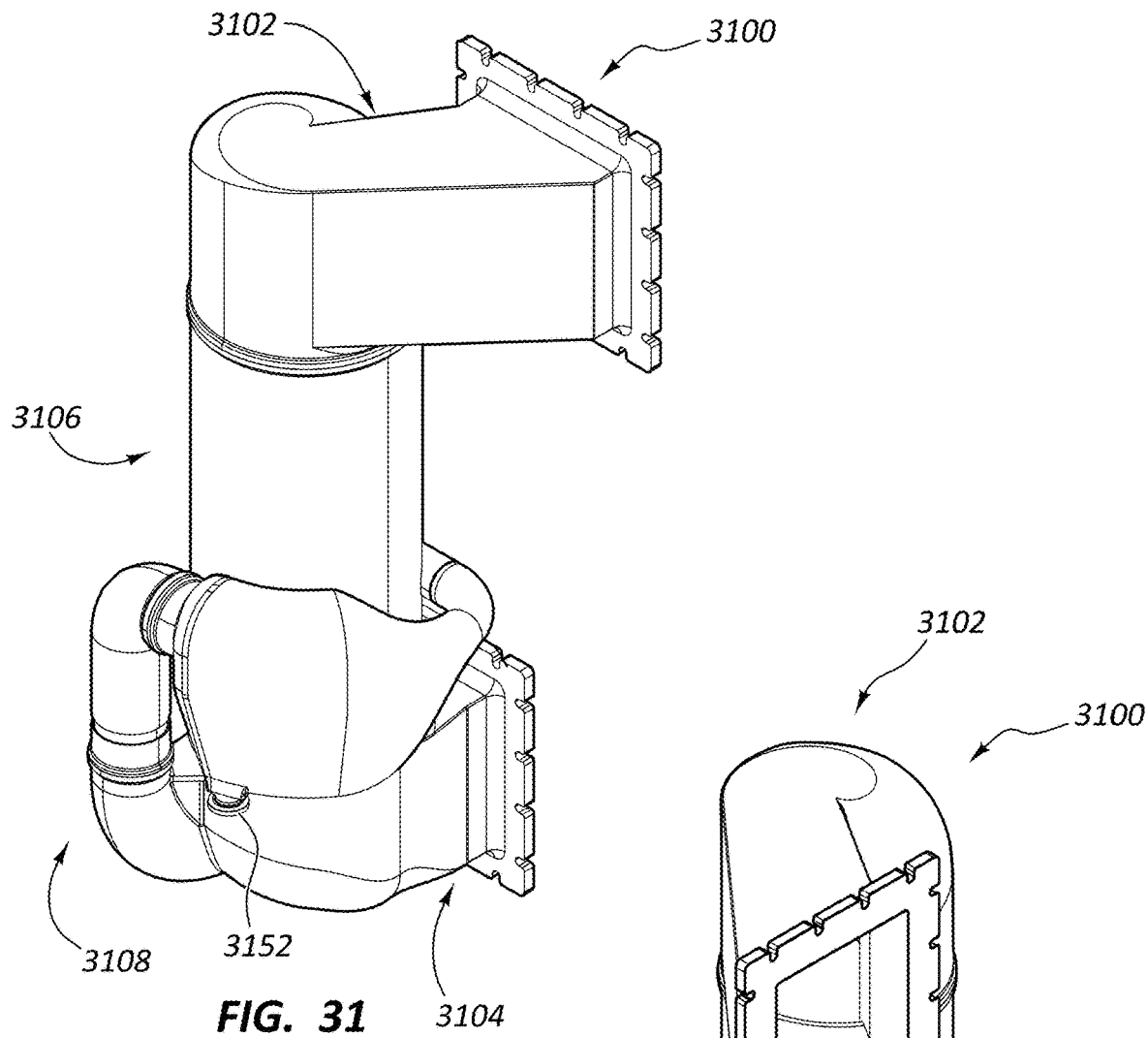
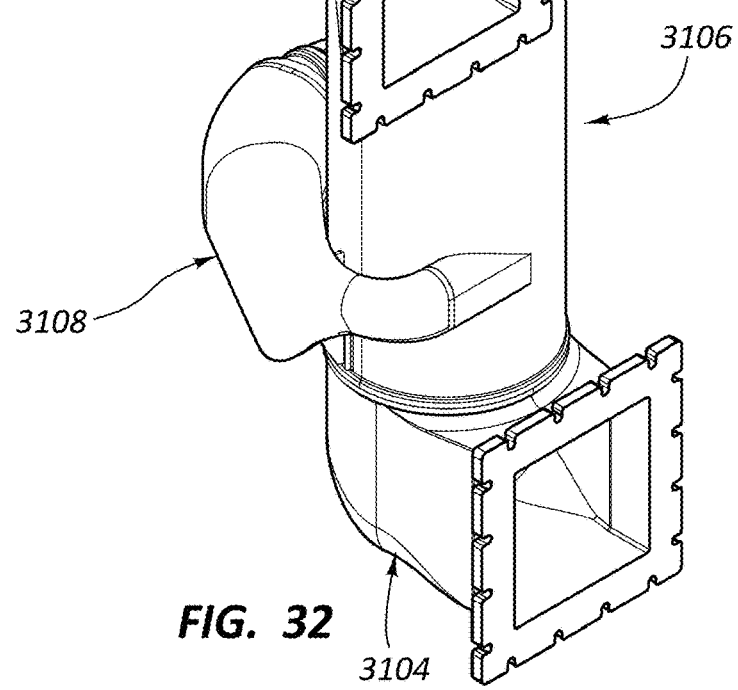

LOW-GRAVITY WATER CAPTURE DEVICE WITH WATER STABILIZATION

CROSS REFERENCE TO RELATED APPLICATIONS

This application is a continuation of U.S. patent application Ser. No. 17/267,413, filed Feb. 9, 2021, which is a U.S. National Stage Application of PCT International Application No. PCT/US2019/046918, filed Aug. 16, 2019, which claims priority to U.S. Provisional Patent Application Ser. No. 62/723,087, filed Aug. 27, 2018, the entire disclosures of which are incorporated herein by their reference.

TECHNICAL FIELD

The present disclosure relates generally to water capturing devices, and more particularly to water capturing devices in low-gravity environments.

BACKGROUND

Water is not readily available in space. Since the beginning of space travel, there has been a need for smart consumption and recycling and reusing of water. In addition, space environments offer unique challenges of power usage and the space available for these recycling systems. Power must be smartly consumed to power the space environments and ensure power consumption for those environments. Systems and electronics on those space environments may necessitate efficient power consumption and engineering specific to conserve power and consume very little space. Therefore, there is a need for a low-power, low-mass liquid collection apparatus.

An example of collecting water in space is disclosed in U.S. Pat. No. 9,416,026 to Eurica, California. The '026 patent discloses coating a surface of a spaceship with a drying agent to capture ambient water moisture from space as it impinges on the spaceship. The '026 patent focuses on the external collection of water in space versus the recycling and reusing of water internal to a space vehicle.

SUMMARY

In one embodiment, a method of separating water droplets from a stream of water laden air is described. The water laden air stream may be collected into a semi-closed environment. The water laden air stream is forced into a helical-shaped channel to create a turbulent, rapid circumferential flow of air. The helical-shaped channel has a variable pitch along its length. The water droplets are separated from the air stream within the helical-shaped channel. A rivulet is formed with the separated water droplets. A speed of the air stream is reduced after the water droplets have been separated. The turbulent, rapid circumferential flow of air is transitioned into a less rapid axial flow. The water droplets from the rivulet flow are collected into a reservoir.

In some embodiments, separating water droplets from the air stream may include contacting the air stream against one or more surfaces of the helical-shaped channel. In alternative embodiments, forming the rivulet may include collecting the separated water droplets from the one or more surfaces of the helical-shaped channel. In some instances, the water droplets within the single rivulet flow may be stabilized using the flow of the air stream. The separated water droplets may be guided towards the rivulet with one or more secondary vanes. In some embodiments, forming the rivulet may further include forming a wind-driven cross-axial air stream. In some embodiments, the wind-driven cross-axial rivulet flow may be converted into a streamwise flow aligned with the rivulet. Collecting the water droplets from the rivulet flow into a reservoir may include guiding a flow of the rivulet into the reservoir.

In another embodiment, an apparatus to separate water droplets from an air stream is described. The apparatus includes an elongated tube having a first end and a second end. The elongated tube includes an opening at a first end of the elongated tube, the opening is positioned to accept the air stream. A reservoir is positioned at a second end of the elongated tube. A helix structure is positioned within the elongated tube. The helix structure includes an upper surface, a lower surface arranged opposite the upper surface, an outer edge, and a variable pitch along a length of the elongated tube. The variable pitch provides a variable interior angle between an inner wall of the elongated tube and the upper surface of the helix structure.

In further embodiments, the helix structure may include an initial helical pitch at the first end of the elongated tube. The initial helical pitch may initiate turbulence in an air stream entering the opening. The helix structure may include a transitional pitch that may initiate water droplets in the air stream to separate from the air stream and a final pitch that may induce a lower velocity flow in the air stream from which the water droplets have been separated. In some embodiments, the apparatus may include an initial interior angle between the inner wall of the elongated tube and the upper surface of the helix structure at a first location which may force water droplets into a single rivulet using capillary forces. A transitional interior angle may be between the inner wall of the elongated tube and the upper surface of the helix structure at a second location providing a decreasing potential in the water droplets in a direction of the reservoir. A final interior angle may be between the inner wall of the elongated tube and the upper surface of the helix structure at a third location to transition from the single rivulet flow into the reservoir.

In some embodiments, an air exit may be positioned at the second end of the elongated tube. The air exit may be formed as a hollow cylinder. A vane may bisect the reservoir. The vane may be positioned to retain water droplets in the reservoir while allowing the air stream to exit the apparatus through the air exit. In some embodiments, the apparatus may include a drain access to the reservoir. In some embodiments, the upper surface of the helix structure is smooth and continuous. In some instances, one or more secondary vanes may be positioned on the inner wall of the elongated tube. The one or more secondary vanes may mimic a pitch angle of the helix structure.

In some instances, one or more vanes may be positioned on the upper surface of the helix structure. The one or more vanes may begin near a center point of the helix and may extend towards the outer edge of the helix structure. The helix structure may include a length over diameter ratio of less than four. In some embodiments, the pitch angle may continuously increase along the length of the helix structure. In some embodiments, the interior angle between an inner wall of the elongated tube and the upper surface of the helix structure may continuously decrease along the length of the helix structure.

In a further embodiment, an apparatus to separate water droplets from an air stream is disclosed. The apparatus includes an elongated housing having a first end and a second end, an inlet opening at a first end of the housing, the inlet opening positioned to accept the air stream, a reservoir positioned at a second end of the elongated tube, and a helix structure positioned within the elongated tube. The helix structure includes an upper surface, a variable pitch along a length of the housing, the variable pitch providing a variable interior angle between an inner wall of the elongated tube and the upper surface of the helix structure, an initial helical pitch at the first end of the elongated tube, the initial helical pitch initiating turbulence in the air stream entering the opening, and a transitional pitch that initiates water droplets in the air stream to separate from the air stream.

In some embodiments, the helix structure further includes a final pitch that slows the air stream from which the water droplets have been separated.

Another embodiment is directed to an apparatus to separate water droplets from an air stream. The apparatus includes an elongated tube, a reservoir, and a helix structure. The elongated tube has a first end, a second end, a longitudinal axis, an inner surface, an inlet opening at the first end of the elongated tube, the inlet opening arranged to accept the air stream tangentially relative to the longitudinal axis, and an outlet opening at the second end of the elongated tube. The reservoir is positioned at a second end of the elongated tube. The helix structure is positioned within the elongated tube and includes an upper surface, a lower surface arranged opposite the upper surface, an outer edge, and a variable pitch along a length of the elongated tube, the variable pitch providing a variable interior angle between an inner wall of the elongated tube and the upper surface of the helix structure.

The apparatus may also include an inner hollow cylinder positioned at the second end of the elongated tube and arranged coaxially with the longitudinal axis, the inner hollow cylinder defining a first air flow path, the reservoir being defined at least in part between an exterior surface of the hollow inner tube and the inner surface of the elongated tube, and the reservoir defining a second air flow path. The reservoir may include a reservoir chamber positioned external the elongated tube. The helix structure may terminate in the reservoir chamber. The apparatus may include a plurality of vanes positioned in the reservoir to direct water droplets collected on surfaces of the helix structure and inner wall of the elongated tube into a base of the reservoir chamber. The apparatus may include a water outlet opening formed in the base of the reservoir chamber. The apparatus may include at least one via formed in each of the plurality of vanes and the helix structure along the base of the reservoir, and the vias in adjacent vanes and the helix structure may be offset from each other.

The reservoir chamber may include an inlet portion having a first cross-sectional area, and a collection portion having a second cross-sectional area that is greater than the first cross-sectional area. The inlet portion of the reservoir chamber may provide a tangential flow path out of the elongated tube. The second air flow path may include an air flow orifice, the airflow orifice being sized to control a volume of air flow through the second air flow path. The first and second air flow paths may combine downstream of the inner hollow cylinder and before exiting the outlet opening of the elongated tube. The inner hollow cylinder may include an inlet opening, an outlet opening, an exterior surface, and a lip extending radially outward from the exterior surface. The apparatus may include an inner cylinder support configured to support the inner hollow cylinder within the elongated tube spaced away from the inner surface of the elongated tube, and the inner cylinder support may have a helical shape and define a surface of the reservoir. The elongated tube may include an inlet structure defining the inlet opening, an outlet structure defining the outlet opening, and a mid-section extending between the inlet and outlet structures, and interfaces between the inlet structure and the mid-section and between the outlet structure and the mid-section may include contoured surfaces. The contoured surfaces may include at least one of concave surfaces and convex surfaces that define spherical joints. The second air flow path may include a return tube positioned external of the elongated tube, the return tube including at least first and second tube segments, and the first and second tube segments may be connected with a slip joint. At least one of the first and second tube segments may have an elbow shape.

Another embodiment relates to an apparatus to separate water droplets from an air stream. The apparatus includes an elongated housing having a first end, a second end and in inner surface, an inlet structure positioned at the first end and defining an inlet opening configured to accept the air stream, an outlet structure positioned at the second end and defining an outlet opening, a reservoir positioned at a second end of the elongated housing, the reservoir configured to collect water, a helix structure positioned within the elongated housing, a first air flow path coupled in flow communication with the outlet opening, and a second air flow path separate from the first flow path and coupled in flow communication with the outlet opening, the second air flow path defined in part by the reservoir.

The reservoir may include a reservoir chamber, the reservoir chamber may be positioned outside of the elongated tube, and the reservoir chamber may define a portion of the second air flow path. The helix structure may include an upper surface, a variable pitch along a length of the housing, the variable pitch providing a variable interior angle between an inner wall of the housing and the upper surface of the helix structure, an initial helical pitch at the first end of the housing, the initial helical pitch initiating turbulence in the air stream entering the inlet opening, and a transitional pitch that initiates water droplets in the air stream to separate from the air stream.

A further embodiment is directed to a method of assembling a water capture device. The method includes providing a water capture device having an elongated tube, an inlet structure positioned at a first end of the elongated tube and defining an inlet opening configured to receive a stream of water laden air into the water capture device, an outlet structure positioned at a second end of the elongated tube and defining an outlet opening, a helical structure positioned internal the elongated tube, and a reservoir configured to collect water that has been separated from the stream of water laden air within the elongated tube. The method also includes securing the inlet structure to the elongated tube at a first joint, and securing the outlet structure to the elongated tube at a second joint, the first and second joints each having at least one contoured surface.

The method may further include forming the elongated tube, the inlet structure and the outlet structure using 3D printing. At least one contoured surface may be formed as a spherical, a hemispherical, or an arch shaped surface. The water capture device may further include first and second air flow paths coupled in flow communication with the outlet opening, the second air flow path being defined at least in part by first and second tube segments, the method may include securing the first and second tube segments together with a slip joint. The water capture device may further include at least one vane positioned in the reservoir, and the first and second tube segments are adjustable relative to each other and relative to the elongated tube to align the at least one vane with the helical structure. The water capture device may further include first and second air flow paths coupled in flow communication with the outlet opening, the second air flow path including an orifice, and the method may include adjusting a size of the orifice to control a rate of air flow through the second air flow path. The first and second joints may be formed in part by applying uncured base material resin to the contoured surfaces, and then curing the resin.

A method of separating water from a stream of water laden air is also disclosed. The method includes delivering the stream of water laden air into a helical-shaped channel of a water capture device, the helical-shaped channel having a variable pitch along its length, separating water from the air flow within the helical-shaped channel, collecting the water into a reservoir, the reservoir including a plurality of vanes, dividing the air flow into a first air stream and a second air stream, the second air stream passing through the reservoir, combining the first and second air streams after the second air stream has passed through the reservoir, passing the combined air stream out of the water capture device, and removing the water from the reservoir.

Separating water droplets from the air flow may include contacting the air flow against one or more surfaces of the helical-shaped channel, and the method may further include collecting the separated water droplets from the one or more surfaces of the helical-shaped channel in the reservoir. The method may include stabilizing the water within the reservoir using the second air stream. The water capture device may include a helical structure that defines in part the helical-shaped channel, and the helical structure may extend continuously into the reservoir. The water capture device may include an elongated tube housing the helical-shaped channel, and a portion of the reservoir may extend outside of the elongated tube, the portion of the reservoir defining an air channel through which the second air stream passes out of the elongated tube at a tangential angle. Delivering the stream of water laden air into the helical-shaped channel may include delivering the stream of water laden air at a tangential angle relative to a longitudinal axis of the water capture device.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 9A is a cut-away view of the low-gravity water capture device of FIG. 8 taken along lines 9A-9A;

FIG. 9B is a cut-away view of the low-gravity water capture device of FIG. 6 taken along lines 9B-9B;

FIG. 17 is a front view of the low-gravity water capture device of FIG. 14;

FIG. 18 is a side view of the low-gravity water capture device of FIG. 14;

FIG. 31 is a perspective view of another exemplary low-gravity water capture device in accordance with the present disclosure;

FIG. 32 is another top perspective view of the low-gravity water capture device of FIG. 31;

Figure 1:
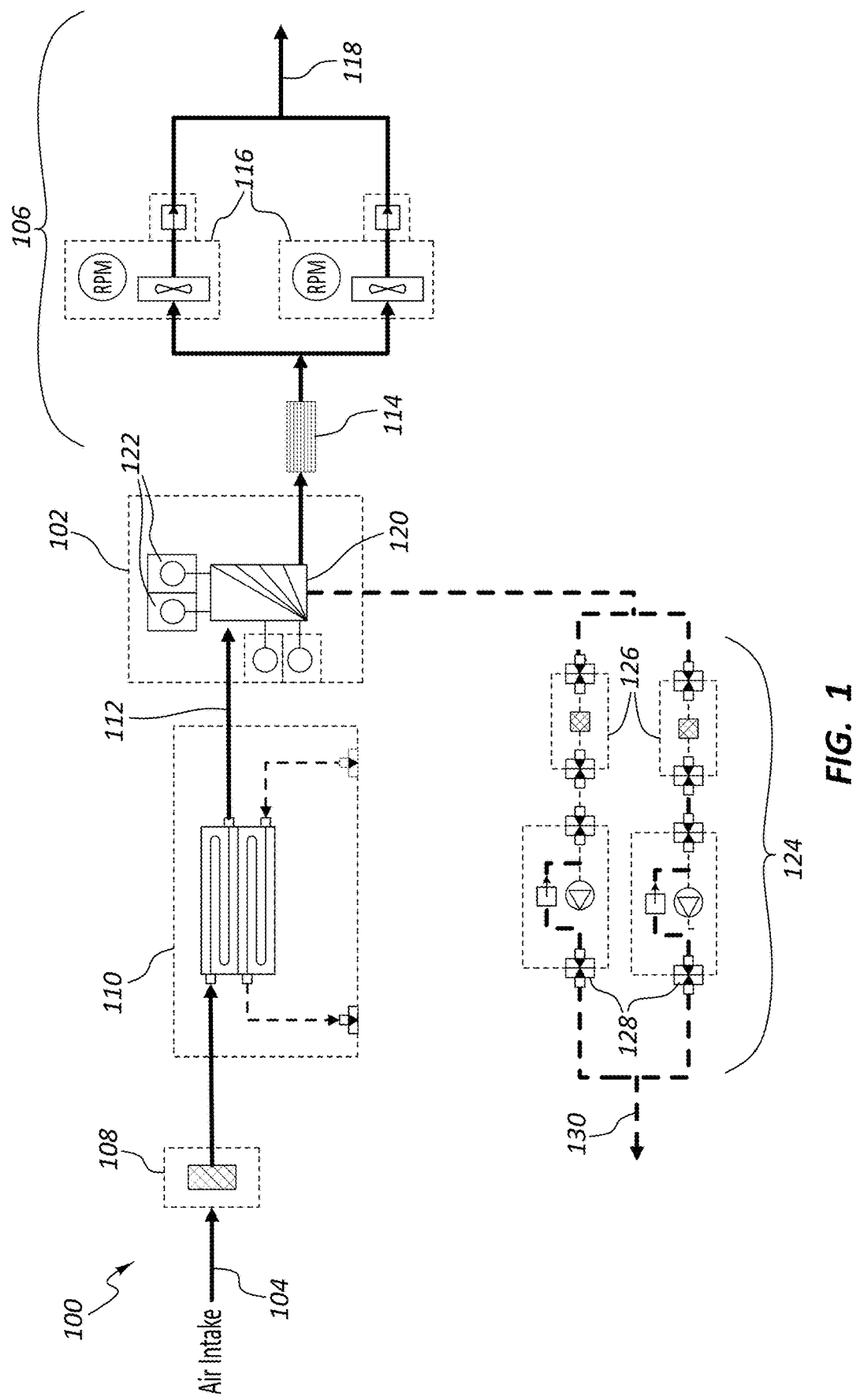
FIG. 1 illustrates an example of an environment of a low-gravity water capture device in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Water is a scarce resource in outer space. It is not readily available and must be mined from extraterrestrial resources if it is to be collected at all in outer space, which is a currently developing technology. Therefore, all water used in spacecraft is carried from earth. As such, the preservation, recycling, and reusing of water in extraterrestrial living systems may reduce the amount of water initially needed at the onset of an extraterrestrial mission. Water may be harvested and recycled from unlikely sources. However, power is also a scarce resource in space and must be used wisely. Therefore, a solution is needed to harvest water from on board resources using as little power as possible. The solution though, must also be lightweight and relatively small as to not encumber the mission or add unnecessary extra weight to the space vessel.

FIG. 1 illustrates an example of a potential system 100 which may utilize a low-gravity water separator 102. The system 100 may include the low-gravity water separator 102, an air intake 104, and an air output system 106. The air intake 104 may be cabin air intake. The air intake 104 may pass air through a filter 108, such as a HEPA filter or the like. After air passes through the filter 108, air may enter a temperature and humidity control device 110. The temperature and humidity control device 110 may include a multitude of devices including a heat exchanger. The temperature and humidity control device 110 may emit an air stream laden with water droplets along path 112. In some embodiments, the temperature and humidity control device 110 may output water laden air using a fan or other device to generate a force on the air. In some embodiments, gravity may alternatively and/or additionally act on the water laden air. The water laden air may enter the low-gravity water separator 102. The low-gravity water separator 102 may separate the water droplets from the air stream. The low-gravity water separator 102 may then discharge air free of water droplets into the air output system 106. In some embodiments, the air output system 106 may include an evaporator 114 and one or more fans 116 to circulate the air and/or pull the air from the water separator 102. In some embodiments, the air output system 106 may output air to a ducting and ventilation system (not shown) along path 118.

The low-gravity water separator 102 may additionally incorporate a water-output device 120 which may enable water to be discharged from the low-gravity water separator 102. The water-output device 120 may incorporate and/or communicate with one or more sensors 122 which may enable the water-output device 120 to automatically pull water from the low-gravity water separator 102. The water-output device 120 may discharge water to a liquid-output system 124. The liquid-output system 124 may include one or more pumps and one or more filters. The liquid-output system 124 may discharge water to a liquid processing system (not shown) along path 130.

Figure 2:
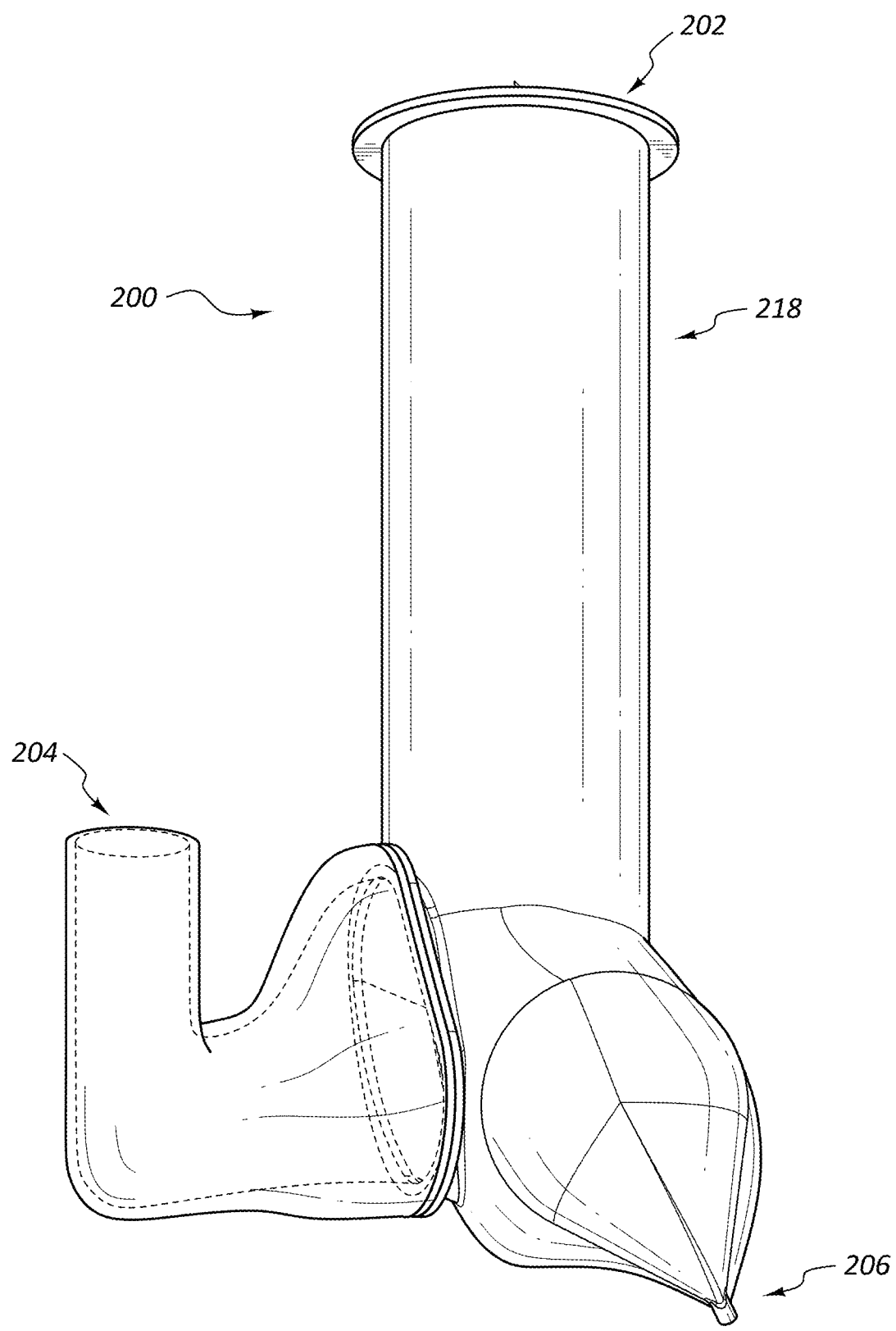
FIG. 2 is a perspective view of an exemplary low-gravity water capture device.

FIG. 2 is a perspective view of an exemplary low-gravity water separator 200. The low-gravity water separator 200 may be an example of the low-gravity water separator 102 described with reference to FIG. 1. The low-gravity water separator 200 may include an air inlet 202, an air outlet 204, and a water discharge 206. In some embodiments, the air outlet 204 may be cylindrical-shaped and create a sort of chimney for air free of water droplets to be discharged. The air outlet 204 may enable air to be discharged from the low-gravity water separator 200. The air outlet 204 may be oriented in any desired direction.

Figure 3:
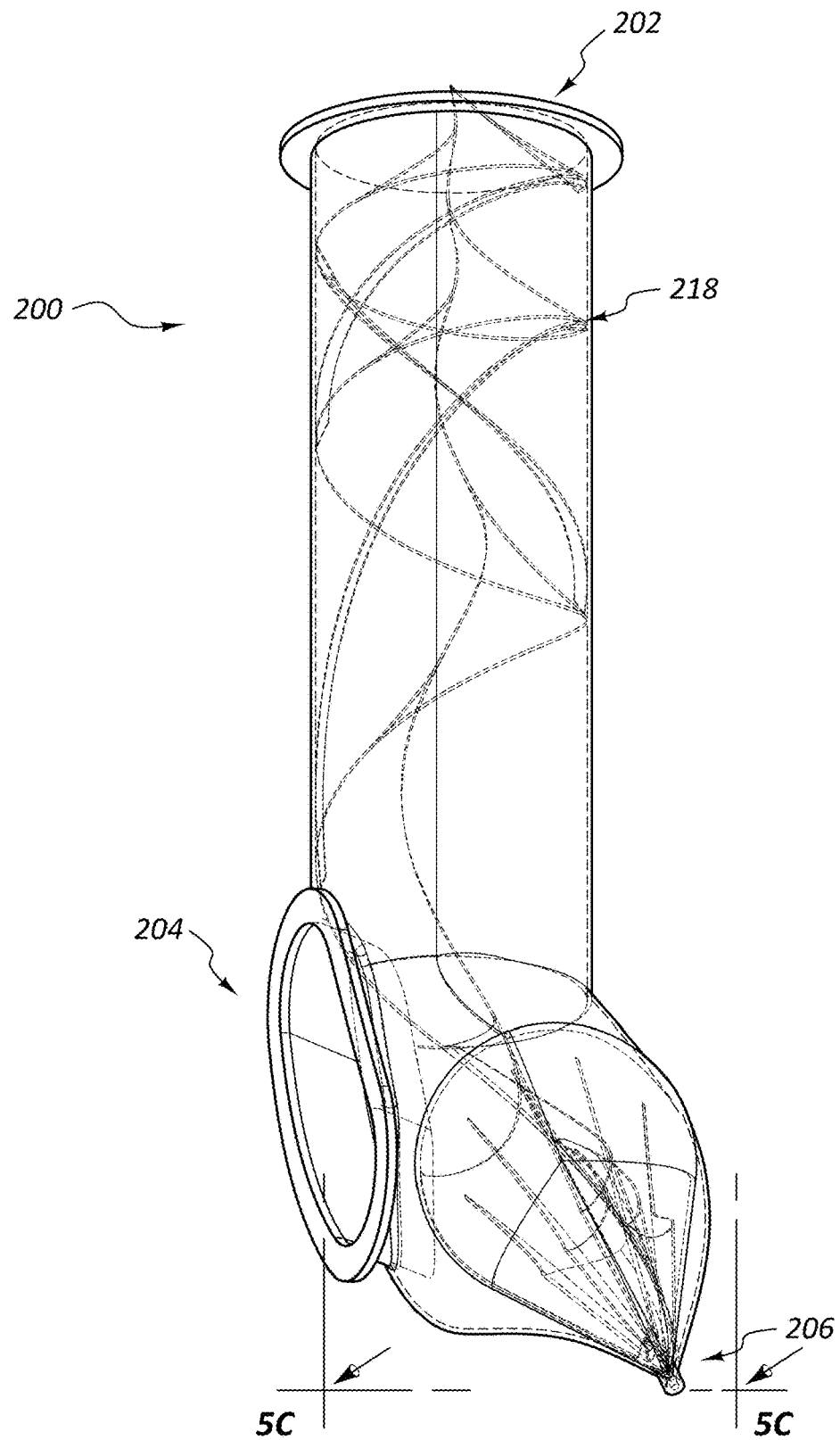
FIG. 3 is a perspective view of an exemplary low-gravity water capture device showing internal features in broken line.
Figure 4:
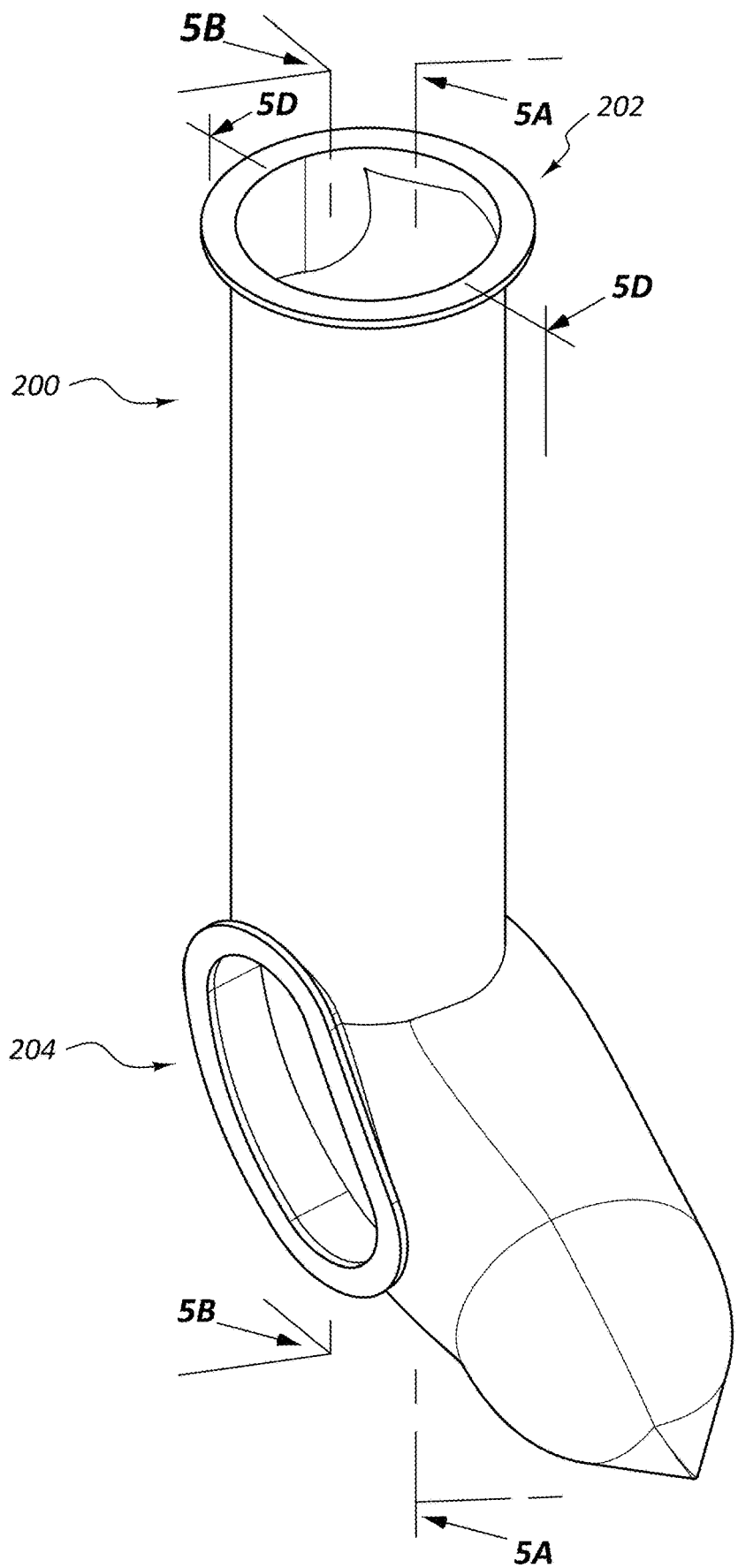
FIG. 4 is a perspective view of the low-gravity water capture device of FIG. 3.
Figures 5A, 5B:
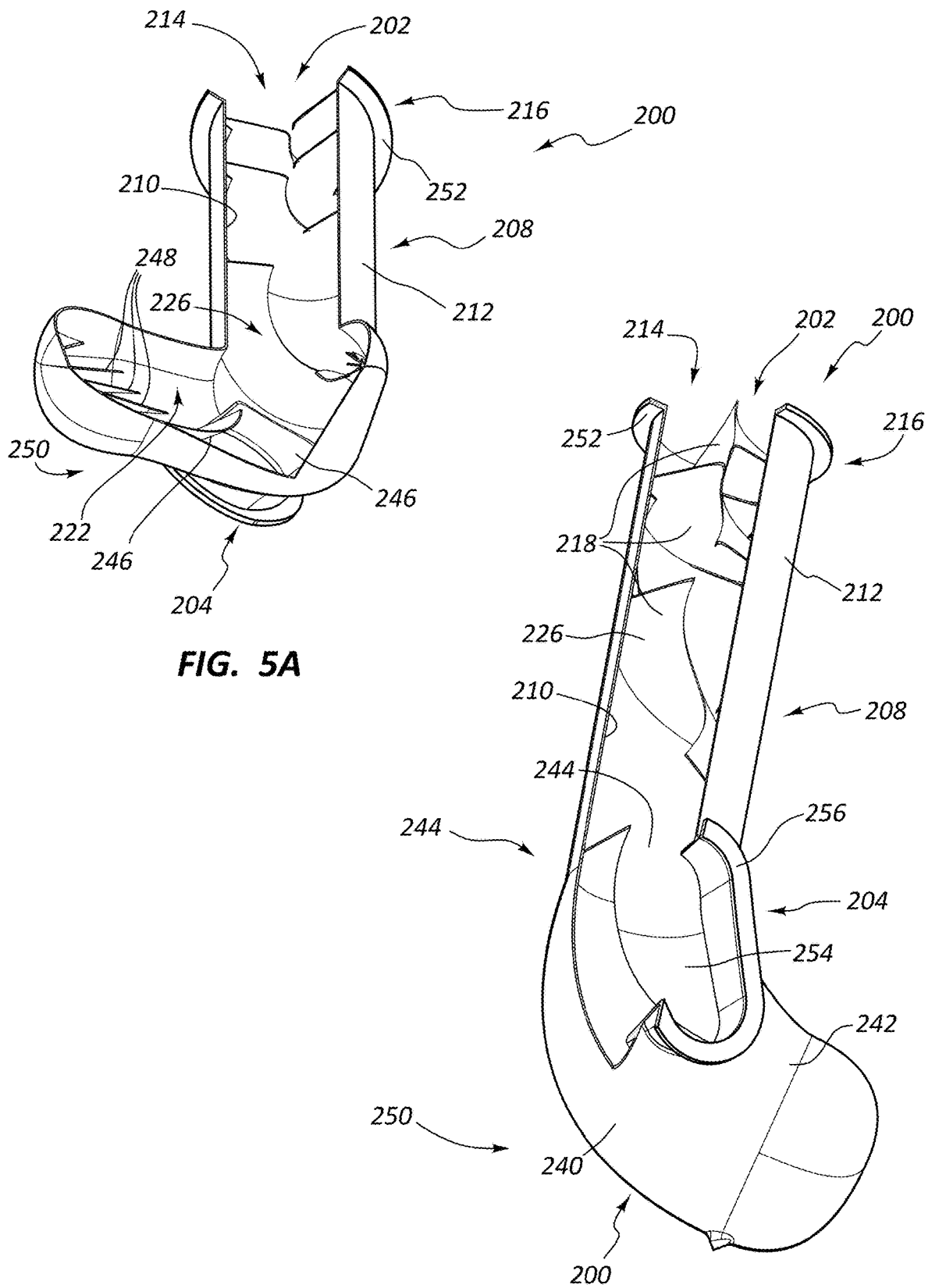
FIG. 5A is a cutaway view of the low-gravity water capture device of FIG. 4 taken along lines 5A-5A.
FIG. 5B is a cutaway view of the low-gravity water capture device of FIG. 4 taken along lines 5B-5B.
Figure 5C:
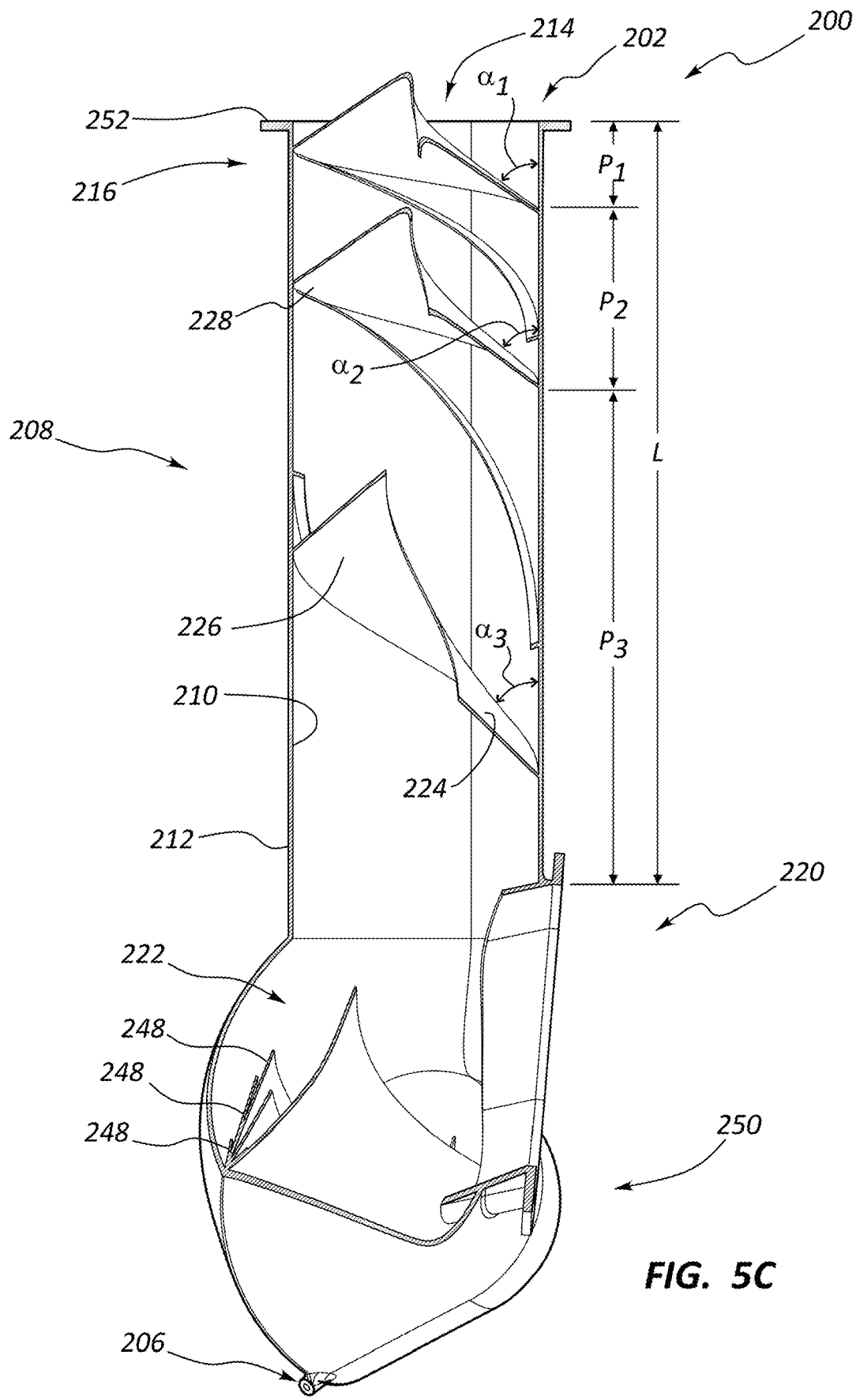
FIG. 5C is a cutaway view of the low-gravity water capture device of FIG. 3 taken along lines 5C-5C.
Figure 5D:
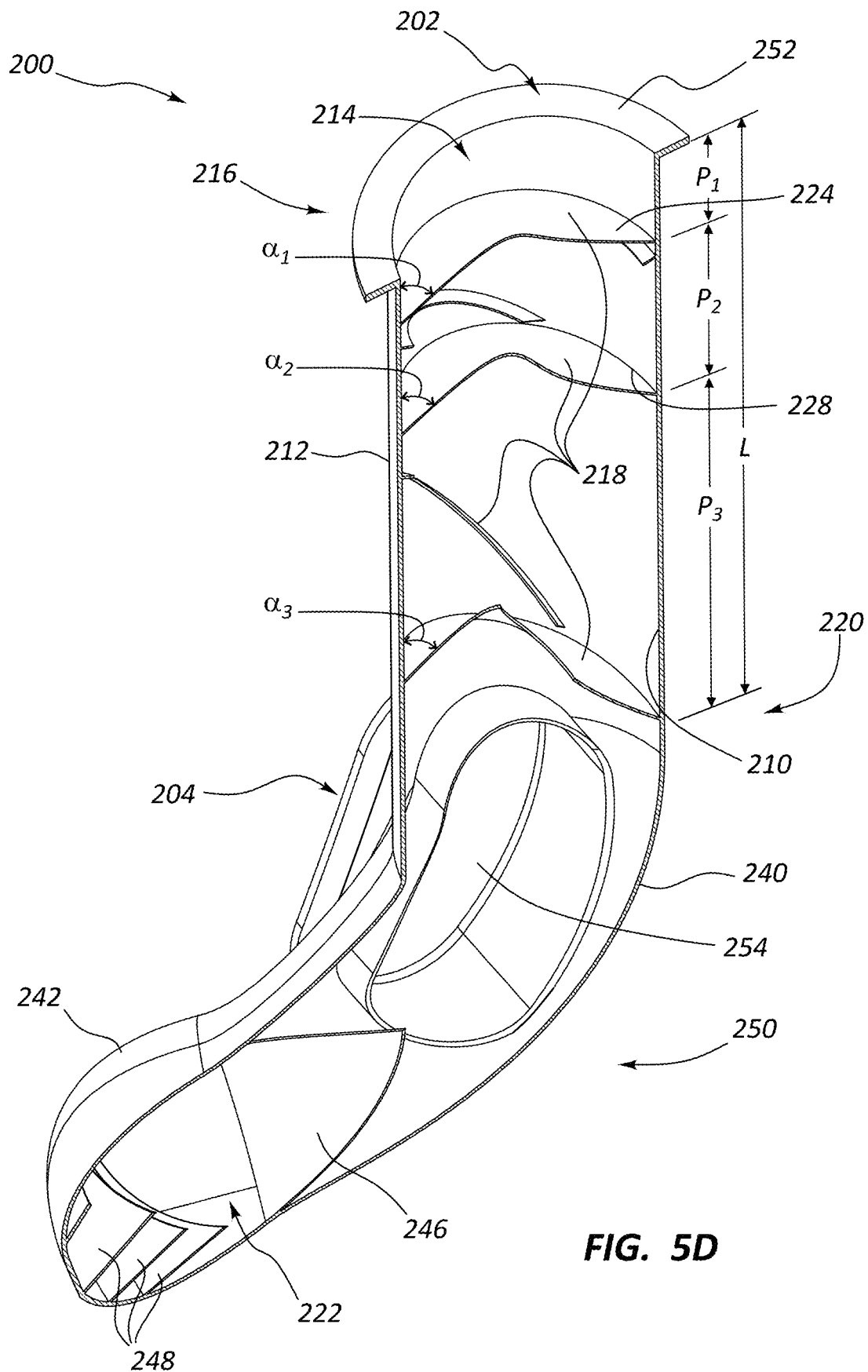
FIG. 5D is a cutaway view of the low-gravity water capture device of FIG. 4 taken along lines 5D-5D.
Figure 5E:
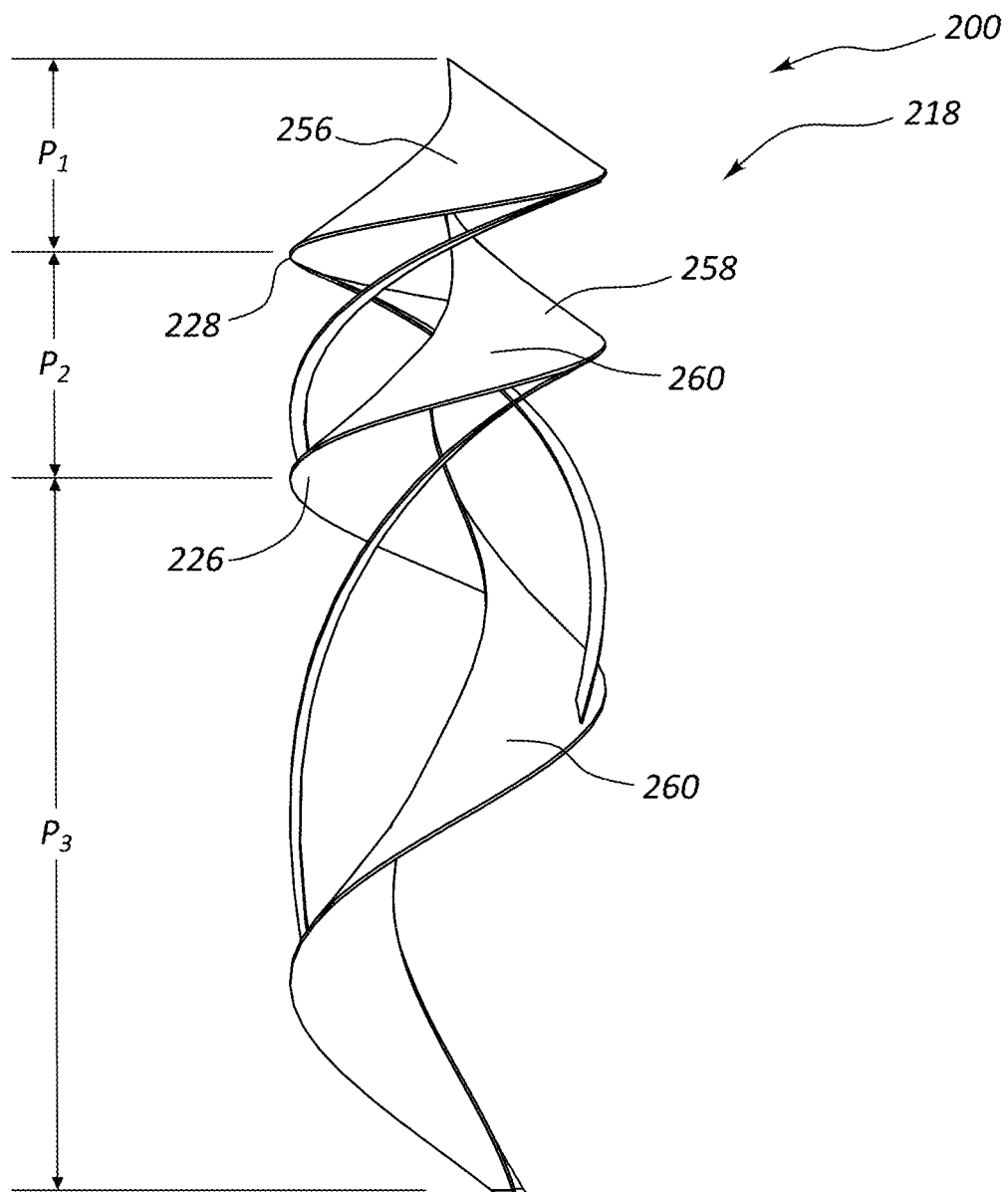
FIG. 5E is an exemplary view of a helix structure of the low-gravity water capture device of FIG. 4.

FIG. 3 is a perspective view of the low-gravity water separator 200 showing internal features, such as the helix structure 218, shown in broken lines without the chimney air outlet component. FIG. 4 is another perspective view of the low-gravity water separator 200 without the chimney air outlet component. FIG. 5A is a cutaway view of the low-gravity water separator 200 along lines 5A-5A in FIG. 4. FIG. 5B is another cutaway view of the low-gravity water separator 200 along lines 5B-5B in FIG. 4. FIG. 5C is a further cutaway view of the low-gravity water separator 200 along lines 5C-5C in FIG. 3. FIG. 5D is a still further cutaway view of the low-gravity water separator 200 along lines 5D-5D in FIG. 4. FIG. 5E is a view of the helix structure 218 of the low-gravity water separator 200 of FIG. 4.

The low-gravity water separator 200 may include an air inlet 202, an air outlet 204, and a water discharge 206. The low-gravity water separator 200 may comprise an elongated tube 208 (also referred to as a housing or an elongated housing) with an inner wall 210 and an outer wall 212. An opening 214 to the low-gravity water separator 200 may be on a first end 216 of the elongated tube 208. The opening 214 may be positioned to accept an air stream. For example, the opening 214 of the low-gravity water separator 200 may be positioned proximate an outlet of a heat exchanger or another device which may output water laden air that includes a plurality of water droplets—also referred to as droplet laden air (see e.g., FIG. 1).

A helix structure 218 may be positioned within the elongated tube 208. The helix structure 218 may guide the droplet laden air from the opening 214 at the first end of the elongated tube 208 to a second end 220 of the elongated tube 208. When the droplet laden air reaches the second end 220, at least some of the water droplets may be separated from the air stream and the water droplets may be captured in a reservoir 222 proximate the second end 220 of the elongated tube 208. The air stream may continue past the reservoir 222 and release into an air output system (e.g., air output system 106 shown in FIG. 1).

The geometry of the helix structure 218 may cause water droplets to separate from the air stream as the air travels through the helix structure 218 to the second end 220 of the low-gravity water separator 200. In some embodiments, the flow path and velocity of the air stream may cause water droplets to separate from the air stream. Contact between the water laden air and a surface (e.g., helix structure 218 or inner wall 210) may create separation of the water droplets from the air as well. The helix structure 218 may have an upper surface 224 and a lower surface 226 arranged opposite the upper surface 224. The helix structure 218 may additionally include an outer edge 228. The outer edge 228 of the helix structure 218 may continuously contact the inner wall 210 of the elongated tube 208.

The helix structure 218 may have a varying helical pitch as the helix structure 218 traverses from the first end 216 of the elongated tube 208 toward the second end 220 of the length of the elongated tube 208. For example, the helix structure 218 may have an initial helical pitch $p_1$, a transitional helical pitch $p_2$, and a final helical pitch $p_3$. The pitch of a helix may be defined as the height of a complete turn of a single helix structure, measured parallel to the axis of the helix structure or as the distance between revolutions of the helix. The varying helical pitch of the helix structure 218 may increase as the helix structure 218 traverses the elongated tube 208. The initial helical pitch $p_1$ may be smaller and/or shorter than the transitional helical pitch $p_2$, which may in turn be smaller and/or shorter than the final helical pitch $p_3$.

The initial helix pitch $p_1$ may be governed by an effective flow area of the cross-axial circumferential air stream as it enters the helix structure 218. The pitch $p_1$ may allow an acceptable restriction on the air stream which may cause a desired pressure drop and air speed. If the pitch $p_1$ is too small, the air stream may face an unnecessary restriction which may cause excessive air flow acceleration which may lead to an unnecessary pressure drop and an associated unnecessary increase in fan power. The level of necessary air flow acceleration or peak velocity may be a factor of the size of the water droplets dispersed within the gas stream along with gas viscosity, and a density difference between the liquid and gas phases. In some embodiments, smaller water droplets may require higher peak gas velocities to be spun out of the air stream in the same amount of time that larger water droplets would spin out in lower air flow velocities.

The initial $p_1$ may be a factor of a ratio of gas flow residence time-to-water droplet drift time. The water droplet drift time may be a maximum average time for a water droplet of a specific size to travel from the axis of the device to the inner wall 210 of the elongated tube 208. The gas flow residence time may be an average time for the entire gas volume to be completely changed in the low-gravity water separator 200. Another way to describe gas flow residence time is the length of time for air entering the low-gravity water separator 200 to exit the low-gravity water separator 200. This may be determined by a volume to volumetric flow rate ratio. The volume to volumetric flow rate ratio may be a ratio of internal air volume to volumetric air flow rate, for example, the amount of volume contained within the low-gravity water separator 200 divided by the rate at which the volume of air is exchanged within the low-gravity water separator 200 as follows:

$$\frac{\text{Device Air Volume (ft}^3)}{\text{Air Volume per Time}\left(\frac{\text{ft}^3}{\text{sec}}\right)} =$$

Average time to exchange all air in the device with new air (sec)

The volume to volumetric flow rate ratio may be greater than the water droplet drift time. A ratio as such may enable a water droplet to drift towards and collide with the inner wall 210 and/or the upper surface 224 before flowing out the air outlet 204. A residence time to drift time ratio may be in a range of the volume to volumetric flow rate ratio of approximately 5000 based on an initial water droplet size. In some embodiments, an initial helical pitch $p_1$ may be sized approximately between ½ and 1½ times a diameter of the elongated tube 208 to achieve this ratio.

The transitional helical pitch $p_2$ may be a portion of the overall length L of the helix structure 218 to enable a transition between the initial helical pitch $p_1$ to the final helical pitch $p_3$. The final helical pitch $p_3$ may transition the gas velocity field at the air outlet 204 to a mostly axial air stream. For example, the final helical pitch $p_3$ may reduce and/or remove the tangential air flow velocity component from an initial tangential air flow velocity. The tangential air flow velocity may also include a measure of the air flow rate of revolution about the helix structure 218. In some embodiments, the final helical pitch $p_3$ may comprise most of the length L of the elongated tube 208 while maintaining an acceptable initial helical pitch $p_1$. The final helical pitch $p_3$ may also produce a smooth transition from the initial helical pitch $p_1$ to the reservoir 222 and air outlet 204.

The changing helical pitch may also cause an interior angle between the upper surface 224 of the helix structure 218 and the inner wall 210 of the elongated tube 208 to change. For example, an initial interior angle $\alpha_1$ between the upper surface 224 and the inner wall 210 may be less than 90°. In some embodiments, the initial interior angle $\alpha_1$ may be approximately 50° to 80°. The initial angle $\alpha_1$ may change as the initial helical pitch $p_1$ transitions to the transitional helical pitch $p_2$.

The initial angle $\alpha_1$ may transition to a transitional interior angle $\alpha_2$ between the upper surface 224 and the inner wall 210. The transitional interior angle $\alpha_2$ may be sized such that it smoothly and relatively constantly (i.e. linearly) changes the interior angle formed by the upper surface 224 and the inner wall 210 between reservoir 222 and inlet.

The final interior angle $\alpha_3$ may begin at the end range of the transitional interior angle $\alpha_2$ with a range of approximately 2° to 10°. The continuously diminishing interior angles $\alpha_1$, $\alpha_2$, $\alpha_3$ may aid in water flow from the air inlet 202 of the low-gravity water separator 200 to the reservoir 222.

The reservoir 222 may collect water droplets as water flows down the helix structure 218. The water droplets, as will be discussed with reference to FIG. 11, may be separated from the air stream as the air stream travels through the helix structure 218. The helix structure 218 and elongated tube 208 may gradually transition into the reservoir 222. For example, the reservoir 222 may be located in the second end 220 of the low-gravity water separator 200 and the transition between the elongated tube 208 and the reservoir 222 may be a smooth and continuous curved geometry 240.

The reservoir 222 may comprise a bulbous cavity 242. The bulbous cavity 242 may have an entry point 244 which may enable the flow of water from the final interior angle $p_3$ to the water reservoir 222. The water reservoir 222 may be bisected by a stabilizing vane 246. The stabilizing vane 246 may maintain water within the reservoir 222 and may prevent water laden air from being dispersed into the atmosphere. The stabilizing vane 246 may additionally guide water droplets towards one or more reservoir vanes 248. The one or more reservoir vanes 248 may use capillary action to maintain the water in the reservoir 222. Capillary action, which may arise due to the interaction of surface tension of a liquid and adhesive forces acting between the liquid and adjacent surfaces, may cause the water to minimize its surface area exposed to the air. For example, the water may naturally seek minimum inter-facial energy. In the reservoir 222, the water may pull itself into the series of reservoir vanes 248 where the vanes 248 are closest together to minimize an exposed water surface. The reservoir vanes 248 may be spaced apart such that water, or another liquid, may use surface tension or cohesion and adhesive forces between the liquid and the reservoir vanes 248 to maintain the liquid in the reservoir 222.

For example, with reference to FIG. 5E, the reservoir vanes 248 may be arranged at various angles $\alpha_4$, as, $\alpha_6$, and $\alpha_7$ relative to each other. The angles $\alpha_4$, as, $\alpha_6$, and $\alpha_7$ may all protrude from a common area or point 264. This point 264 is typically contained within the reservoir 222 (as shown in the Figures) or may be a point or area located outside the confines of the low-gravity water separator 200. In some embodiments, the various angles $\alpha_4$, as, $\alpha_6$, and $\alpha_7$ may all comprise the same angle separating each vane 248. In other embodiments, each angle $\alpha_4$, as, $\alpha_6$, and $\alpha_7$ may be distinct from the others. In some embodiments, the angles $\alpha_4$, as, $\alpha_6$, and $\alpha_7$ may be continuous as the vanes 248 extend outward from the point 264. For example, the angle $\alpha_4$, as, $\alpha_6$, and $\alpha_7$ separating adjacent vanes may be constant along a length of each vane 248. In other embodiments, the angles $\alpha_4$, as, $\alpha_6$, and $\alpha_7$ may be variable as the vanes 248 extend away from the point 264. For example, the vanes 248 may have a curvature or variable geometry that causes the angles $\alpha_4$, as, $\alpha_6$, and $\alpha_7$ to change along the length of each vane 248. The angles $\alpha_4$, as, $\alpha_6$, and $\alpha_7$ may be constant or variable angles in the range of about 10 degrees to about 45 degrees, and more particularly in the range of about 10 degrees to about 20 degrees.

The spacing between, the shape and size, and the position within reservoir 222 of stabilizing vanes 248 may be determined based on a target Weber number. A Weber number is a dimensionless number for analyzing fluid flows at an interface between two different fluids. The Weber number is calculated as a ratio between a dynamic pressure of air and a capillary pressure of the water. A final calculation of the Weber number is indicative of whether the kinetic energy of the air or interfacial energy of the water is dominant. In the current situation, the Weber number should indicate a dominant interfacial energy of the water to indicate the water will remain in a coalesced state in the reservoir 222 and not disperse into droplets. The Weber number may also be calculated by either of the following equations:

$$We = \frac{\text{Dynamic pressure of air}}{\text{Capillary pressure of water}}$$

$$We = \frac{\text{Kinetic energy of air}}{\text{Interfacial energy of water}}$$

To achieve water stability, the Weber number may be in the range of about 8 to about 12.

In further embodiments, a stability rule may be used to determine a distance between the stabilizing vanes 248. For example, to achieve water stability, a stabilizing calculation may be performed. The calculation may be performed using the following equation for air/water separation:

$$V_{air}^2 * D < \sim 20 \frac{\text{ft}^3}{\text{s}^2}$$

$V_{air}$ may be air velocity. D may be distance between the stabilizing vanes 248 at the interface between the water and the air. In some embodiments, the reservoir vanes 248 may additionally be of sufficient height to maintain an adequate amount of liquid within the reservoir 222. The water discharge 206 may be positioned proximate a bottom end 250 reservoir 222.

In some embodiments, the water discharge 206 may enable water to be drawn from the stabilizing vanes 248 within the reservoir 222. In some embodiments, the low-gravity water separator 200 may incorporate an automated drain cycle which may utilize liquid level sensing. The water discharge 206 may be controlled by sensing an amount of water present in the reservoir 222 (e.g., water-output device 120 shown in FIG. 1). When the reservoir 222 is full, a pump (not shown) may be started. The pump may cease operation when the reservoir 222 is empty. In some embodiments, capacitive level sensors (e.g., sensors 122, FIG. 1) may be used. Capacitive level sensors may be capable of sensing through a wall and may be positioned on an outside of the reservoir 222 to determine when the reservoir is 'full' and when it is 'empty.'

In some embodiments, the low-gravity water separator 200 may include a lip 252 proximate the opening 214 of the elongated tube 208. The lip 252 may mate with another piece of equipment such as a heat exchanger, tube, or other device and/or apparatus which may transfer droplet laden air from a source to the opening 214. The opening 214 may additionally and/or alternatively incorporate a multitude of other attachment features such as a male or female threaded end, an interference fit device, or the like.

Likewise, the air outlet 204 may comprise an opening 254 with a lip 256. The lip 256 may provide a clamping surface to attach an apparatus to the air outlet 204. An apparatus may include, for example, a tube or other transfer structure to move and/or guide air to an air output system (e.g., air output system 106 shown in FIG. 1). The opening 254 may additionally and/or alternatively incorporate other connection mechanisms such as threaded ends, interference fits, or the like. The air outlet 204 may form a sort of chimney shaped structure with an interior wall 259. The wall 259 protrudes into the reservoir 222 and may create an interior corner. The interior corner 261 may capture any stray wall-bound water droplets and highly wetted liquid films from migrating out of the air outlet 204.

FIG. 5E is a view of the helix structure 218 of the low-gravity water separator 200 of FIG. 4. In some embodiments, the helix structure 218 may have various features on the upper surface 224 of the helix structure 218. For example, the helix structure 218 may have a groove in the upper surface 224 of the first helix turn 258. The second helix turn 260 and the third helix turn 262 may also have a groove in the upper surface 224. The groove may use surface tension and/or capillary forces to guide the water towards the edge 228 of the helix structure 218. This may stabilize the water flow as it transitions towards the reservoir 222. In other embodiments, a tertiary vane may be provided as a protruding feature on the upper surface 224 of the helix structure 218 to provide a stabilizing force for a water rivulet and/or water droplets. In some embodiments, a water rivulet may be a small stream of coalesced or gather water particles or water droplets. Either feature, a groove or a tertiary vane, may direct water droplets to the outer edge 228 of the helix structure 218 towards a rivulet. The groove or tertiary vane may provide stability to water rivulets.

Figures 6, 7:
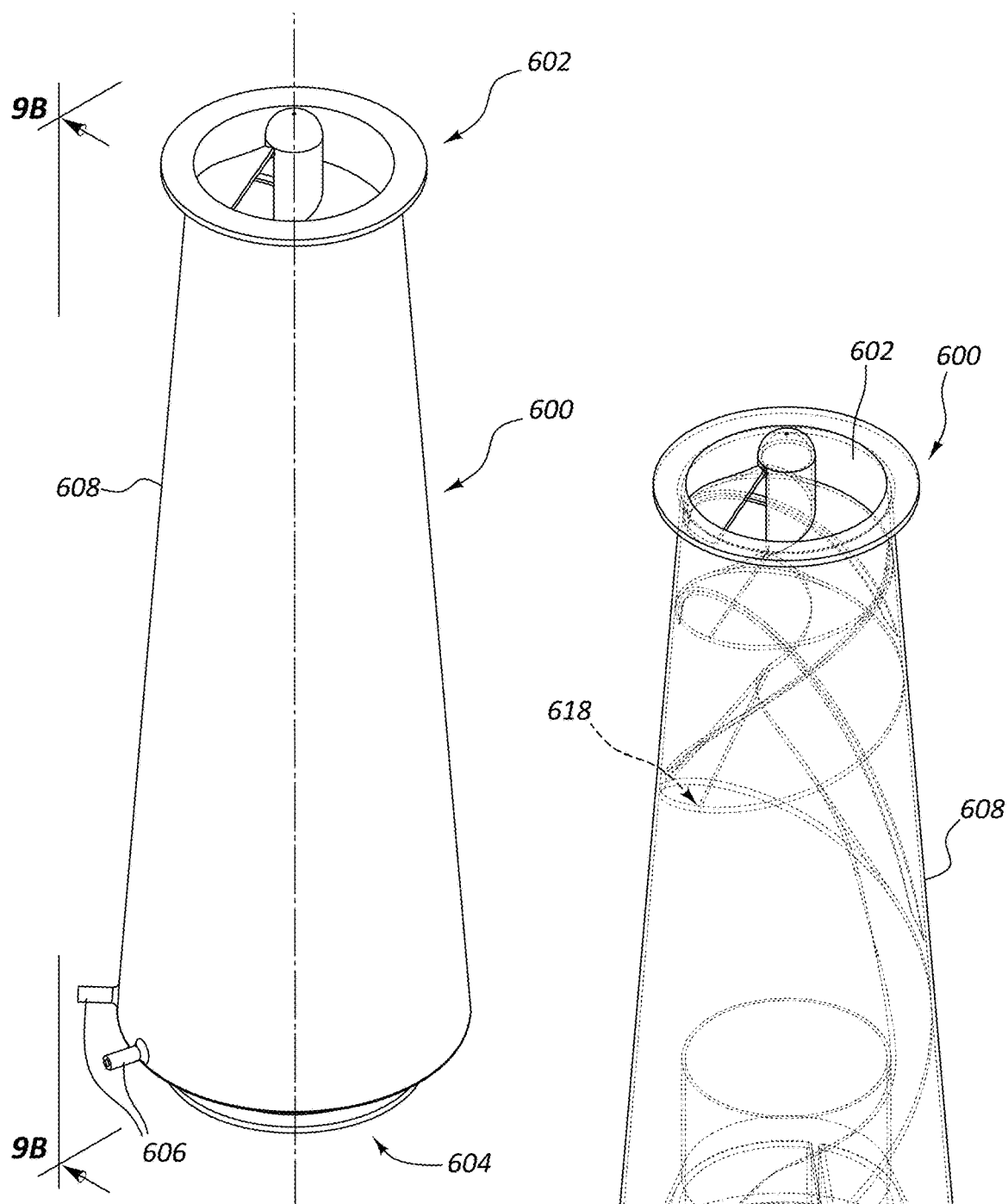
FIG. 6 is a top perspective view of another exemplary low-gravity water capture device in accordance with the present disclosure.
FIG. 7 is a top perspective view of the low-gravity water capture device of FIG. 6 showing internal features in broken line.
Figure 8:
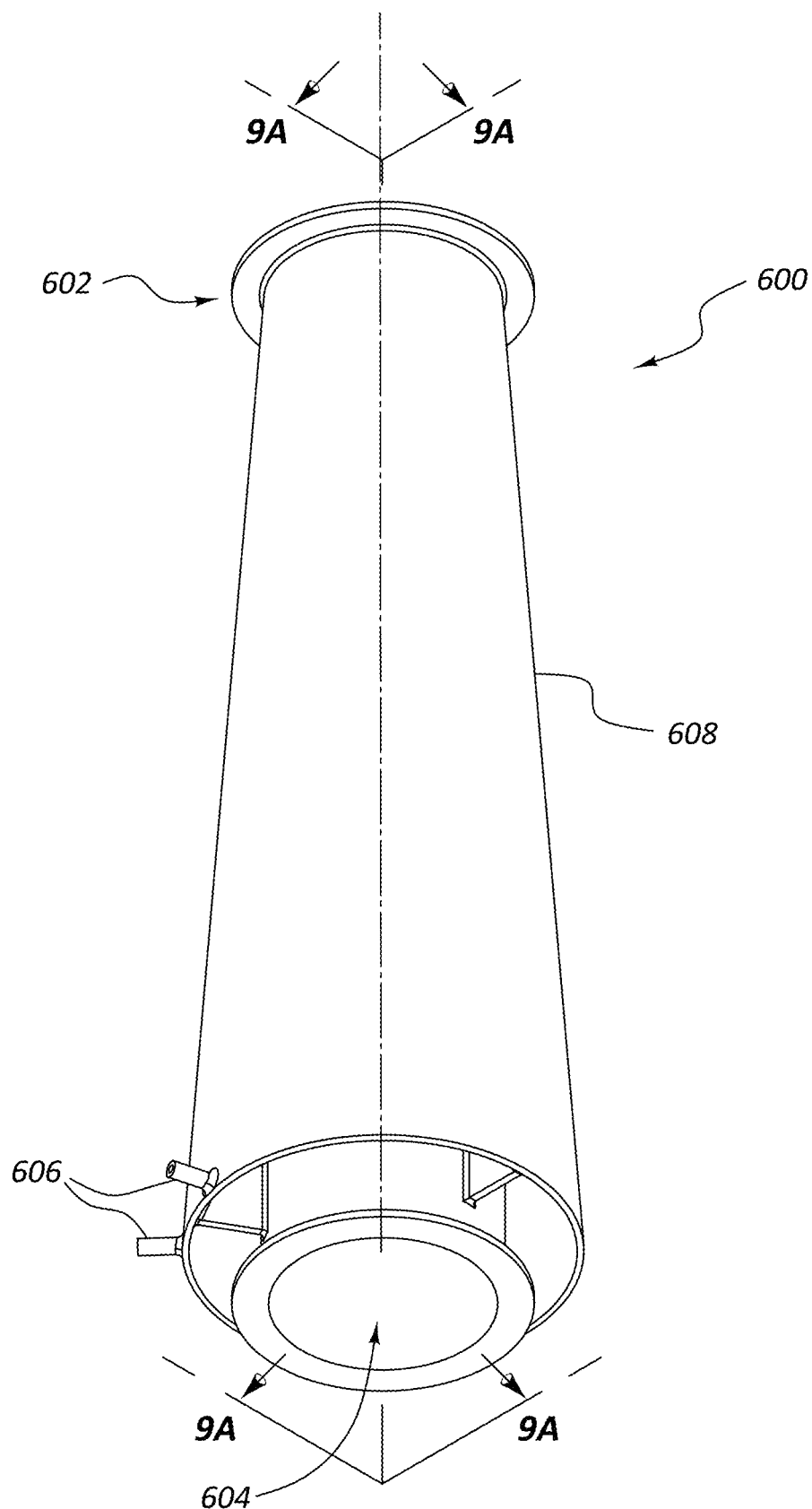
FIG. 8 is a bottom perspective view of the low-gravity water capture device of FIG. 6.

FIG. 6 is a perspective view of an alternative configuration for a low-gravity water separator 600. The low-gravity water separator 600 may incorporate similar features as the low-gravity water separator 102, 200 discussed with reference to FIGS. 1-5D. The low-gravity water separator 600 may include an elongated tube 608. The elongated tube 608 may have a cylindrical shape or may be tapered and/or conical-shaped. The elongated tube 608 may include an air inlet 602, an air outlet 604, and one or more water discharges 606. FIG. 7 is a perspective view of the low-gravity water separator 600 with internal features, such as the helix structure 618, shown in broken lines. FIG. 8 shows a plan view of the low-gravity water separator 600.

Figure 9C:
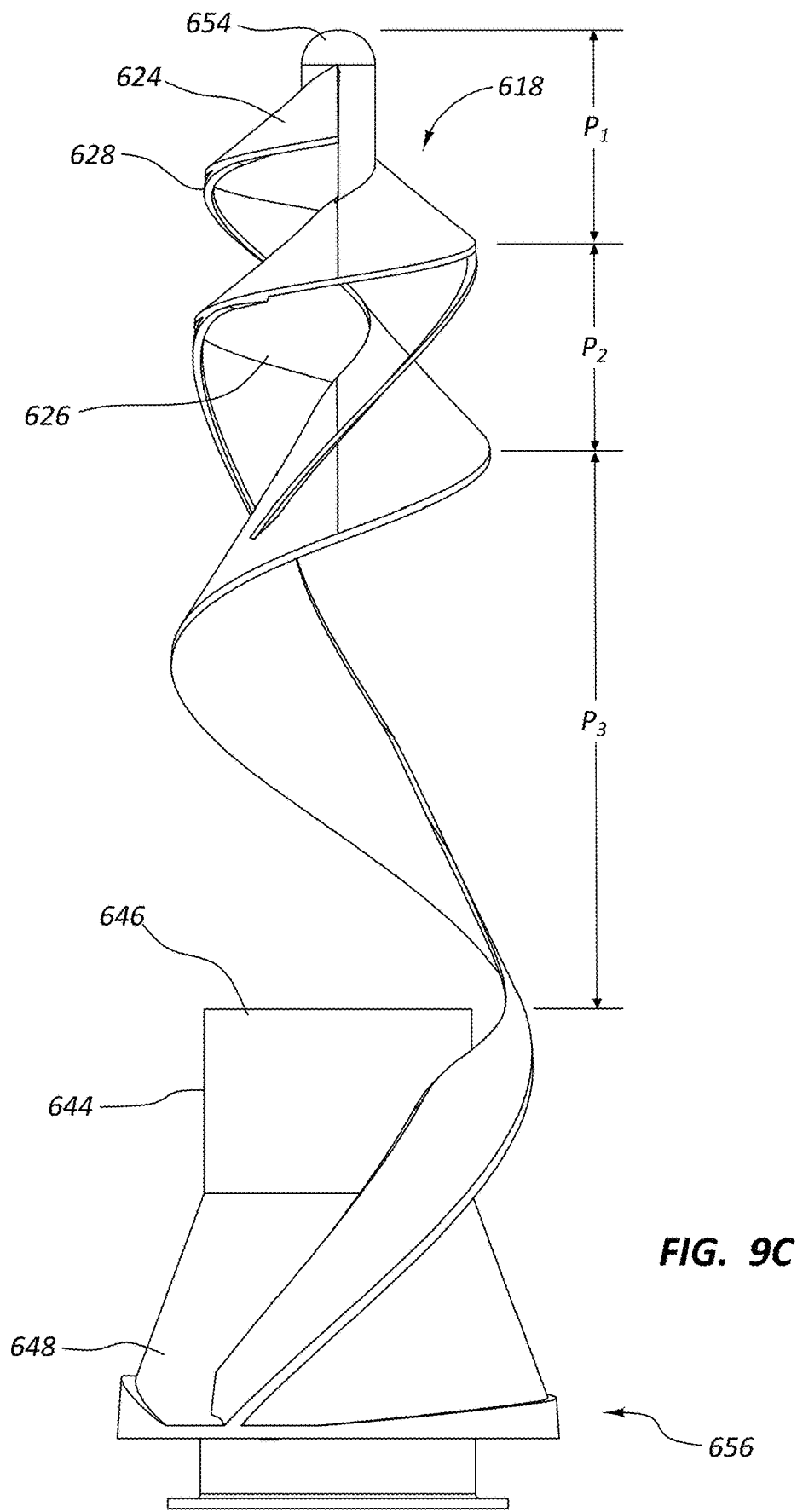
FIG. 9C is an exemplary view of a helix structure of the low-gravity water capture device of FIG. 6.

FIG. 9A and FIG. 9B show cutaway views of the low-gravity water separator 600 along lines 9A-9A and 9B-9B as shown in FIGS. 8 and 6, respectively. FIG. 9C is an exemplary view of a helix structure of the low-gravity water capture device of FIG. 6. The low-gravity water separator 600 includes the helix structure 618. The elongated tube 608 may include with an inner wall 610 and an outer wall 612. An opening 614 to the low-gravity water separator 600 may be on a first end 616 of the elongated tube 608. The opening 614 may be positioned to accept the air stream.

A helix structure 618 may be positioned within the elongated tube 608. The helix structure 618 may guide an air stream from the opening 614 at the first end of the elongated tube 608 to a second end 620 of the elongated tube 608. By the time the air reaches the second end 620, at least some of the water droplets may be separated from the air stream and captured in a reservoir 622 proximate the second end 620 of the elongated tube 608. The air stream may continue past the reservoir 622 and release into an air output system (e.g., air output system 106 shown in FIG. 1).

The geometry of the helix structure 618 may cause water droplets to separate from the airflow as the air stream travels through the helix structure 618 toward the second end 620 of the low-gravity water separator 600. In some embodiments, the flow path and velocity of the air may cause water droplets to separate from the air streams. The helix structure 618 may have an upper surface 624 and a lower surface 626 arranged opposite the upper surface 624. The helix structure 618 may additionally include an outer edge 628. The outer edge 628 of the helix structure 618 may continuously contact the inner wall 610 of the elongated tube 608.

The helix structure 618 may have a varying helical pitch as the helix structure 618 traverses from the first end 616 of the elongated tube 608 to the second end 620 of the elongated tube 608. For example, the helix structure 618 may have an initial helical pitch $p_1$, a transitional helical pitch $p_2$, and a final helical pitch $p_3$. The initial helical pitch $p_1$, transitional helical pitch $p_2$, and final helical pitch $p_3$ may be similar to the initial helical pitch $p_1$ as described with reference to FIGS. 5A-5D. As the helical pitch changes, the upper surface 624 of the helix structure 618 may maintain a smooth and continuous surface.

The changing helical pitch may also cause an interior angle between the upper surface 624 of the helix structure 618 and the inner wall 610 of the elongated tube 608. For example, an initial interior angle $\alpha_1$, transitional interior angle $\alpha_2$, and final interior angle $\alpha_3$ may be sized similarly to the initial interior angle $\alpha_1$, transitional interior angle $\alpha_2$, and final interior angle $\alpha_3$ described with reference to FIGS. 5A-5D. The interior angles $\alpha_1$, $\alpha_2$, $\alpha_3$ may aid in water flow from the air inlet 602 of the low-gravity water separator 600 to the reservoir 622.

The reservoir 622 in the low-gravity water separator 600 may be formed between the inner wall 610 of the elongated tube 608 and an exterior wall 644 of an interior cylinder 646 located within the elongated tube 608. The height of the interior cylinder 646 may be high enough to hold the water separated from the air entering the opening 614. A connecting wall 648 may form a bottom 650 of the reservoir 622. The connecting wall 648 may connect a bottom of the elongated tube 608 to approximately a midpoint of the interior cylinder 646. Dry air may pass through an opening 652 formed in the interior cylinder 646. Water collected in the reservoir 622 may be extracted from the reservoir via one or more water discharges 606.

In some embodiments, an inlet cap 654 may be positioned proximate the air inlet 602 (see FIG. 9A). The inlet cap 654 may prevent the formation of a rivulet on an inside edge of the helix structure 618. The inlet cap 654 may set a predetermined distance between the inside edge of the helix structure 618 and a center axis 656 of the low-gravity water separator 600. The inlet cap 654 may prevent the air stream from entering the helix structure 618 at a trajectory directly down the center axis 656.

In some embodiments, air may enter the reservoir 622 at a rapid velocity. The velocity of the air flow entering the reservoir 622 may continue to increase after the air has entered the reservoir 622 and may turn into turbulent air flow. Turbulent air flow in the reservoir may disrupt a water rivulet or pool of water that may be gather in the reservoir 622.

In some embodiments, air flow to the reservoir 622 may be restricted. For example, a baffle (not shown) may sit atop the exterior wall 644 of the interior cylinder 646. The baffle may have a donut-like shape or toroidal shape. For example, the baffle may have an interior hole which may allow air to flow out of the low-gravity water separator 600 through interior cylinder 646. An outer diameter of the baffle may be smaller than an inner diameter of the inner wall 610 of the low-gravity water separator 600. For example, there may be gap or predetermined distance between the inner wall 610 and a perimeter edge the baffle. The gap, or space, between the inner wall 610 and the baffle may enable the rivulet and water laden air to enter the reservoir 622 while reducing the velocity and volume of air flow to the reservoir.

In some embodiments, the exterior wall 644 of the interior cylinder 646 may incorporate one or more holes along its surface at locations between its open distal and proximal end. The one or more holes may allow turbulent air to exit the reservoir 622 while water remains in the reservoir. For example, capillary forces may retain the water inside the reservoir while turbulent air may exit the reservoir 622 through the one or more holes.

In another embodiment, one or more fins (not shown) may be incorporated into the reservoir 622. For example, after the helix structure 618 enters the reservoir 622, the helix structure 618 may terminate near the second end 620 of the low-gravity water separator 600. One or more stabilizing fins may wrap around interior cylinder 646 and/or connecting wall 648, 650. The stabilizing fins may transition the turbulent, fast airflow entering and swirling in the reservoir 622 into smooth and slower laminar air flow. Laminar airflow in the reservoir may reduce or lessen interruptions to the water rivulet formed within the reservoir. Fewer disruptions to the rivulet may enable to the water to stay within the reservoir. Furthermore, the fins may provide the same or similar benefits related to stabilizing the water collected in the reservoir 622 as the vanes 248 described above with reference to the low-gravity water separator 200.

FIG. 9C is a side view of the helix structure 618 of the low-gravity water separator 600 of FIG. 6. The helix structure 618 may incorporate similar features of the helix structure 218 discussed previously. For example, in some embodiments, the helix structure 618 may have various features on the upper surface 624 of the helix structure 618. For example, the helix structure 618 may have a groove in the upper surface 624. The groove may use surface tension and capillary forces to guide or direct the water towards the outer edge 628 of the helix structure 618. The groove may help stabilize the water flow as it transitions towards the reservoir 622. In other embodiments, a tertiary vane may protrude from and extend along the upper surface 624 of the helix structure 618 to provide a stabilizing force for a water rivulet and water droplets. Either feature, a groove or a tertiary vane, may direct water droplets to the outer edge 628 of the helix structure 618 towards a rivulet. The groove or tertiary vane may provide stability to water rivulets.

Figure 10:
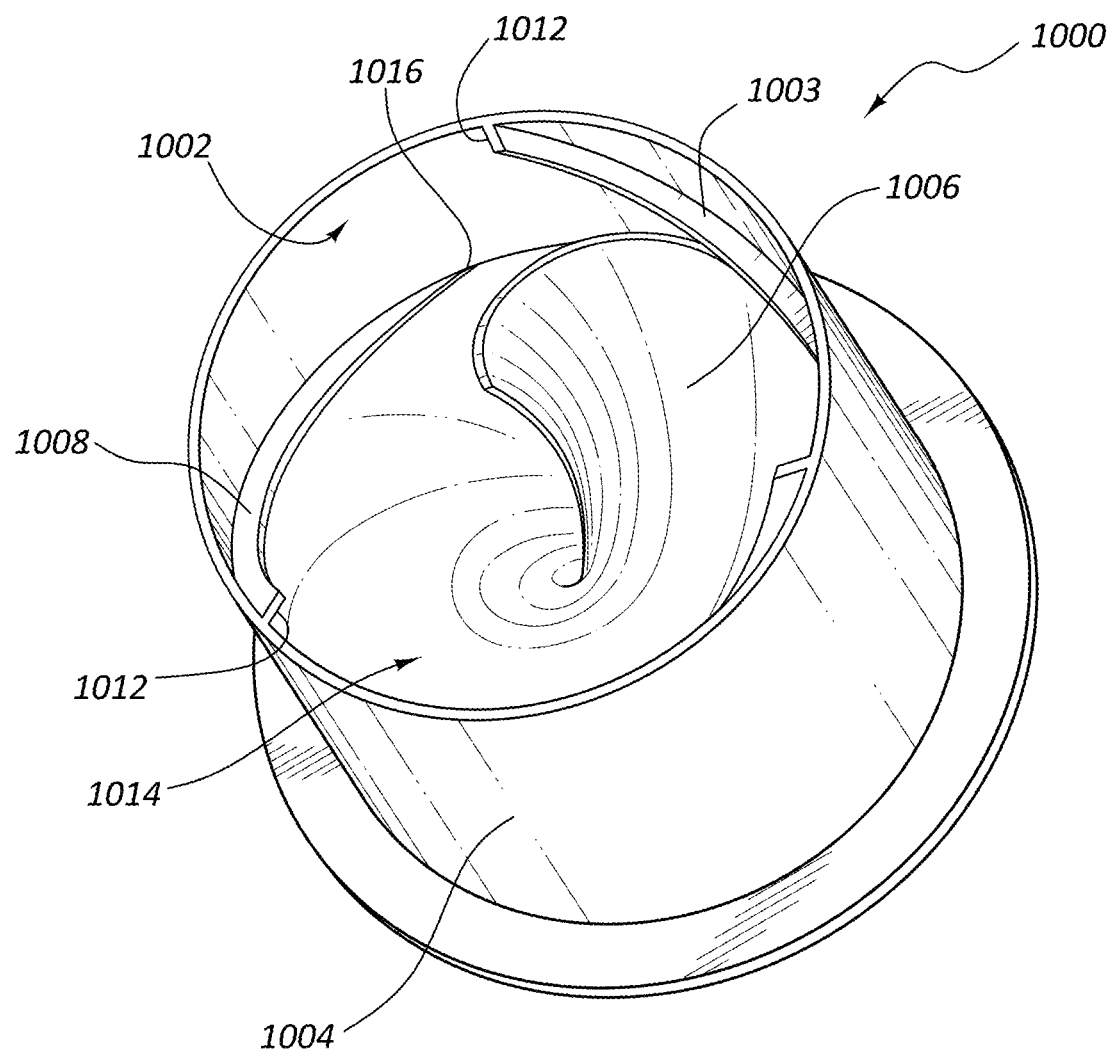
FIG. 10 is a truncated cutaway view of an exemplary low-gravity water capture device showing secondary vanes.

FIG. 10 is a perspective view of a cutaway of an internal portion of a low-gravity water separator 1000. The low-gravity water separator 1000 may include an inner wall 1002, an outer wall 1004 positioned opposite the inner wall 1002, and a helix structure 1006 positioned within the inner wall 1002. The low-gravity water separator 1000 may include one or more secondary vanes 1008. The secondary vanes 1008 may protrude from the inner wall 1002 towards a centerline of the low-gravity water separator 1000. The secondary vanes 1008 may be of sufficient size to guide water droplets which may be stuck on the inner wall 1002. The secondary vanes 1008 may be formed on the inner wall 1002, may be integrally formed as a single piece with the inner wall 1002, or may be formed separately and mounted to the inner wall 1002 in a separate assembly step.

The secondary vane 1008 may begin at a first location 1012 at an initial predetermined distance from an upper surface 1014 of the helix structure 1006. A pitch of the secondary vane 1008 may then be greater than a pitch of the corresponding portion of the helix structure 1006 such that an end location 1016 is proximate the upper surface 1014 of the helix structure 1006. In some embodiments, the end location 1016 may merge into the upper surface 1014 of the helix structure 1006. In another embodiment, the end location 1016 may not touch or come into contact with the upper surface 1014, but rather may be a distance away from the upper surface 1014. The secondary vane 1008 may enable water droplets clinging to the edge of the inner wall 1002 to be guided down into a rivulet flow as will be discussed with reference to FIG. 11.

Figure 11:
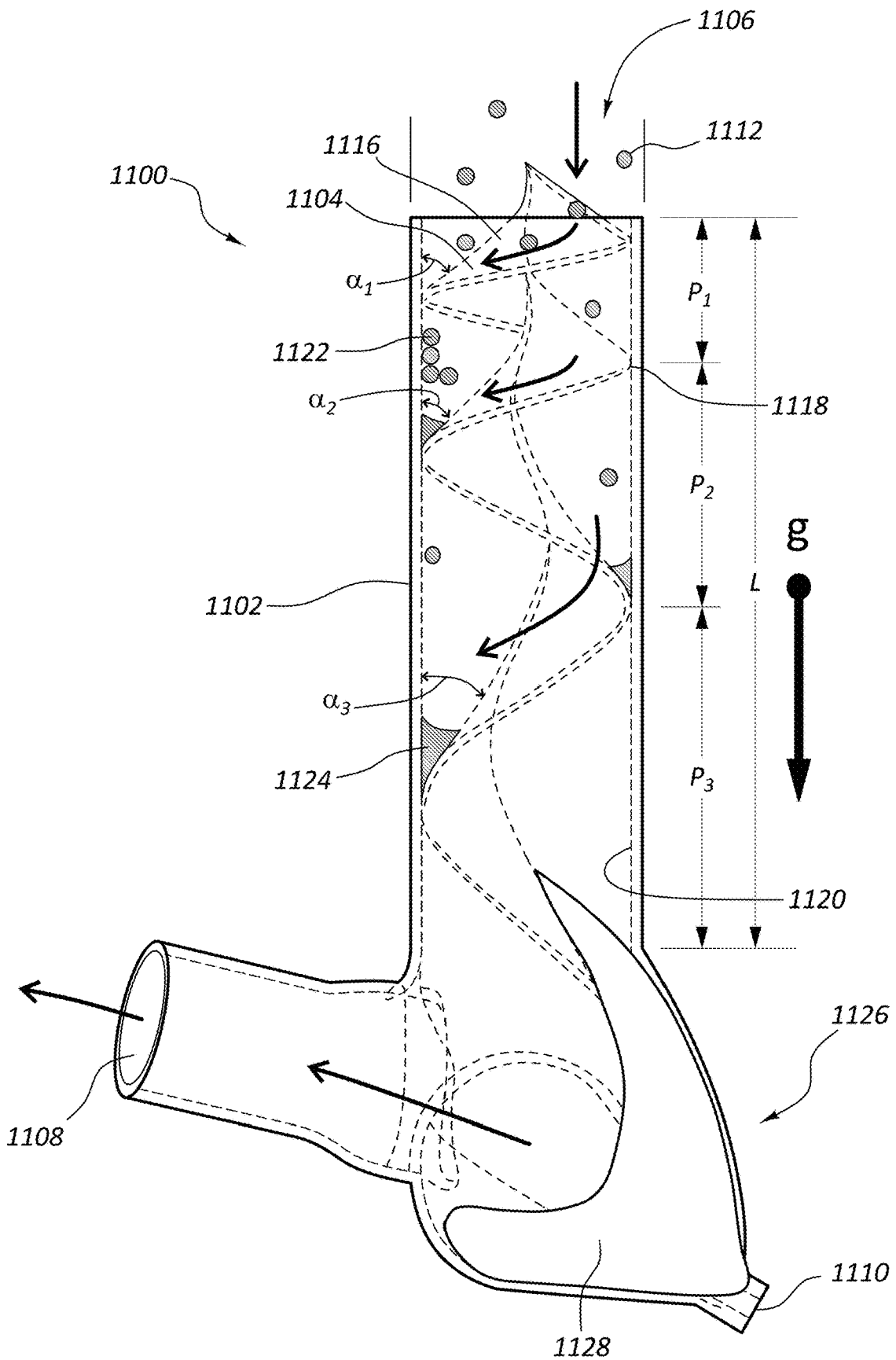
FIG. 11 is a schematic side view of an exemplary low-gravity water capture device.

FIG. 11 is an example of a low-gravity water separator 1100. The low-gravity water separator 1100 may be an example of one or more aspects of a low-gravity water separator 102, 200, 600, 1000 described with reference to FIGS. 1-10. The low-gravity water separator 1100 may include an elongated tube 1102 with a helix structure 1104. The low-gravity water separator 1100 may include an air inlet 1106, air outlet 1108, and one or more water discharges 1110.

The helix structure 1104 may have a changing helical pitch along its length L. The helix structure 1104 may have an initial helical pitch $p_1$, a transitional pitch $p_2$, and a final pitch $p_3$, as discussed previously. The helix structure 1104 may additionally include an initial angle $\alpha_1$, a transitional angle $\alpha_2$, and a final angle $\alpha_3$, as discussed previously.

Air 1112 laden with water droplets may enter the low-gravity water separator 1100 through an air inlet 1106. The water laden air 1112 may be forced into an air stream as it enters the low-gravity water separator 1100 through gravity or an external forcing device such as a fan or the like.

The initial angle $\alpha_1$ combined with the initial helical pitch $p_1$ at the air inlet 1106 may create an overall angle of an upper surface 1116 of the helix structure 1104. The initial range of the initial angle $\alpha_1$ may drive wall-bound water laden air 1112 towards an interior corner 1118 where the upper surface 1116 of the helix structure 1104 meets with an inner wall 1120 of the elongated tube 1102. The initial angle $\alpha_1$ may induce a radial velocity of the water laden air 1112. The radial velocity may be within a range of 700 to 2000 RPM. The rapid circumferential flow may create a radial acceleration of the water laden air 1112, or entrained drops. The radial acceleration may be within a range of 30 g and 150 g. The radial acceleration may cause water droplets 1122 to separate from the air 1112.

For example, the helix structure 1104 may cause a centrifugal, or cyclonic, liquid separation of the water droplets from the air stream. The centrifugal liquid separation may exploit the density difference between the liquid and gas in the air flow to concentrate the water droplets 1122 on the inner wall 1120 and upper surface 1116. Air 1112 entering the low-gravity water separator 1100, with entrained water droplets, may rapidly change flow direction from an even axial flow to a rapid cross-axial rotating flow. The axial airflow may be airflow mostly perpendicular to an axis of the helix structure 1104. This axial airflow may change to cross-axial airflow, or airflow that is aligned with the direction of the helix structure 1104. The relatively 'lighter' air 1112 may change direction more easily than the 'heavier' water droplets 1122 forcing the water droplets 1122 to drift toward, and eventually collide with, the inner wall 1120 and upper surface 1116.

As the water droplets 1122 separate from the air 1112, the remaining radial velocity of the air 1112 may drive the water droplets 1122 into the interior corner 1118. The water droplets 1122 may form a rivulet 1124, or a very small stream, of the water droplets 1122. For example, a centripetal force acting on the air 1112 may cause the water droplets 1122 to drive toward the rivulet 1124. Centripetal force may be a force that acts on the air 1112 as it moves in a circular path down the helix structure 1104. The centripetal force acting on the air 1112 may be directed toward a center of the helix structure. The centripetal force acting on the air 1112 may be, for example, approximately $6 \times 10^{-7}$ lbf to $1 \times 10^{-3}$ lbf. As described previously, the speed is dependent on the ratio of air residence time to droplet drift time. The physical parameters that influence this are the size of the droplets, gas viscosity, and the density difference between the liquid and gas. Therefore, the centripetal force may change as the mass and acceleration of the droplets change.

As more water droplets 1122 coalesce with the rivulet 1124, the rivulet 1124 may swell until it fills a gas boundary layer. A gas boundary layer may be a region of air flow near a surface of the inner wall 1120 or upper surface 1116 of the helix structure 1104 over which the gas is flowing, which may move at a lower velocity than the bulk of the freestream air flow. The thickness of the gas, or air, boundary layer may increase as the air flows through the helix structure 1104. The size of the gas boundary layer may determine how large the rivulet 1124 may swell while still maintaining stability of the rivulet. The boundary layer may be defined as the layer of air that is moving at less than 99% of the velocity of the main bulk air stream. In the low-gravity water separator 1100, the boundary layer may be approximately 0.5 inches. In some embodiments, the boundary layer may vary along the length of the helix structure 1104. The boundary layer may be thinner at the leading edge of the helix structure 1104 near the air inlet 1106. The boundary layer may increase until it exits the low-gravity water separator 1100. This natural viscous nature may provide a low velocity zone proximate the inner wall 1120 and may prevent the rivulet 1124 from being destabilized even when the bulk of the air is moving rapidly.

For example, the rivulet 1124 may continue to swell and the rivulet 1124 may press into a gas velocity stream and the air stream may force the coalesced water droplets 1122 in the rivulet 1124 down the interface between helix structure 1104 and inner wall 1120. This may cause a cross-section of the rivulet 1124 to shrink as the rivulet 1124 is elongated by the air stream. As more water droplets 1122 coalesce within the rivulet 1124, the rivulet 1124 may once again swell and repeat the process. The process may repeat as water droplets coalesce within the rivulet 1124 which may cause the rivulet 1124 to migrate toward the reservoir 1126.

Some water droplets 1122 may be driven efficiently to the rivulet 1124. Other water droplets 1122 may glide or move along the inner wall 1120 of the elongated tube 1102 or the upper surface 1116 of the helix structure 1104. In some embodiments, the water droplets 1122 may work their way into the rivulet 1124. In other embodiments, secondary vanes (e.g., secondary vanes 1008, FIG. 10) may also guide the water droplets 1122 to the rivulet 1124. In additional and/or alternative embodiments, helical vanes (not shown) may also guide water droplets 1122 to the rivulet 1124. Helical vanes may be similar to the secondary vanes but rather than being located on the inner wall 1120 of the elongated tube 1102, may be located on the upper surface 1116 of the helix structure 1104.

The rivulet 1124 may be a stable two-phase flow regime. For example, the rivulet 1224 may form a long connected 'string' of water along the interior corner of the intersection between the upper surface 1116 and the inner wall 1120 and may remain in that interior corner 1118. The flow of the air 1112 may help stabilize the rivulet 1124, but if the air flow exceeds, for example, about 36 feet per second, the speed of the air 1112 may disrupt the rivulet 1124. For example, the rivulet 1124 may experience stable two-phase flow when velocity of the air is not fast enough to pull water out of the rivulet 1124.

The decreasing interior angles $\alpha_1$, $\alpha_2$, $\alpha_3$ may also stabilize the rivulet 1124. The decreasing interior angles $\alpha_1$, $\alpha_2$, $\alpha_3$ may induce capillary forces in the water droplets 1122. The capillary forces may maintain stability of the rivulet 1124. The decreasing interior angles $\alpha_1$, $\alpha_2$, $\alpha_3$ also may provide a decreasing potential in the direction of a reservoir 1126 where the water droplets 1122 form a collective pool of water 1128.

The decreasing interior angles $\alpha_1$, $\alpha_2$, $\alpha_3$ may correlate to an increasing pitch of the helix structure 1104. As the rivulet 1124 is formed, the flow of the air 1112 may be slowed as the transitional pitch $p_2$ increases. The initial helical pitch $p_1$ may initiate a high air flow 1112 and the transitional pitch $p_2$ may slow down the air flow to, for example, about 18 feet per second for the size, shape, and range of flow rates typical for the embodiment shown in FIG. 7. The slower air speed in the transitional pitch $p_2$ may stabilize the rivulet 1124. The slower air speed may be less rapid axial flow. The less rapid axial air flow may drive the water droplets 1122 down the rivulet 1124 and into the reservoir 1126. The less rapid axial flow of the air 1112 may also allow droplet free air to escape the low-gravity water separator 1100. A gradual transition between the final pitch $p_3$ and the air outlet 1108 may maintain the air flow and may enable the droplet free air to be emitted.

Figure 12:
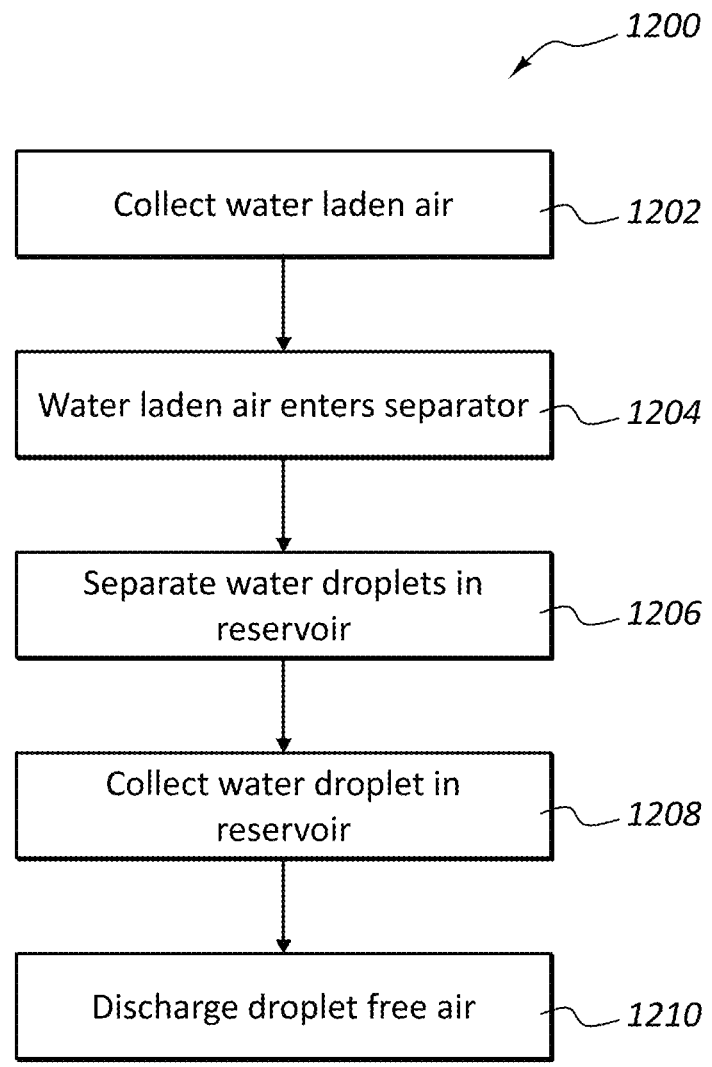
FIG. 12 is a flow diagram illustrating steps of an example method relating to low-gravity water capture devices.

FIG. 12 is a flow chart illustrating an example of a method relating to air and water separation, in accordance with various aspects of this disclosure. The method may include collecting droplet laden air 1202. The droplet laden air may enter a water separator 1204. The water separator may be a low-gravity water separator. Water droplets may be separated from air stream 1206. For example, a variable helix structure within the low-gravity water separator may use air flow and inertial forces to separate water droplets and air stream. The water droplets may be collected in a reservoir for harvesting 1208. The droplet free air may be emitted back into the environment or other system 1210.

Figure 13:
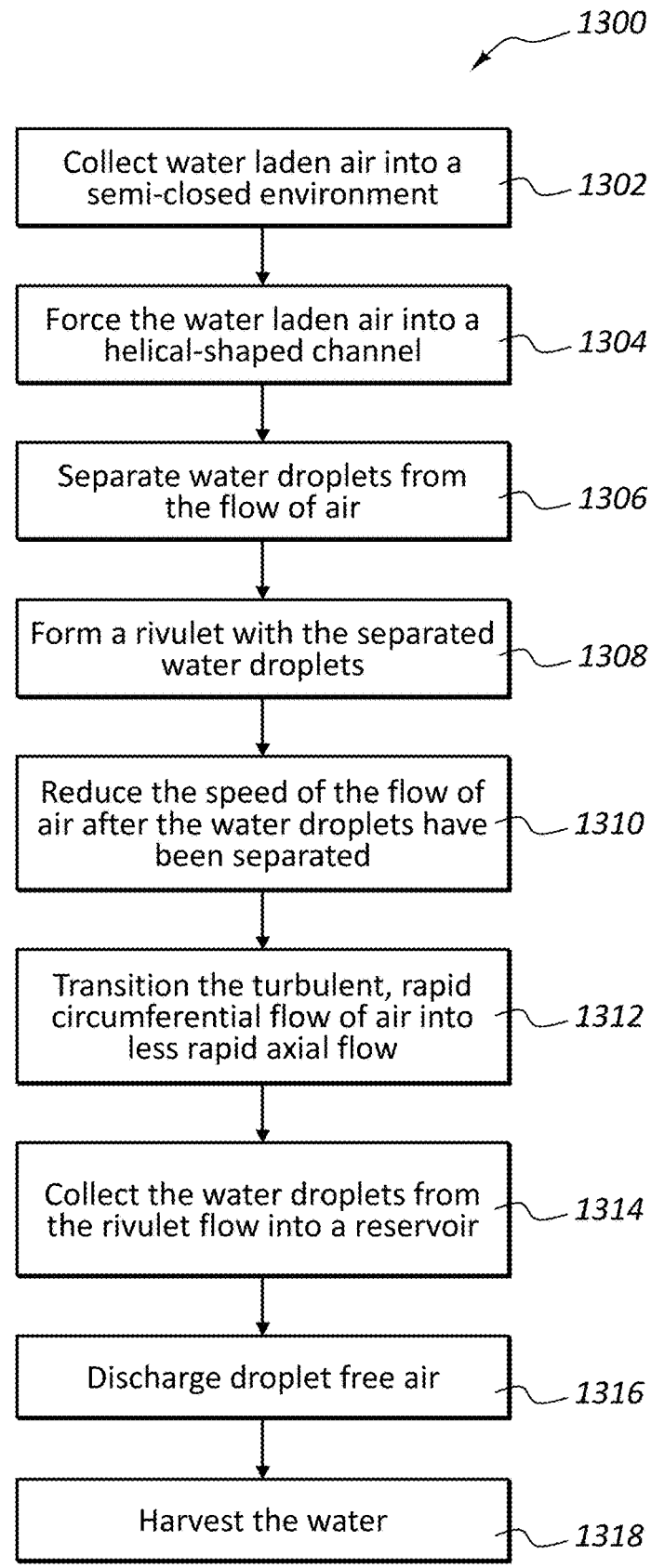
FIG. 13 is a flow diagram illustrating steps of an example method relating to low-gravity water capture devices.
Figure 14:
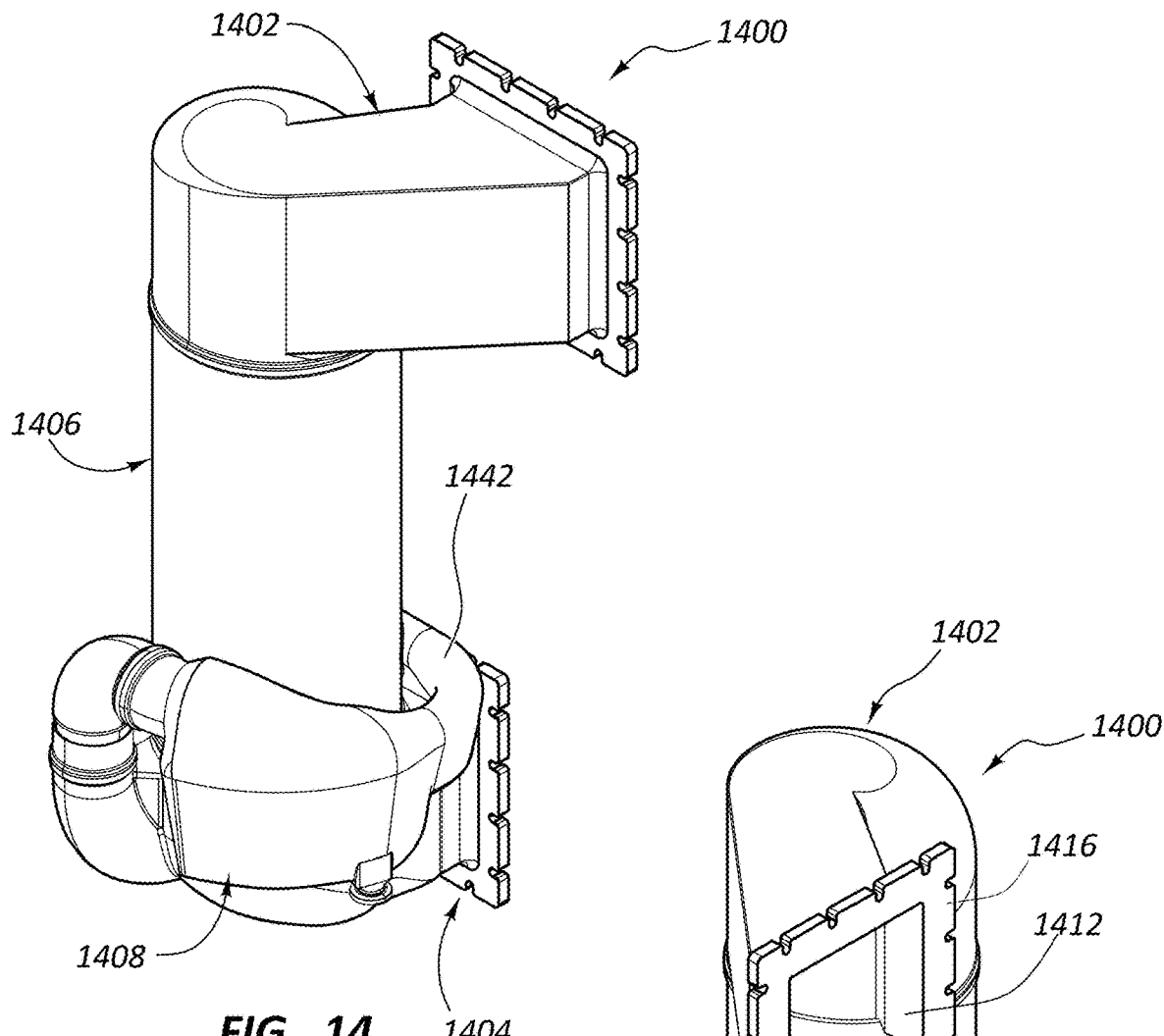
FIG. 14 is a top perspective view of another exemplary low-gravity water capture device in accordance with the present disclosure.
Figure 15:
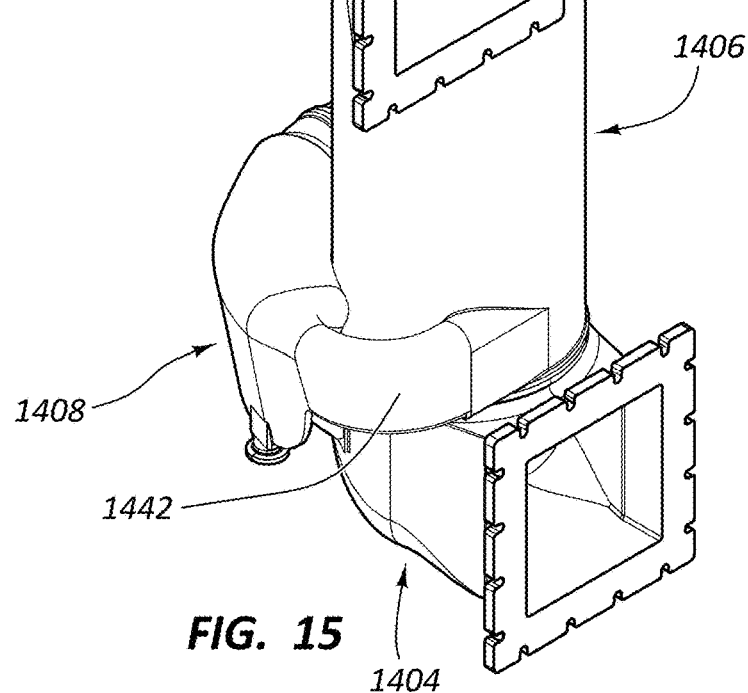
FIG. 15 is another top perspective view of the low-gravity water capture device of FIG. 14.
Figure 16:
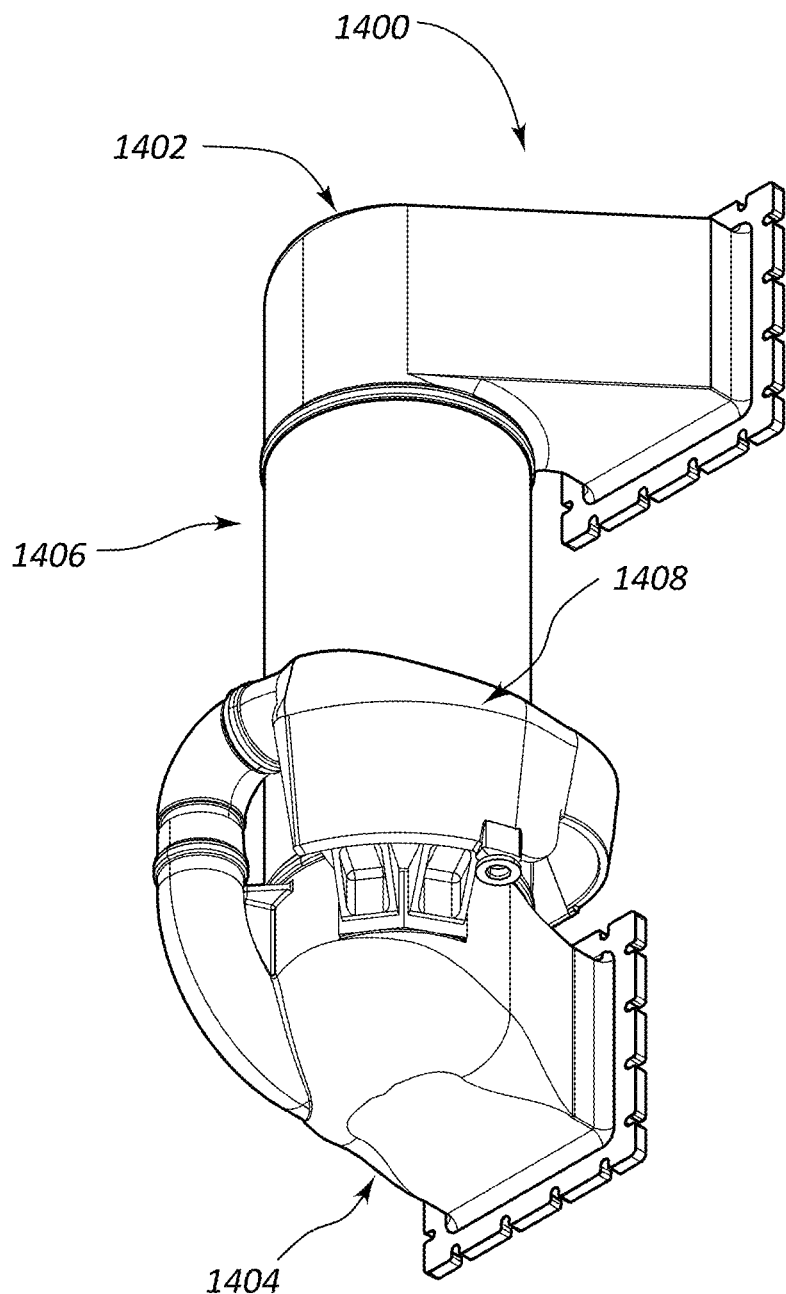
FIG. 16 is a bottom perspective view of the low-gravity water capture device of FIG. 14.
Figure 19:
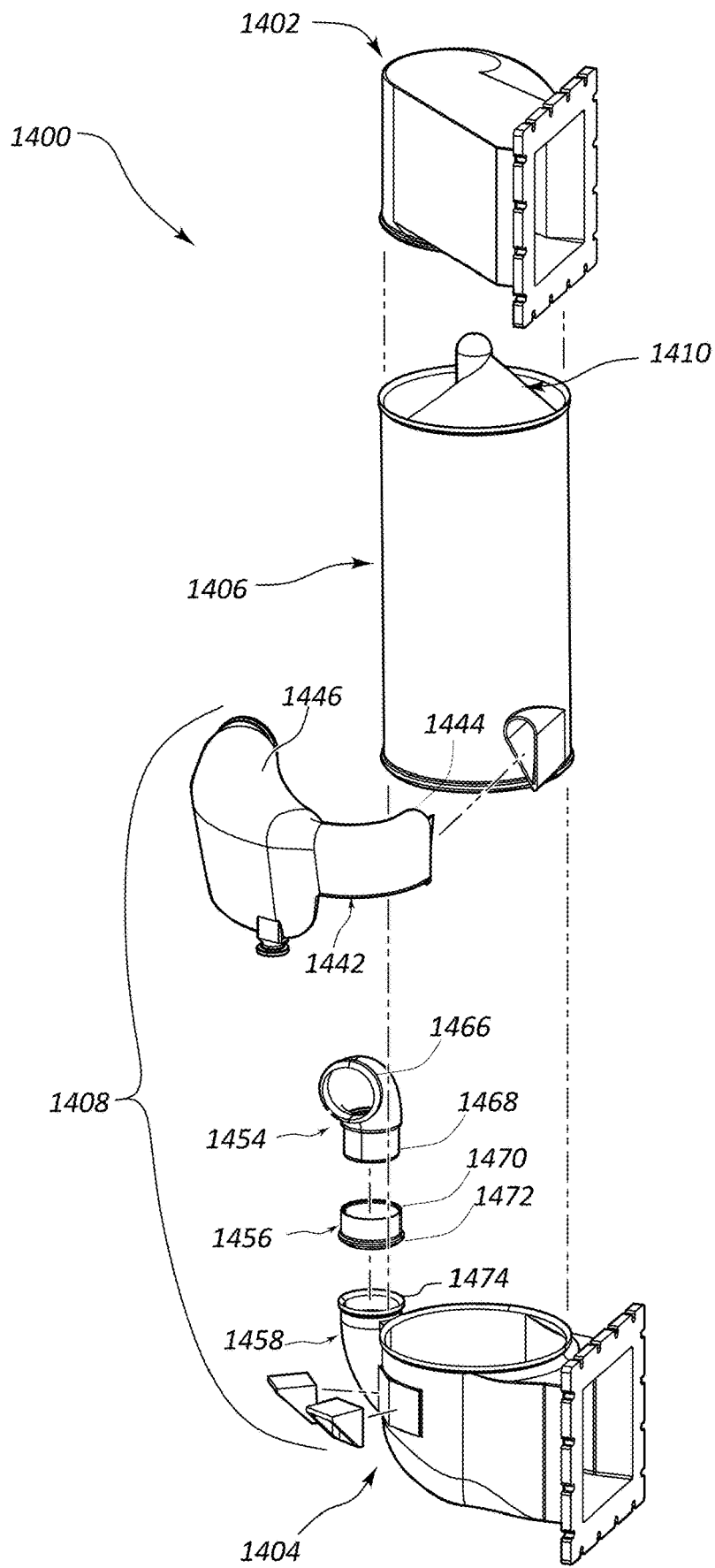
FIG. 19 is an exploded perspective view of the low-gravity water capture device of FIG. 14.

FIG. 13 is another flow chart illustrating an example of a method 1300 relating to air and water separation, in accordance with various aspects of this disclosure. The method 1300 may be performed using any one of the low-gravity water separators 102, 200, 600, 1000, 1100 discussed herein.

The method 1300 may collect water laden air into a semi-closed environment 1302. The water laden air may be forced into the semi-closed environment using a forcing function such as fan and/or gravity. The semi-closed environment may consist of a low-gravity water separator.

The method 1300 may force the water laden air into a helical-shaped channel 1304. The forcing function may cause a turbulent, rapid circumferential flow of the air. The helical-shaped channel may include a variable pitch along its length. The variable pitch of the helical shaped-channel may separate water droplets from the air stream 1306. For example, the air stream may contact one or more surfaces of the helical-shaped channel.

A rivulet may be formed with the separated water droplets 1308. The water droplets may be stabilized in the rivulet using the air stream. In some embodiments, one or more secondary vanes may guide separated water droplets towards the rivulet. The speed of the air stream may be reduced after the water droplets have been separated 1310. For example, the variable pitch of the helical-shaped channel may cause the air speed to decrease. This may cause the turbulent, rapid circumferential air stream transition into less rapid axial flow 1312. As the air flow slows, the flow may change from a cross-axial flow perpendicular to the axis of the low-gravity water separator 1100 into a streamwise flow parallel to the axis of the low-gravity water separator 1100. The water droplet from the rivulet flow may then be collected into a reservoir 1314. This may include guiding the streamwise driven rivulet flow into the water reservoir. The method 1300 may then discharge droplet free air 1316 and may harvest the water 1318 as necessary.

FIGS. 14-30 illustrate another example low-gravity water separator 1400. The low-gravity water separator 1400 may incorporate similar features as the low-gravity water separators 102, 200, 600 discussed above with reference to FIGS. 1-13. The low-gravity water separator 1400 may include various features to help stabilize the collected water within a reservoir portion of the device so that the amount of water that is drawn out of the device with the exiting air flow is minimized. For example, the low-gravity water separator 1400 may include unique water reservoir features (e.g., shape, size, and location), a helix structure shape and orientation, and air flow paths that provide stabilizing forces for the collected water. Other unique aspects of the low-gravity water separator 1400 relate to, for example, how various components of the device are assembled together during manufacturing, how airflow is controlled internal the device, and how collected water is directed into and stabilized within the water reservoir.

Figure 20:
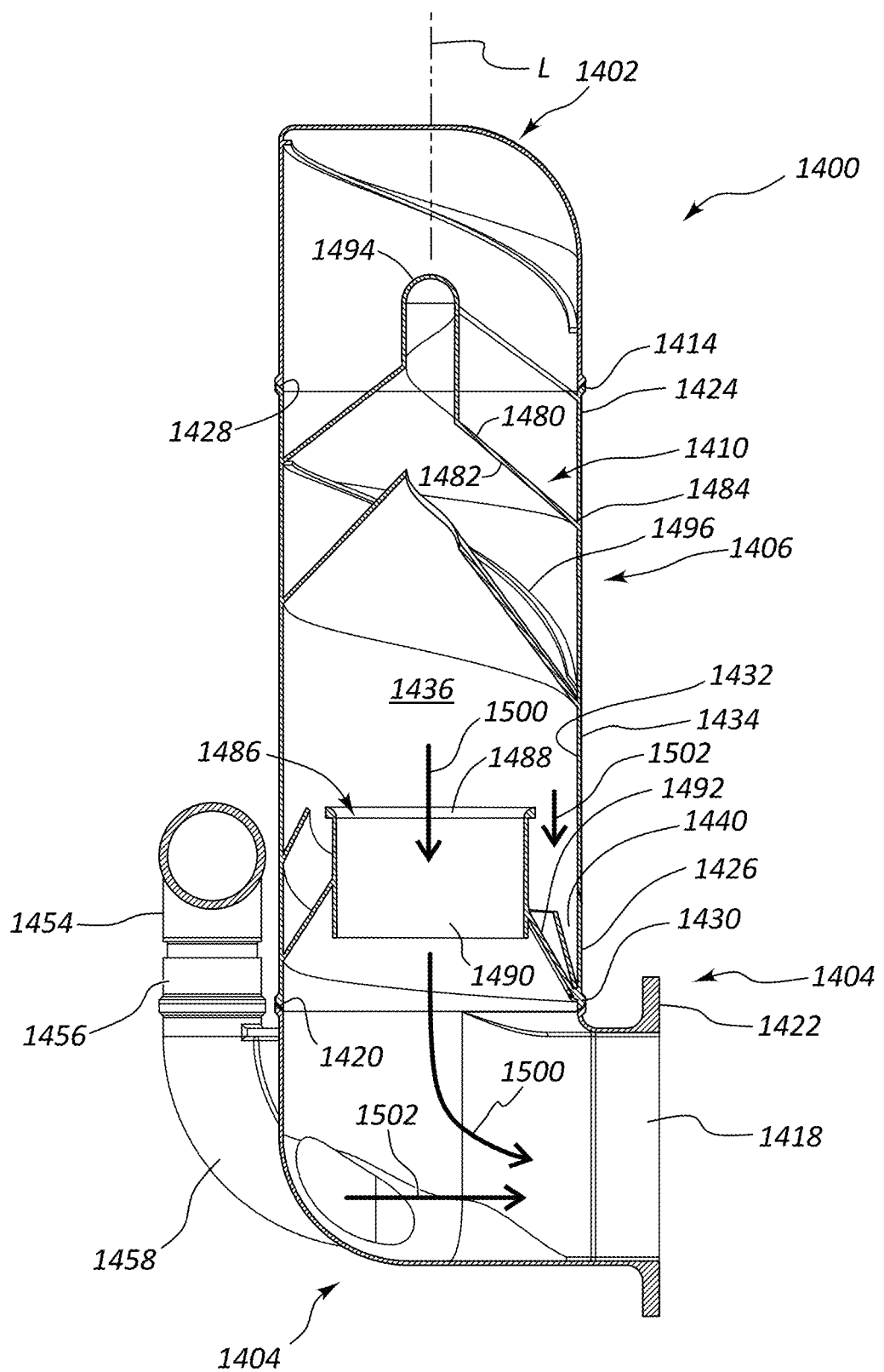
FIG. 20 is a cross-sectional view of the low-gravity water capture device of FIG. 17 taken along lines 20-20.

Referring to FIGS. 14-19, the low-gravity water separator 1400 includes an inlet structure 1402, an outlet structure 1404, an elongated tube 1406, a reservoir assembly 1408, and a helix structure 1410 (see FIG. 20). The inlet structure 1402 is mounted at one end of the elongated tube 1406, and the outlet structure 1404 is mounted to an opposite end of the elongated tube 1406.

The inlet structure 1402 includes an inlet opening 1412 surrounded by a flange 1416. The inlet structure 1402 also includes a seat 1414 that provides an interface with the elongated tube 1406. The outlet structure 1404 includes an outlet opening 1418 surrounded by a flange 1422. The outlet structure 1404 also includes a seat 1420 to interface with the elongated tube 1406. The inlet opening 1412 is arranged along a side surface and at a radially inward directed orientation relative to a longitudinal axis L. The inlet opening 1412 is also arranged offset from the longitudinal axis L. This offset radially inward directed arrangement for the inlet opening 1412 provides a tangential flow of air into the low-gravity water separator 1400. This tangential flow facilitates movement of the flow of air into the helical channel defined between the helix structure 1410 and an inner surface of the inlet structure 1402 and elongated tube 1406. The tangential arrangement for the inlet opening 1412 also allows the air to begin swirling droplets of water out of the air flow ahead of the entrance into the helical channel defined in part by the helix structure 1410. The swirling of the water droplets out of the air ahead of the helix structure causes the droplets to preferentially collide with the walls rather than the helix. Water droplets on the walls are more easily driven to the vertex and into the rivulet.

The outlet opening 1418 also extends radially relative to the longitudinal axis L. The inlet opening 1412 and outlet opening 1418 are arranged in the same direction, which may facilitate easier mounting to other features of the water separator system (e.g., system 100 described with reference to FIG. 1). In other embodiments, the inlet opening 1412 and outlet opening 1418 may be arranged facing in different radial directions, or in longitudinal direction, such as to accommodate the orientation of features to which the low-gravity water separator 1400 are mounted to.

The elongated tube 1406 includes first and second ends 1424, 1426, first and second seats 1428, 1430, an inner surface 1432, an outer surface 1434, and an internal cavity 1436 (see FIG. 20). The inlet structure 1402 is mounted to the first seat 1428 at the first end 1424. The outlet structure 1404 is mounted to the second seat 1430 at the second end 1426. The seats 1414, 1428 and 1420, 1430 may be formed as spherical structures or having a spherical portion and/or a contoured surface. For example, the seats may form segments of a sphere to allow slight misalignments of the axis of the inlet and outlet structures 1402, 1404 relative to the longitudinal axis L of the elongated tube 1406 to allow the inlet and outlet structures 1402, 1404 to align with the elongated tube 1406 even if the components 1402, 1404, 1406 have significant dimensional errors. Thus, the joints between the components 1402, 1404, 1406 may be able to accommodate relatively large dimensional errors inherent in some types of manufacturing (e.g., additive manufacturing). The spherical shape of the seats 1414, 1418, 1428, 1430 may provide three rotational degrees of freedom at the joints between the components 1402, 1404, 1406. This allows the flanges 1416, 1422 at the inlet and outlet to be relatively co-planer surfaces so that the interfaces when fastened to a main structure do not experience significant strains and may be able to provide a sufficient air- and water-tight seal. The presence of extra strain at the interface of the flanges to a mating structure resulting from a non-planer inlet and outlet orientation could result in damage to the final assembled low-gravity water separator 1400.

Other types of joint structures may be possible for assembling the components 1402, 1404, 1406, 1408 together. In some embodiments, at least some of the components 1402, 1404, 1406, 1408 may be integrally formed as single pieces rather than as separate pieces that are later assembled together. Some types of additive manufacturing (e.g., 3D printing) may facilitate creation of the components or combination of components of the low-gravity water separator 1400 as integral pieces in spite of the relatively complex interior geometries of the various features (e.g., the helical shape of helix structure 1410).

In another example, at least some of the components 1402, 1404, 1406, 1408 may be secured together with a bonding agent such as an adhesive. The components may be bonded by applying uncured resin or other adhesive material to the seats of the joint, following by curing the material using, for example, a suitable ultra-violet (UV) curing light. This method may be particularly useful for the present application because it can eliminate the need to certify additional materials and processes, which may be resourced intensive for items intended for certain applications (e.g., space flight).

Figure 22:
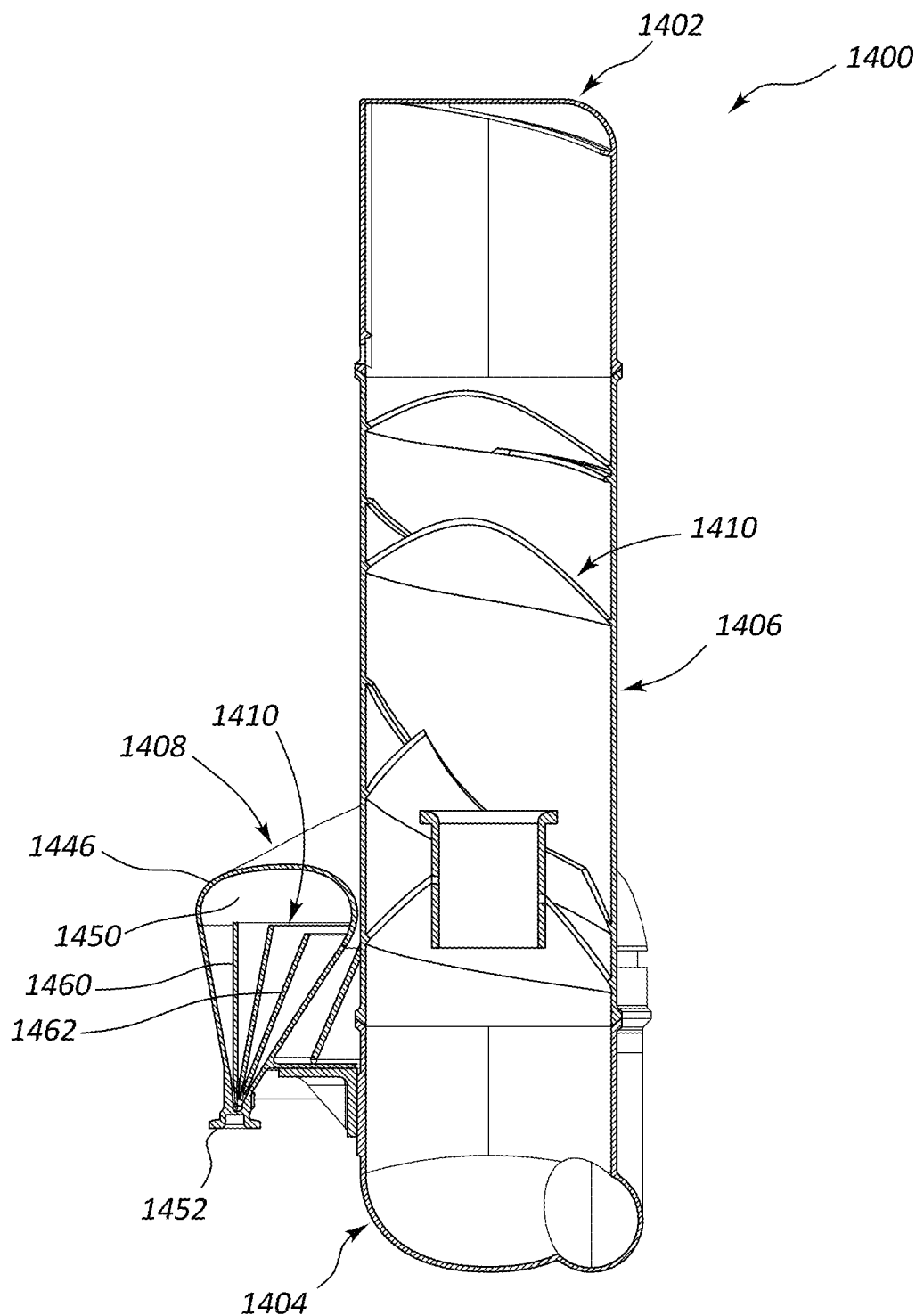
FIG. 22 is a cross-sectional view of the exemplary low-gravity water capture device of FIG. 18 taken along lines 22-22.
Figure 23:
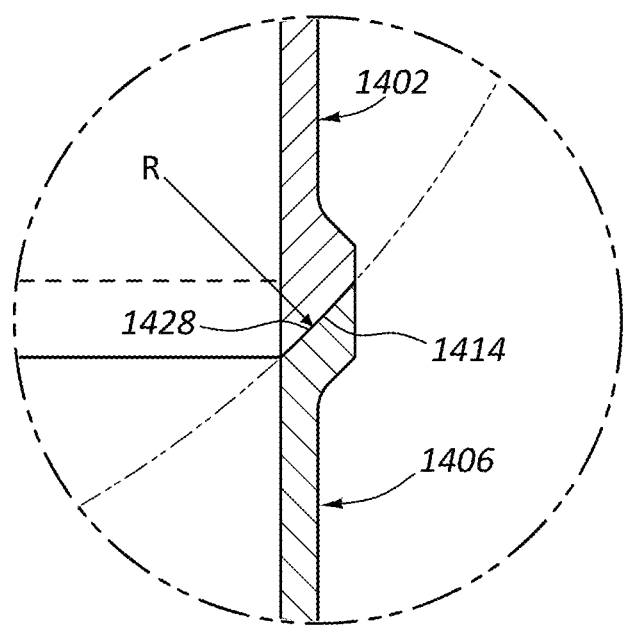
FIG. 23 is a close-up view of a joint between an inlet structure and elongated tube portion of the low-gravity water capture device of FIG. 14.

The reservoir assembly 1408 may include an inner reservoir 1440 (see FIG. 20), a reservoir outlet segment 1442 having a seat 1444 (see FIG. 19), a reservoir chamber 1446 (see FIG. 19), a chamber bottom 1448 (see FIG. 26), a chamber cavity 1450 (see FIG. 22), a water outlet 1452 (see FIG. 22), reservoir return segments 1454, 1456, 1458 (see FIG. 19), and a plurality of vanes 1460, 1462 (see FIG. 22). The return segment 1454 includes seats 1466, 1468. The return segment 1456 includes seats 1470, 1472. The return segment 1458 includes seats 1474. The seats 1466-1474 mate with each other and other components (e.g., the sidewall of elongated tube 1406 and the reservoir chamber 1446, etc.).

The inner reservoir 1440 is defined between the inner surface 1432 of the elongated tube 1406 and an interior cylinder 1486 that defines an outlet from the elongated tube 1406 into the outlet structure 1404. Water collected within the elongated tube 1406 gathers in the inner reservoir 1440 where it is directed through the reservoir outlet segment 1442 into the reservoir chamber 1446. A bottom surface of the inner reservoir 1440 is defined by a connecting helix 1492 that extends from the inner surface 1432 of the elongated tube 1406 to an outer surface of the interior cylinder 1486. The reservoir outlet segment 1442 opens directly into the inner reservoir 1440 through an opening defined in the wall of the elongated tube 1406. The helix structure 1410 may extend continuously from internal the elongated tube 1406, into the inner reservoir 1440, through the reservoir outlet segment 1442, and into the reservoir chamber 1446 (see FIGS. 21 and 22).

A plurality of additional vanes 1460, 1462 may also be positioned within the reservoir chamber 1446 as shown in FIG. 22. The position, size, and angle between vanes 1460, 1462 may be designed to stabilize the water based on Weber number, as described above related to separator 200, 600. Furthermore, the angle θ between the vanes (~10 degrees, shown in FIG. 27B) helps to promote passive bubble separation, in the event that bubbles appear, as a result of a disturbance. The position, size and angle of the vanes 1460, 1462 can also be used to remove bubbles form liquid output system 124 (i.e., if bubbles are present, liquid can be pumped back into the reservoir, and the capillary forces with these vane angles will cause the bubbles to leave the liquid). The bubbleless liquid can then be recovered from the reservoir back to the liquid output system 124 shown in FIG. 1. These features and functionality may be applicable for all the reservoir designs disclosed herein.

Figure 27A:
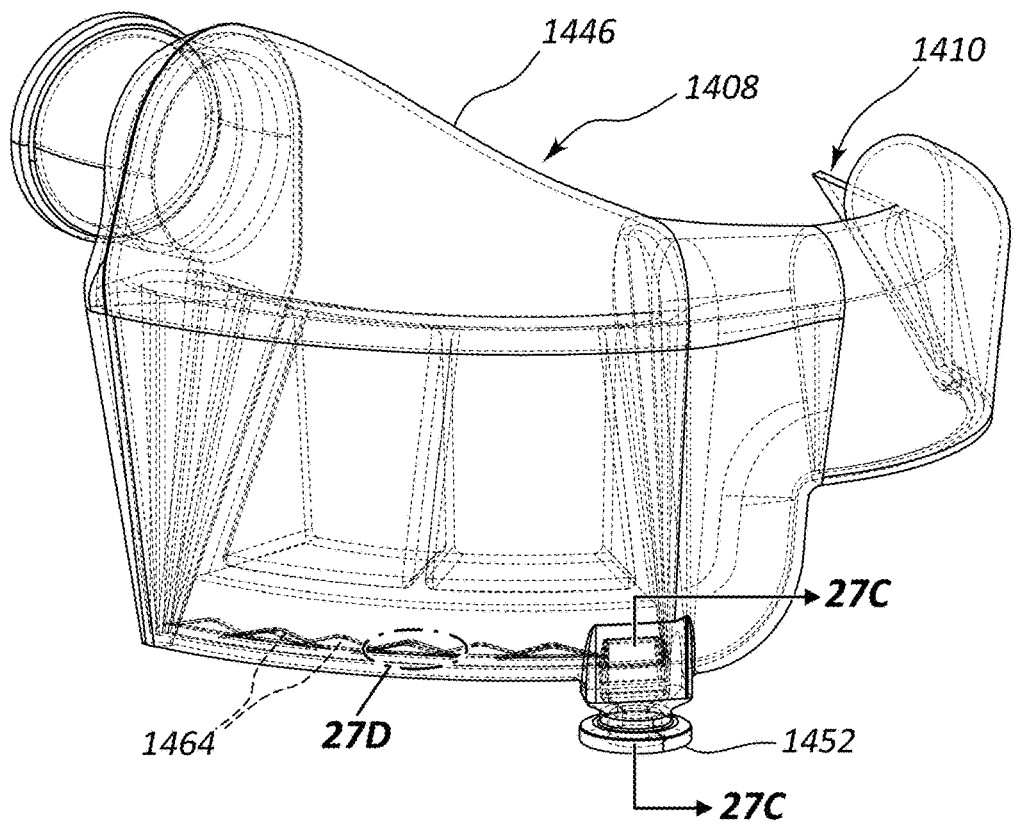
FIGS. 27A-27D illustrate vias formed internal the reservoir component of the low-gravity water capture device of FIG. 26.
Figure 27B:
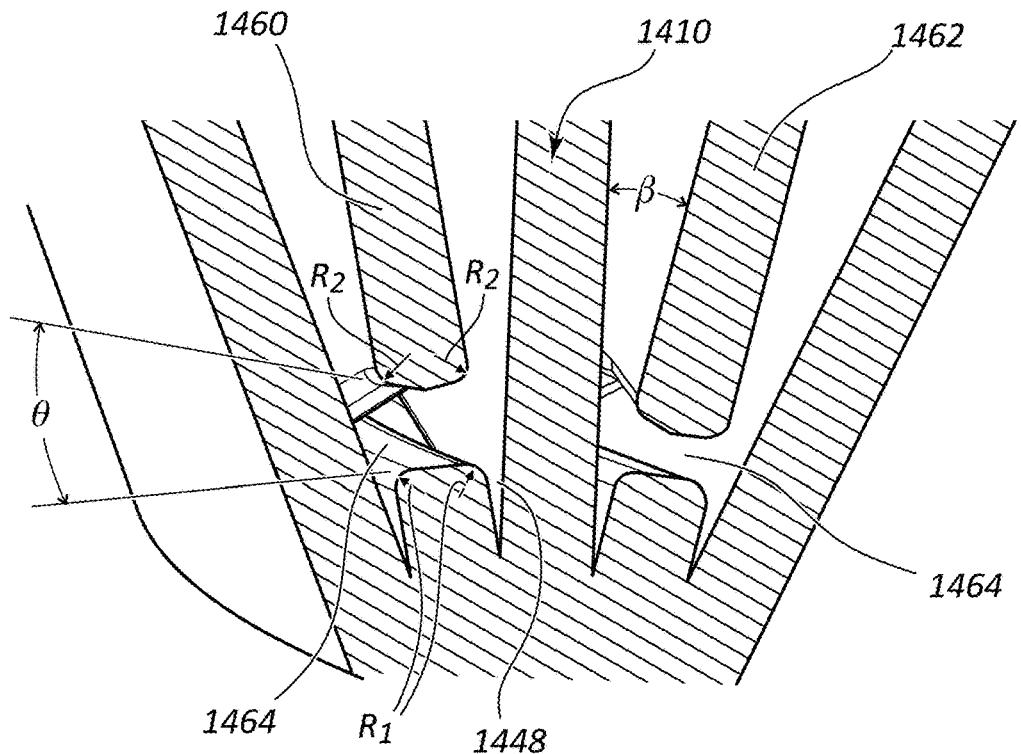

Vias 1464 may be formed in the vanes 1460, 1462 and the portion of the helix structure 1410 positioned within the reservoir chamber 1446 as shown in FIGS. 27A and 27B. The vias 1464 may be offset relative to each other along the length of the vanes 1460, 1462 and helix structure 1410. The offset vias may also be spaced apart from the water outlet 1452. This arrangement for the vias may improve stability of the water through the water outlet 1452 and between the vanes 1460, 1462 and helix structure 1410 within the reservoir chamber 1446 along the chamber bottom 1448 by preventing water from pulling away from the via due to the larger vertex angle if the via were to overlap or coincide on adjacent vanes.

FIG. 27B shows the edges of the vias 1464 being radiused or contoured. The radii $R_1$, $R_2$ of the vias 1464 may help eliminate pinning edges, which could prevent liquid (e.g., water) from entering the vias 1464. The radii $R_1$, $R_2$ may provide a smoother and/or open path through the respective vane 1460, 1462 and helix structure 1410 through in which the vias 1464 are formed. Further, an angle θ from a center of each via 1464 may be provided to assist with directing air bubbles from the vias 1464 into spaces between the vanes 1460, 1462, helix structure 1410, and internal walls of the reservoir chamber 1446.

Figure 27C:
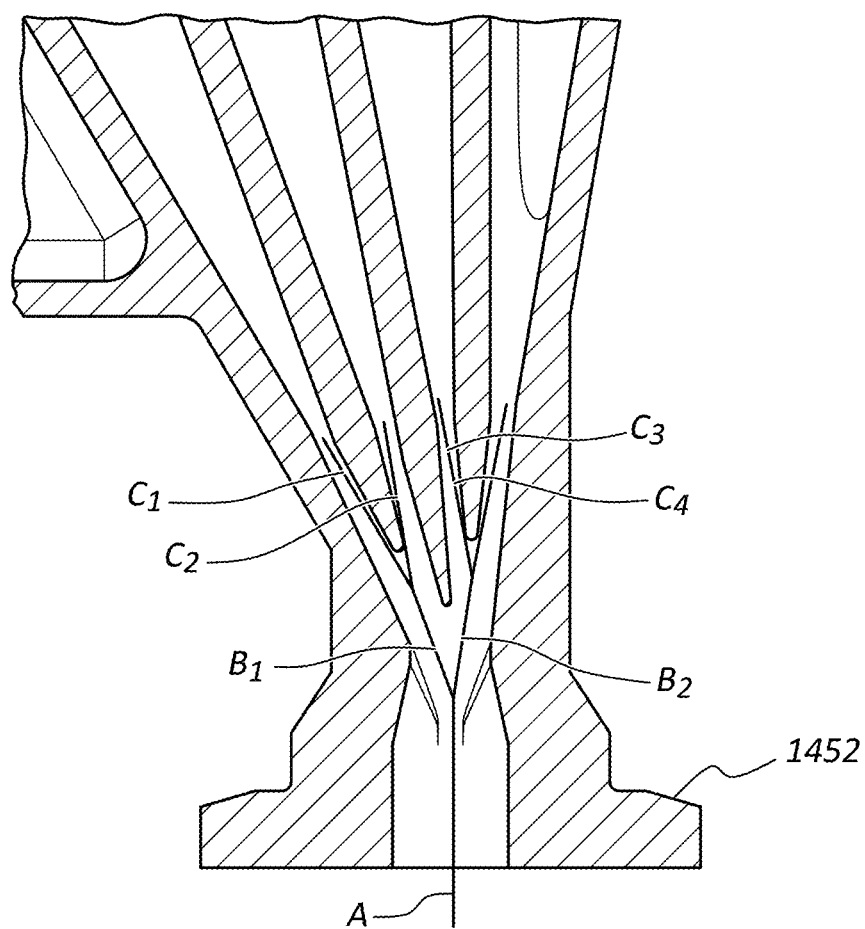
Figure 27D:
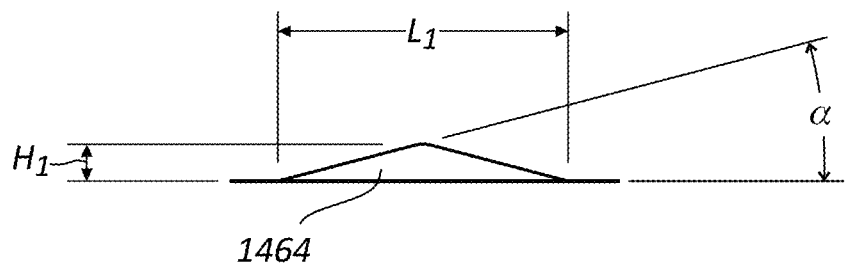

FIG. 27D shows a side view of one of the vias 1464. The vias 1464 may have a length $L_1$ and a height $H_1$, and have an acute angle α. The length $L_1$ may, in some embodiments, be in the range of about 0.5 in. to about 2 in., and more particularly about 1 in. The height $H_1$ may, in some embodiments, be in the range of about 0.1 in. to about 0.5 in., and more particularly about 0.125 in. The angle α may, in some embodiments, be in the range of about 10 degrees to about 30 degrees, and more particularly about 15 degrees.

Figure 28:
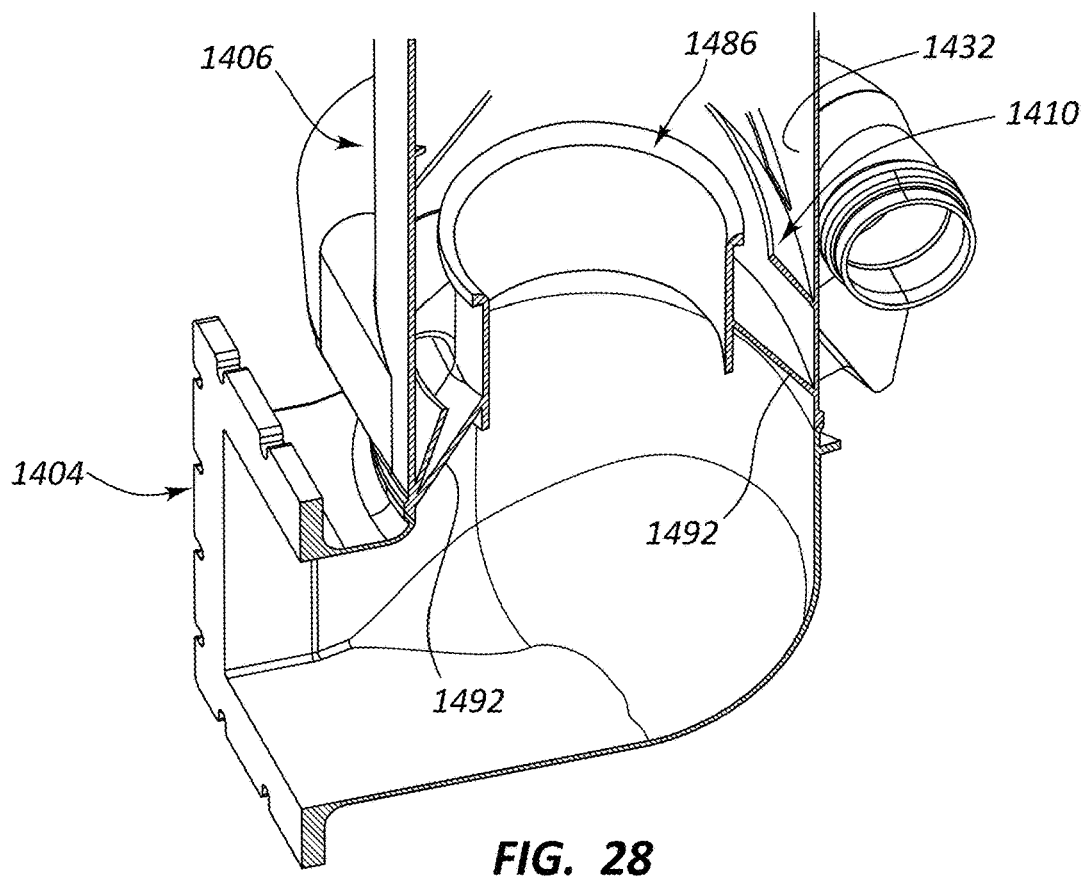
FIG. 28 is a cross-sectional perspective view of a portion of the low-gravity water capture device of FIG. 14.

The connecting helix 1492 may have a helical shape as shown in FIG. 28. This helical shape may assist with capturing and directing wall-bound water droplets that are not captured by the main helix structure 1410 toward the reservoir outlet segment 1442. Like the main helix structure 1410, the connecting helix 1492 may form an acute angle between the inner surface 1432 of the elongated tube 1406. The size of the acute angle may change as the connecting helix 1492 approaches the reservoir outlet segment 1442.

Figure 24A:
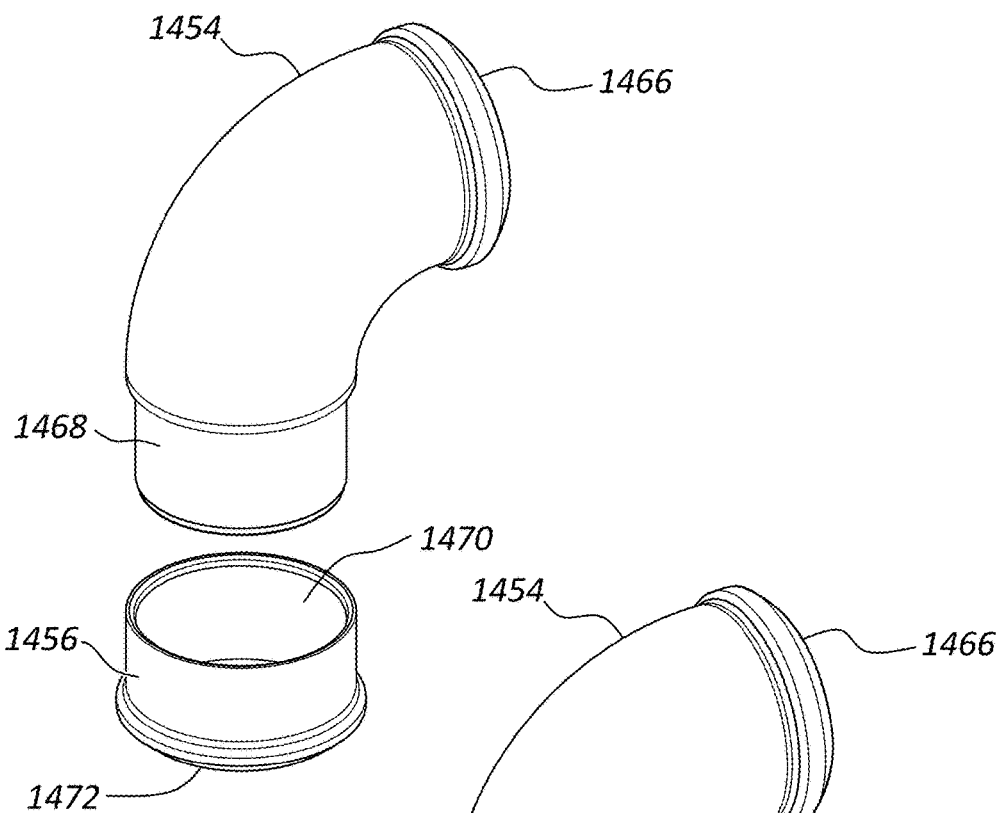
FIGS. 24A-24C are perspective views showing assembly of reservoir return segments of the low-gravity water capture device of FIG. 14.
Figure 24B:
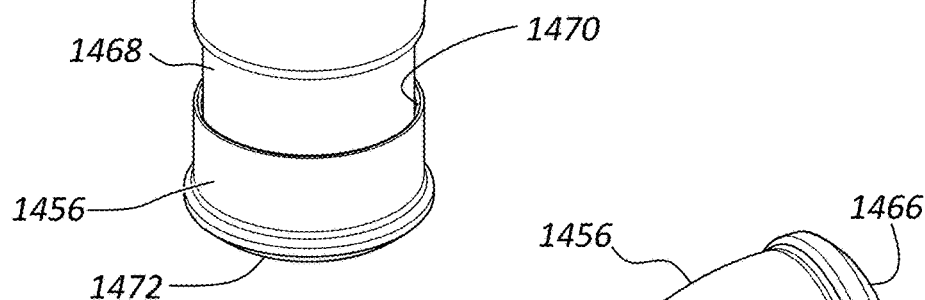
Figure 24C:
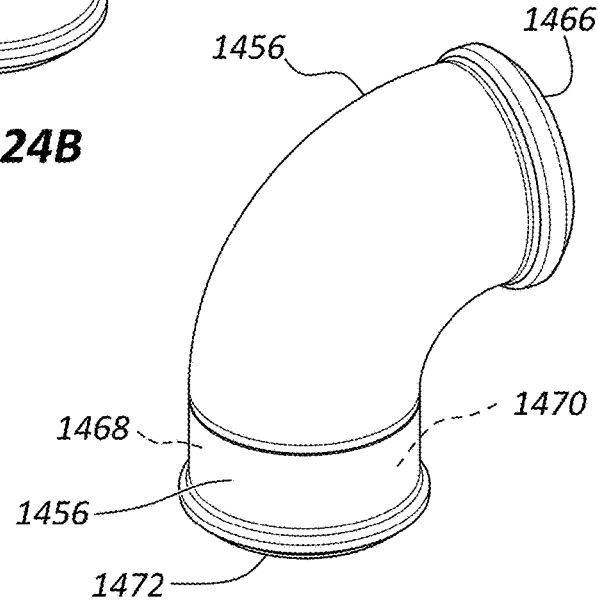
Figure 25:
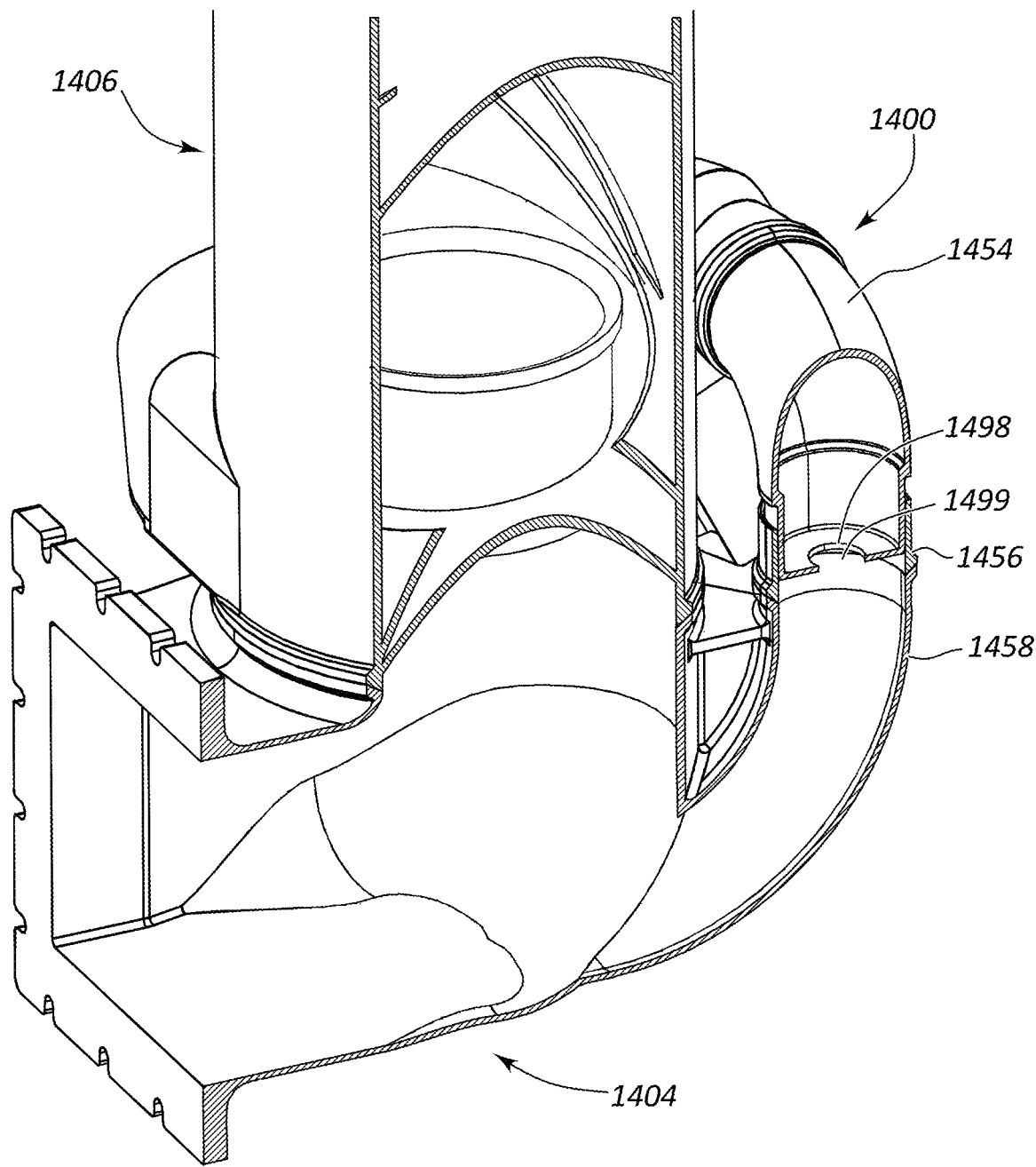
FIG. 25 is a partial cross-sectional view of the low-gravity water capture device of FIG. 15 showing a return orifice plate.
Figure 26:
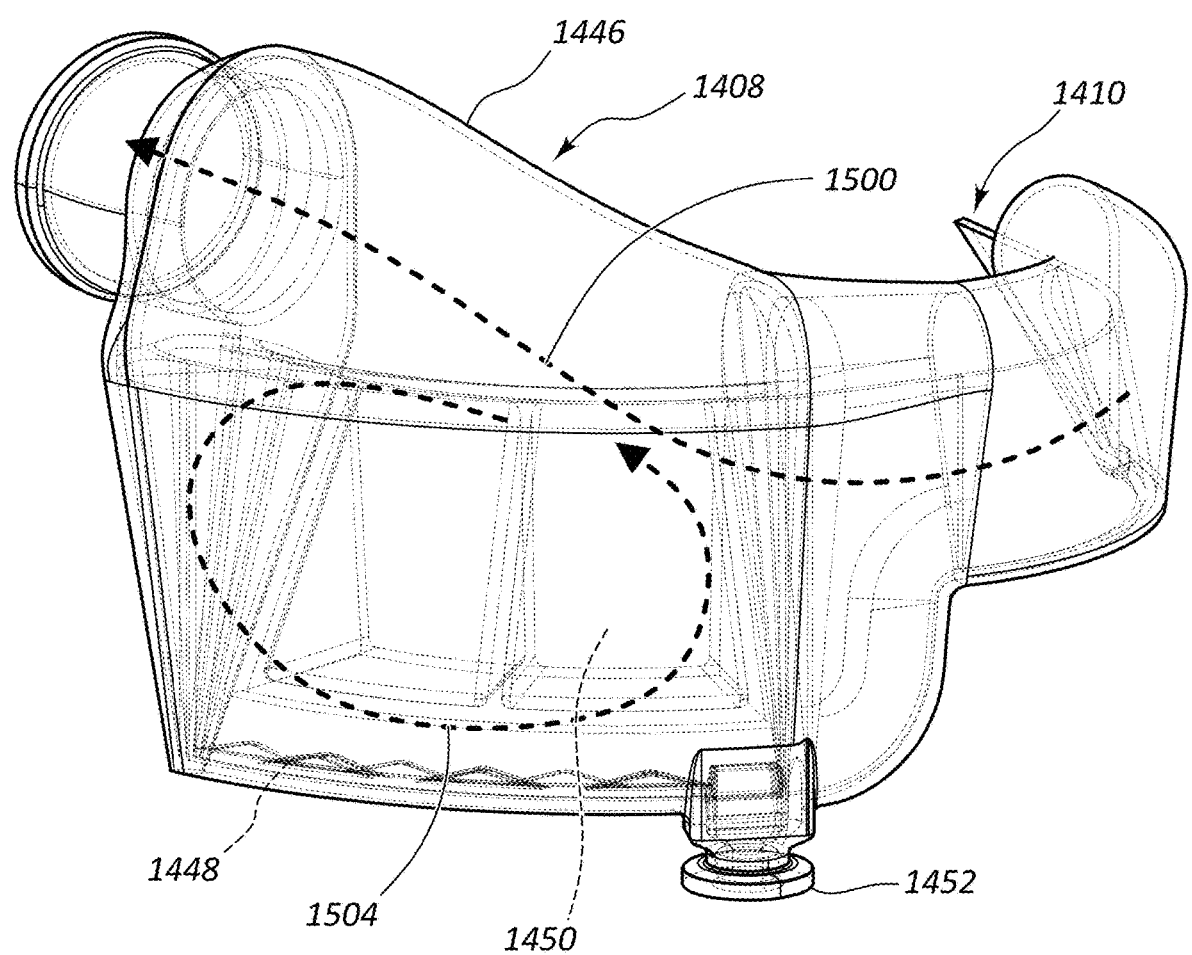
FIG. 26 shows fluid flow within a reservoir component of the low-gravity water capture device of FIG. 14.

The reservoir return segments 1454, 1456, 1458 may provide an air flow path from the reservoir chamber 1446 back into the main body of the low-gravity water separator 1400 in the outlet structure 1404. The seats 1466-1474 of the return segments 1454, 1456, 1458 may provide a slip joint or other connection that provides some translational flexibility required in the reservoir return tube between the slip joint and the spherical cut ends defined by the seats 1466-1474 to help maintain an improved alignment between the helix structure 1410 that passes from the inner reservoir 1440, through the reservoir outlet segment 1442, and into the reservoir chamber 1446. The size and shape of the seats 1466-1474 may be designed specifically to allow adjustability in both axial and radial placement of the reservoir assembly 1408 relative to the elongated tube 1406 and helix structure 1410, as well as the outlet structure 1404 relative to the elongated tube 1406 and the reservoir assembly 1408. The construction of the seats 1466-1474 may help preserve the ability to more ideally align the helix structure while still securing the components of the reservoir assembly 1408. FIGS. 24A-24C illustrate assembly of reservoir return segments 1456, 1458 with a slip joint. Other types of joints and connection features are possible to provide the desired adjustability for the assembly of various components of low-gravity water separator 1400.

The reservoir chamber 1446 may include an enlarged portion along the bottom end thereof that provides for re-circulated flow 1504. The re-circulated flow 1504 is outside of a first flow path 1500 for air flow passing from the reservoir outlet segment 1442 to the reservoir return segments 1454, 1456, 1458. The re-circulated flow 1504 may involve a sudden drop off area that causes an air velocity profile to separate from the vertex, thereby leaving a calm zone immediately above the water outlet 1452. The recirculation flow pattern may be set up by drop off and air exit placement. The recirculation sweeps downstream water back towards the water outlet 1452 to a stagnation zone formed by the opposing stream lines 1500, 1504. Generally, the dramatic change in depth of the reservoir chamber 1446 may be referred to as a reservoir boundary layer separator and may cause an air boundary layer in the vertex to largely separate from the vertex as the air passes over the sudden drop off area. This causes a low velocity zone immediately downstream of the drop off where the liquid is especially stable. Additionally, the boundary layer separation promotes a re-circulated flow 1504 that causes air flow streamlines to collide from opposite directions, which forms a stagnation zone. This creates an air flow pattern that sweeps water into this dead zone from upstream and downstream, which makes it a more ideal location for the water outlet 1452.

The reservoir assembly 1408 may include features that assist in controlling air flow through the air reservoir assembly 1408. For example, an orifice plate 1498 may be positioned in one or more of the reservoir return segments 1454, 1456, 1458. The orifice plate 1498 may be used to control proper reservoir air flow for a given overall design flow rate. For example, the orifice may be sized such that the air flow velocity in the reservoir is slow enough to maintain a stable reservoir (i.e., the water collected in the reservoir remains stable), even when the overall device volumetric flow is at its design point. The orifice plate 1498 may be replaceable with orifice plates having different sized orifices to provide the size adjustability. In other embodiments, a single orifice plate may have an adjustable sized opening that is adjustable from exterior of the reservoir assembly 1408. Some of the reservoir assembly 1408 may include multiple orifice plates 1498 at locations before or after the reservoir chamber 1446, or multiple orifice plates within the return channel defined by the reservoir return segments 1454, 1456, 1458.

Figure 29:
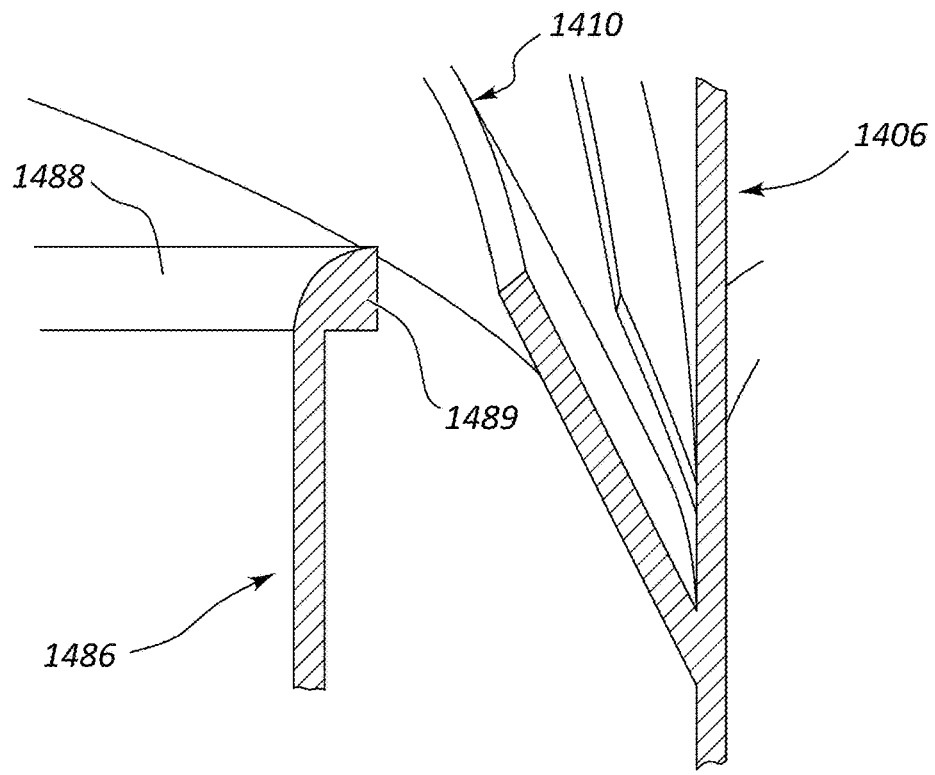
FIG. 29 is a close-up view of the cross section of the exemplary low-gravity water capture device shown in FIG. 28.

Water collected in the inner reservoir 1440 may be inhibited from moving out through the interior cylinder 1486 and out through the outlet structure 1404 by features provided on the interior cylinder 1486. Any water that ends up inside the interior cylinder 1486 is lost and represents failure of primary function for the low-gravity water separator 1400. Water droplets positioned on the outer wall of the interior cylinder 1486 may be prevented from traveling up the wall and over the top edge at the proximal end of the interior cylinder 1486 by a lip 1489, as shown in FIG. 29. The lip 1489 may protrude radially outward from the exterior surface of the interior cylinder 1486. The lip 1489 may include an interior angle on the outside of the interior cylinder 1486 near the top proximal edge. Alternatively, the lip 1489 may be positioned further along the length of the interior cylinder 1486 in a distal direction spaced away from the proximal edge and inlet opening 1488. Water being driven up the outside surface of the interior cylinder 1486 will encounter this lip 1489 to be prevented from migrating over the top edge and through the opening 1488 where it can escape through the outlet opening 1490.

The helix structure 1410 may include an upper surface 1480, a lower surface 1482, and an outer edge 1484, as shown in FIG. 20. An inlet cap 1494 may be positioned at the upper end of helix structure 1410 near the inlet opening 1412 (see FIG. 20). The helix structure 1410 may have a variable pitch along its length as described above with reference to low-gravity water separators 102, 200, 600. Generally, the helix structure 1410 may have many of the same or similar features and functionality of the other helix structures described with reference to FIGS. 1-13.

Figure 21:
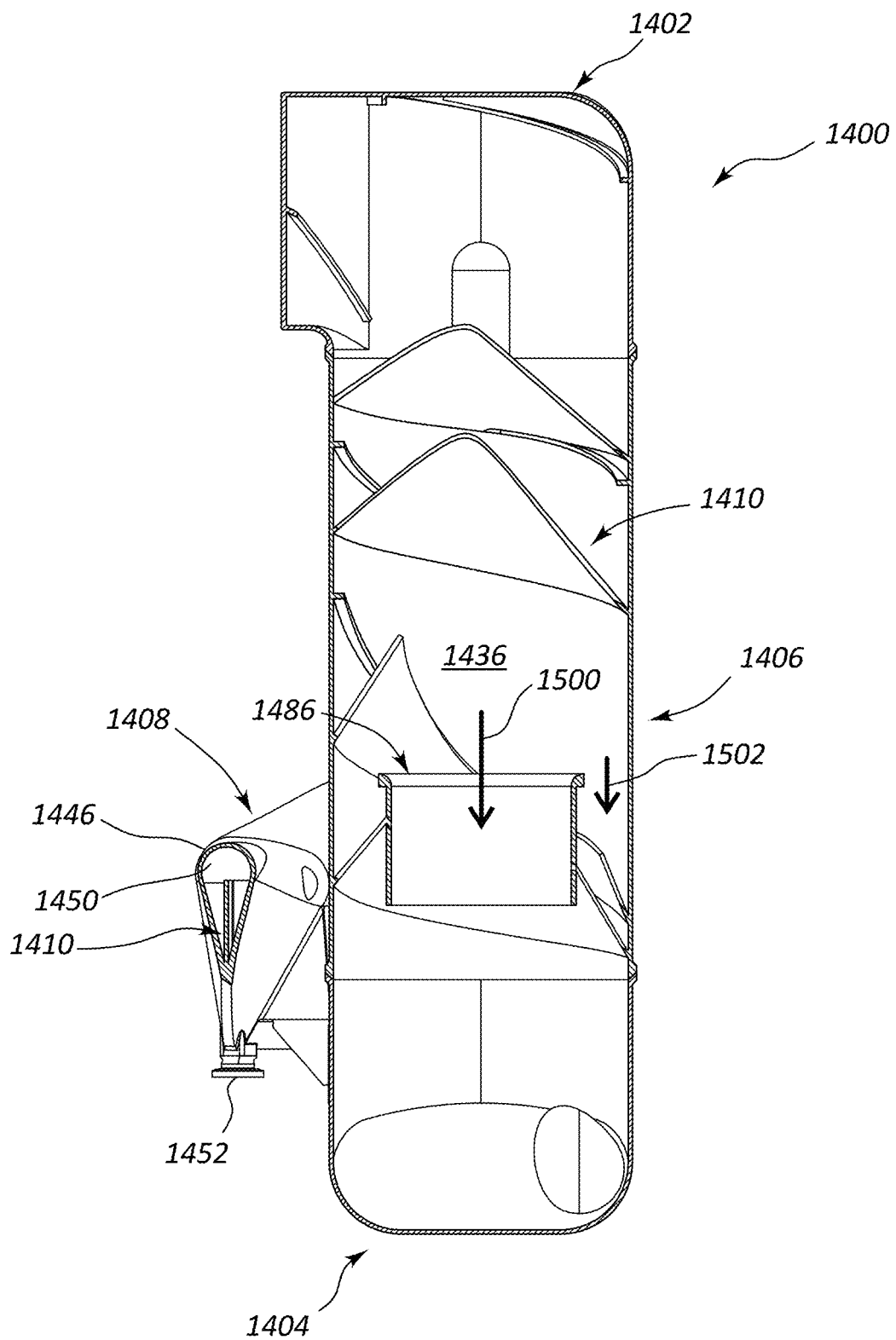
FIG. 21 is a cross-sectional view of the exemplary low-gravity water capture device of FIG. 18 taken along lines 21-21.

The helix structure 1410 may extend continuously through the inner reservoir 1440, through the reservoir outlet segment 1442, and into the reservoir chamber 1446, as shown in FIGS. 20-22. The helix structure 1410 may define a reservoir vane and provide a single connective capillary path between the inlet of the helical channel open to the inlet opening 1412 where the swirl and separation of water droplets happens, and the bottom of the reservoir chamber 1446. Additionally, the helix surface and surface of the reservoir vane may be completely enveloped into the secondary annular water pick-up area between the interior cylinder 1486 and the interior wall or inner surface 1432 of the elongated tube 1406 at an entrance to the reservoir component positioned external to the elongated tube 1406.

Figure 30:
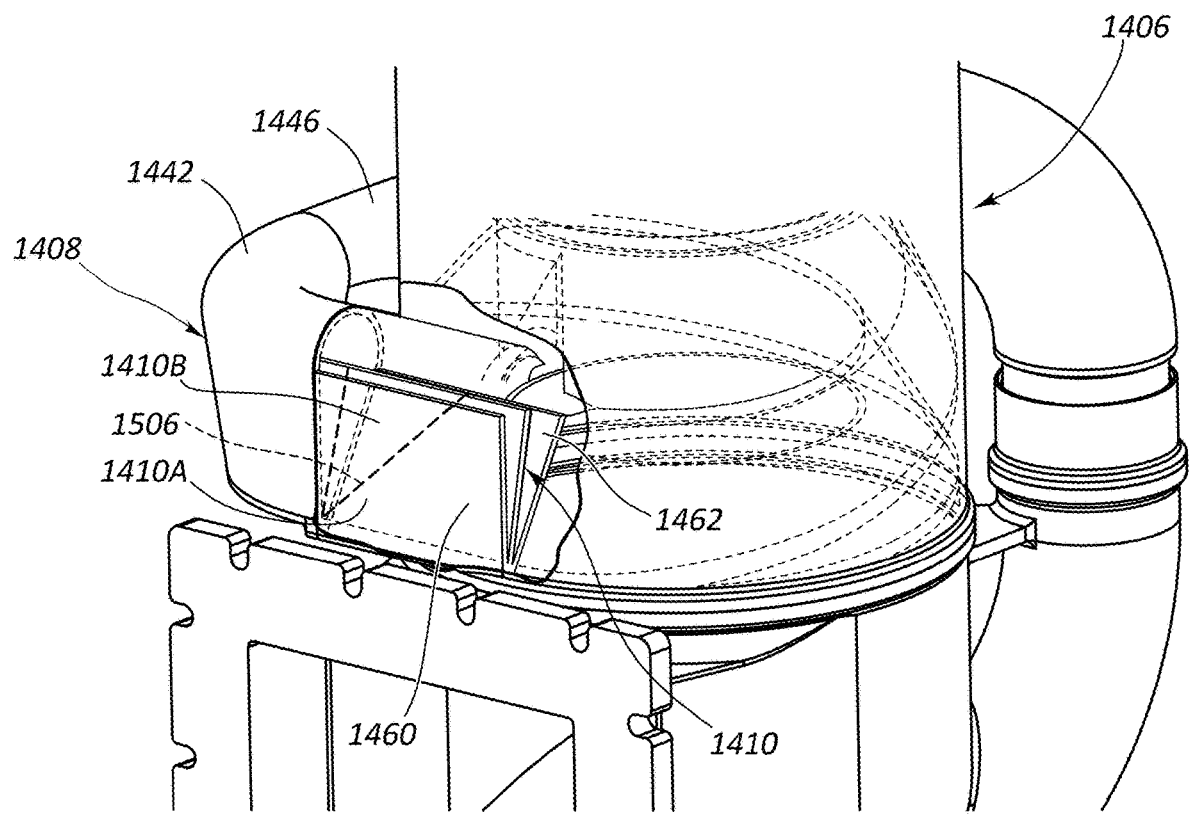
FIG. 30 is a perspective view of a portion of the exemplary low-gravity water capture device shown in FIG. 14.
Figure 33:
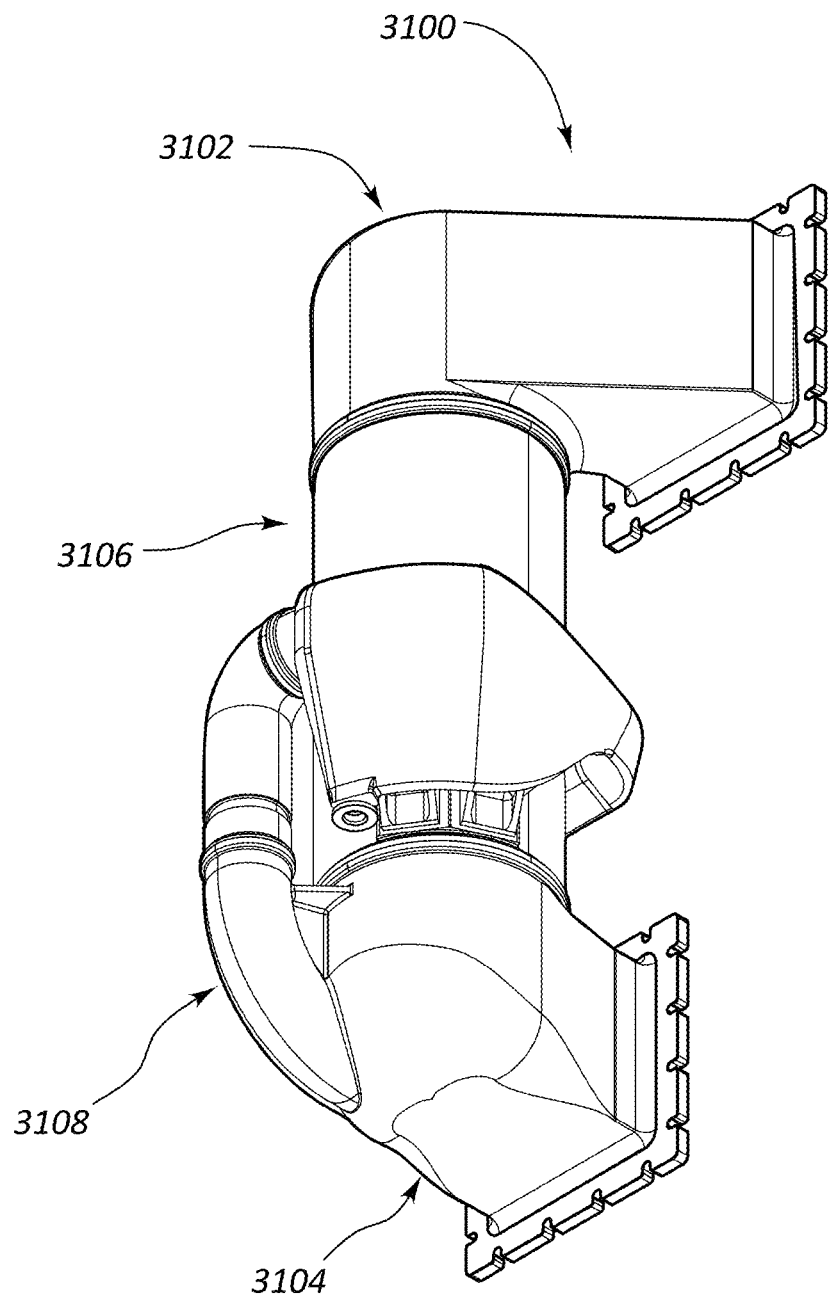
FIG. 33 is a bottom perspective view of the low-gravity water capture device of FIG. 31.
Figure 35:
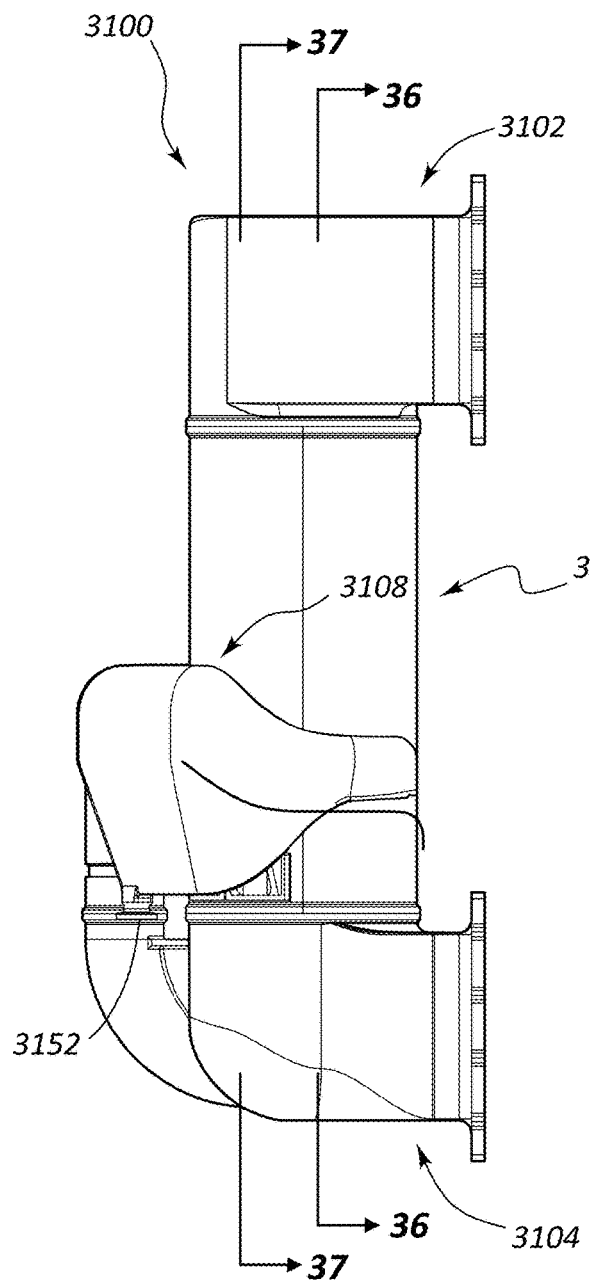
FIG. 35 is a side view of the low-gravity water capture device of FIG. 31.
Figure 34:
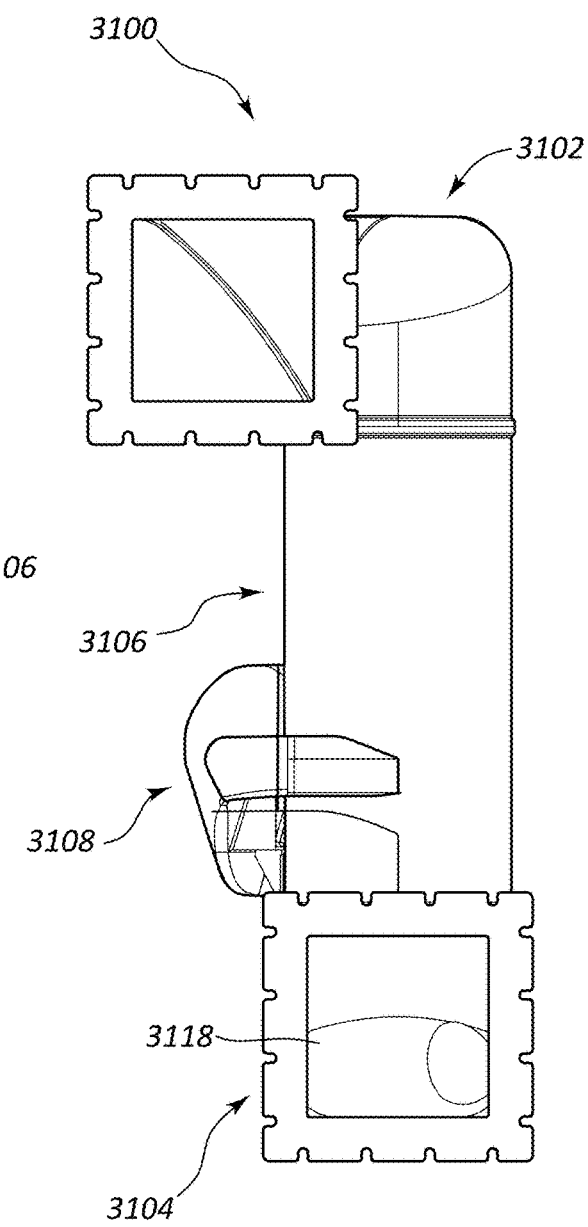
FIG. 34 is a front view of the low-gravity water capture device of FIG. 31.

The helix structure 1410 may be divided into different segments along its length. For example, the low-gravity water separator 1400 may be divided into different components (e.g., components 1402, 1404, 1406, 1408), and the helix structure 1410 may be divided into segments 1410A, 1410B at the interface between the elongated tube 1406 and the reservoir assembly 1408, as shown in FIG. 30. This interface may be an angled interface 1506. The angled surface joint at interface 1506 may provide a pinning edge that stray droplets on the surface of the helix structure 1410 will encounter. The stray water droplets on the helix surface will typically migrate along the helix surface without moving towards the vertex. The interface 1506 (also referred to as a joint) in the helix surface may be angled such that when droplets encounter the interface 1506 and pin to its edge, the air flow will drive the droplets along the pinning edge toward the vertex where it will be carried into the main rivulet in the chamber bottom 1448. Thus, the interface 1506 may provide both an interface or connection point between segments 1410A, 1410B of the helix structure, as well as provide a feature to help direct the water droplets to the primary rivulet for collection within the reservoir chamber 1446.

In other embodiments, the helix structure 1410 may be formed as a single unitary piece along its entire length, such as when the entire low-gravity water separator 1400 is formed from an additive manufacturing method, or at least the elongated tube 1406, reservoir assembly 1408 and helix structure 1410 are formed integrally as a single piece. A pinning feature, groove, vane or similar feature may be formed in the helix structure 1410 to mimic the interface 1506. Other types of joints may be used in other embodiments for connecting various segments of the helix structure 1410 to each other. In one example, UV curable material may be used to provide a positive connection between the helix segments 1410A, 1410B, or other segments or portion of the helix structure.

The water outlet 1452 may join the spaces between the vanes 1460, 1462 together to draw water evenly from each channel within the reservoir chamber 1446, as shown in the cross-sectional view of FIG. 27C. The channels within reservoir chamber 1446 (e.g., those channels defined between the vanes 1460, 1462, the helix structure 1410, and walls of the reservoir chamber 1446) are joined together in a manner such that only two flow paths are joined together at a time. Flow path bifurcation promotes even distribution of flow, whereas joining three or more paths together simultaneously can cause uneven flow distribution. FIG. 27C shows flow paths $C_1$, $C_2$ joining to form flow path $B_1$, flow paths $C_3$, $C_4$ joining to form flow path $B_2$, and flow paths $B_1$, $B_2$ joining to form flow path A, which then exits out of the water outlet 1452.

The water outlet 1452 may have different shapes, sizes and connecting features based on a number of criteria, such as the device to which the water outlet 1452 is to be connected. While any number of fitting choices were available to connect to the water outlet 1452, such as numerous standard tapped thread styles or an integrally printed barb fitting, a fitting geometry for water outlet 1452 consisting of a flanged double o-ring face seal may be selected that is compatible with a commercial KF style vacuum fitting clamp. A KF style vacuum clamp may help eliminate the need to do any post machining of threads required for other types of connection. the KF style clamp may also provide a quick and secure connection that does not involve transfer of any appreciable torque or force to the rest of the low-gravity water separator 1400, for example, during installation or removal of a liquid drain line from the water outlet 1452. This means there is a reduced risk of damaging the hardware by, for example, over tightening a threaded connection, or snapping off a barb fitting while trying to install or remove tubing. Additionally, use of a KF style clamp may have advantages over embodiments that include machined threads in an additive manufacturing application (e.g., the 3D printed material of the remaining portions of the low-gravity water separator 1400), in which threads could create micro cracks that may propagate to complete failure under the vibrations present in some types of environments (e.g., launch of a spacecraft).

Referring to FIG. 20, air flowing into the low-gravity water separator 1400 through the inlet opening 1412 may pass into the helical channel between surfaces 1480, 1482 of the helix structure 1410 and the inner surface 1432 of the elongated tube 1406 along the length of the elongated tube 1406. At the bottom or distal end of the helix structure 1410, the air flow in the helical channel is divided into first and second air flows that are directed along first and second flow paths 1500, 1502. The first flow path 1500 passes from the helical channel into the inlet opening 1488 of the interior cylinder 1486. A significant portion of the air flow that enters into the inlet opening 1412 is typically directed into the first flow path 1500 due to the size, shape and orientation of the inlet opening 1488 provided by the interior cylinder 1486. The remainder of the air flow passes into the second flow path 1502: first into the inner reservoir 1440 and then through the reservoir outlet segment 1442 into the reservoir chamber 1446 and through the reservoir return segments 1454, 1456, 1458 back into the outlet structure 1404 downstream of the interior cylinder 1486. The air flows through first and second flow paths 1500, 1502 recombine at the outlet opening 1418 provided by the outlet structure 1404.

The splitting of the air flow passing through the helical channel into the first and second flow paths 1500, 1502 may be referred to as a split air flow path or the creation of parallel air flow paths. The splitting or providing of parallel air flow paths may allow air velocity over the collected water within the reservoir chamber 1446 to be locally reduced without the need to expand the flow area of the entire low-gravity water separator 1400. Expanding the flow area of the entire device may not be feasible in some scenarios due to volume constraints for the size of the entire low-gravity water separator 1400.

FIGS. 31-37 illustrate another example low-gravity water separator 3100. The low-gravity water separator 3100 may incorporate similar features as the low-gravity water separators 102, 200, 600, 1400 discussed above with reference to FIGS. 1-30. The low-gravity water separator 3100 may include various features to help stabilize the collected water within a reservoir portion of the device so that the amount of water that is drawn out of the device with the exiting air flow is minimized. For example, the low-gravity water separator 3100 may include unique water reservoir features (e.g., shape, size, and location), a helix structure shape and orientation, and air flow paths that provide stabilizing forces for the collected water. Other unique aspects of the low-gravity water separator 3100 relate to, for example, how various components of the device are assembled together during manufacturing, how airflow is controlled internal the device, and how collected water is directed into and stabilized within the water reservoir.

Figure 36:
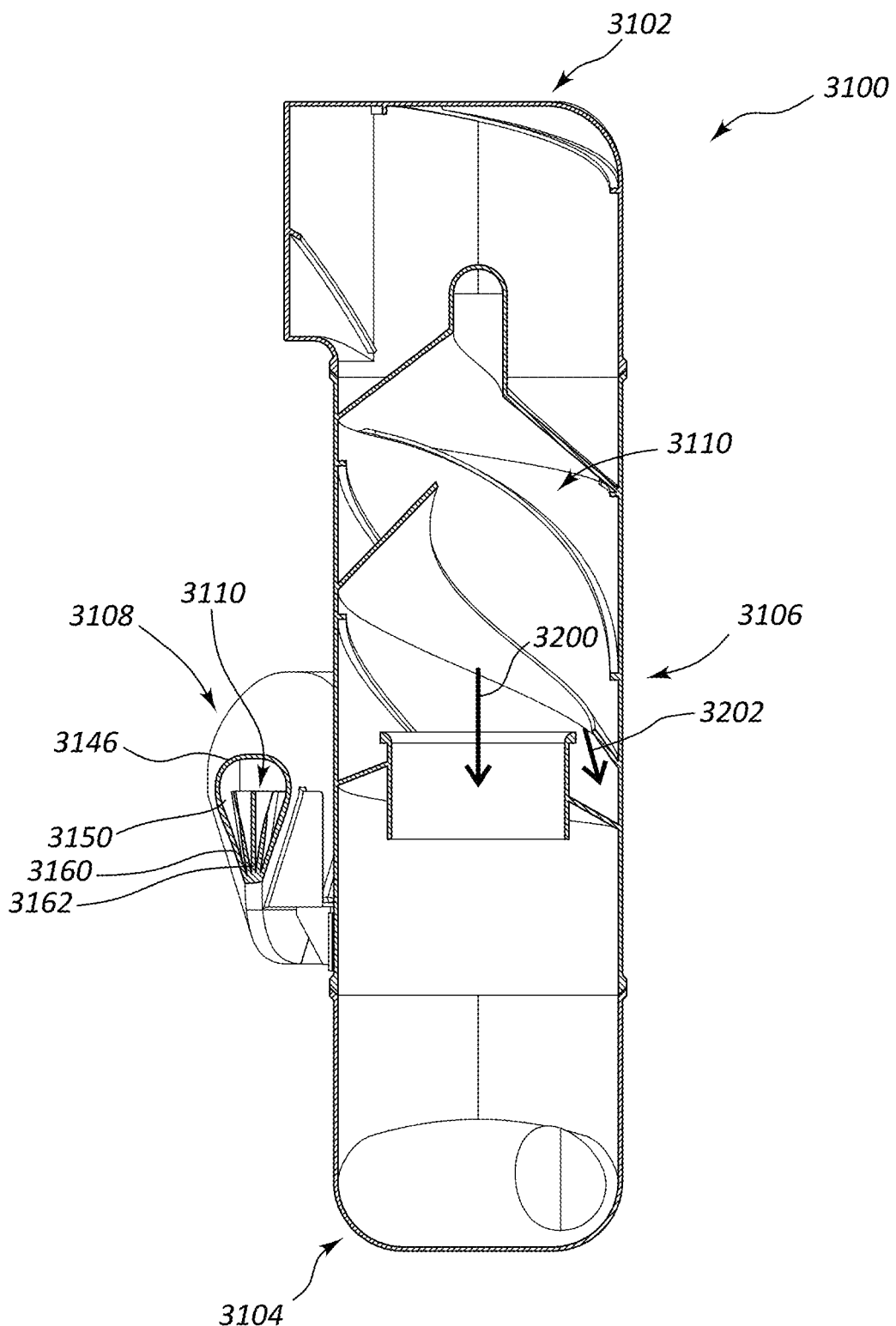
FIG. 36 is a cross-sectional view of the exemplary low-gravity water capture device of FIG. 35 taken along lines 36-36.

Referring to FIGS. 31-37, the low-gravity water separator 3100 includes an inlet structure 3102, an outlet structure 3104, an elongated tube 3106, a reservoir assembly 3108, and a helix structure 3110 (see FIG. 36). The inlet structure 3102 is mounted at one end of the elongated tube 3106, and the outlet structure 3104 is mounted to an opposite end of the elongated tube 3106.

Figure 37:
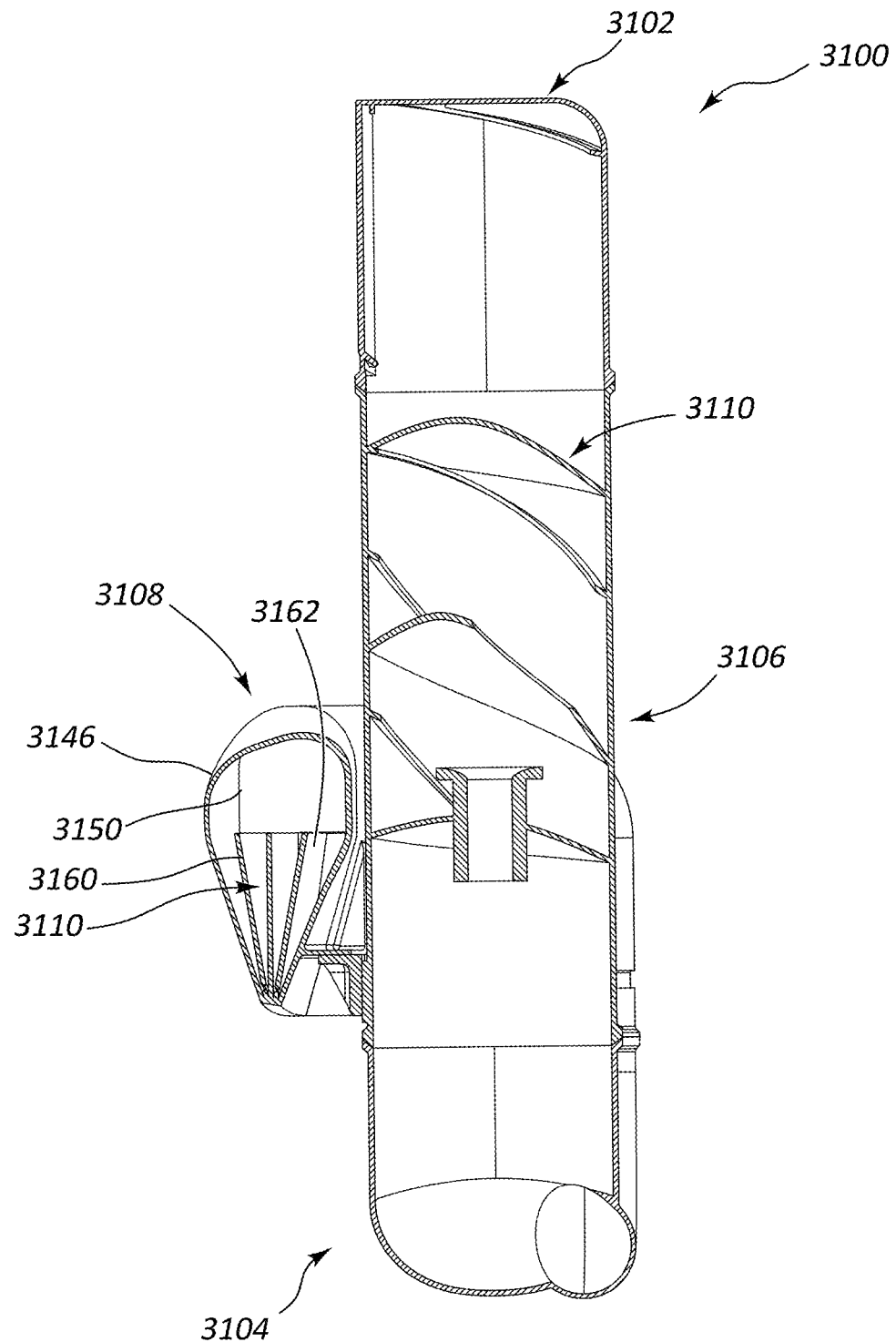
FIG. 37 is a cross-sectional view of the exemplary low-gravity water capture device of FIG. 35 taken along lines 37-37.

A plurality of additional vanes 3160, 3162 may be positioned within the reservoir chamber 3146 as shown in FIGS. 36 and 37. Vias may be formed in the vanes 3160, 3162 and the portion of the helix structure 3110 positioned within the reservoir chamber 3146 (e.g., the vias 1464 shown in FIGS. 27A and 27B). The offset vias may be spaced apart from a water outlet 3152. The water outlet 3152 may be positioned at an opposite end of the reservoir chamber 3146 as compared to the location of the water outlet 1452 of the separator 1400 shown in FIGS. 14-30. The size, shape and orientation of the vanes 3160, 3162 and helix structure 3110 within the reservoir assembly 3108 are comparable to the vanes 1460, 1462 and helix structure 1410 shown in, for example, FIGS. 21 and 22.

The low-gravity water separator 3100 may have only two revolutions of helix surface for the helix structure 3110. The two revolutions may be distinct from other designs such as the low-gravity water separators 102, 200, 600, 1400 discussed above with reference to FIGS. 1-30 for at least the reason that they have three full revolutions of helix surface for their respective helix structures.

The low-gravity water separator 3100 may also have a configuration for the reservoir chamber 3146 that is different from reservoir 1446 described above, specifically related to the size, shape and orientation of vanes 3160, 3162. low-gravity water separator 1400 may have a single vane that provides a continuation of the helix structure 1410 with a pair of vanes 1460, 1462 positioned to a side of the continuous helix structure 1410. With the design of low-gravity water separator 1400, the only way for water to access the areas between the two side vanes 1460, 1462 is through the vias 1464. In the low-gravity water separator 3100, a vane in the reservoir 3164 is also a continuation of the helix structure 1410, but the other two vanes 3160, 3162 extend upward from a vertex formed on either side of the continuous helix structure 1410 within the reservoir chamber 3146.

The vanes 3160, 3162 may grow from the vertex formed on either side of the helix 3110, thereby bifurcating the rivulet in each vertex to evenly divide the flow across the separate channels between the vanes 3160, 3162 and helix structure 3110. Furthermore, the vanes extending out from the vertex provides a sudden decrease in the interior angle of the capillary corner. This design helps pin water within the reservoir where the angle is smallest, and prevent water from wicking from the reservoir back up toward the elongated tube 3106, particularly in the event that airflow is interrupted.

Additionally, the reservoir chamber 3146 does not employ a significant depth change that creates boundary layer separation as in the reservoir chamber 1446 described above, and thus the water outlet 3152 is positioned as far downstream as practical.

Figure 38:
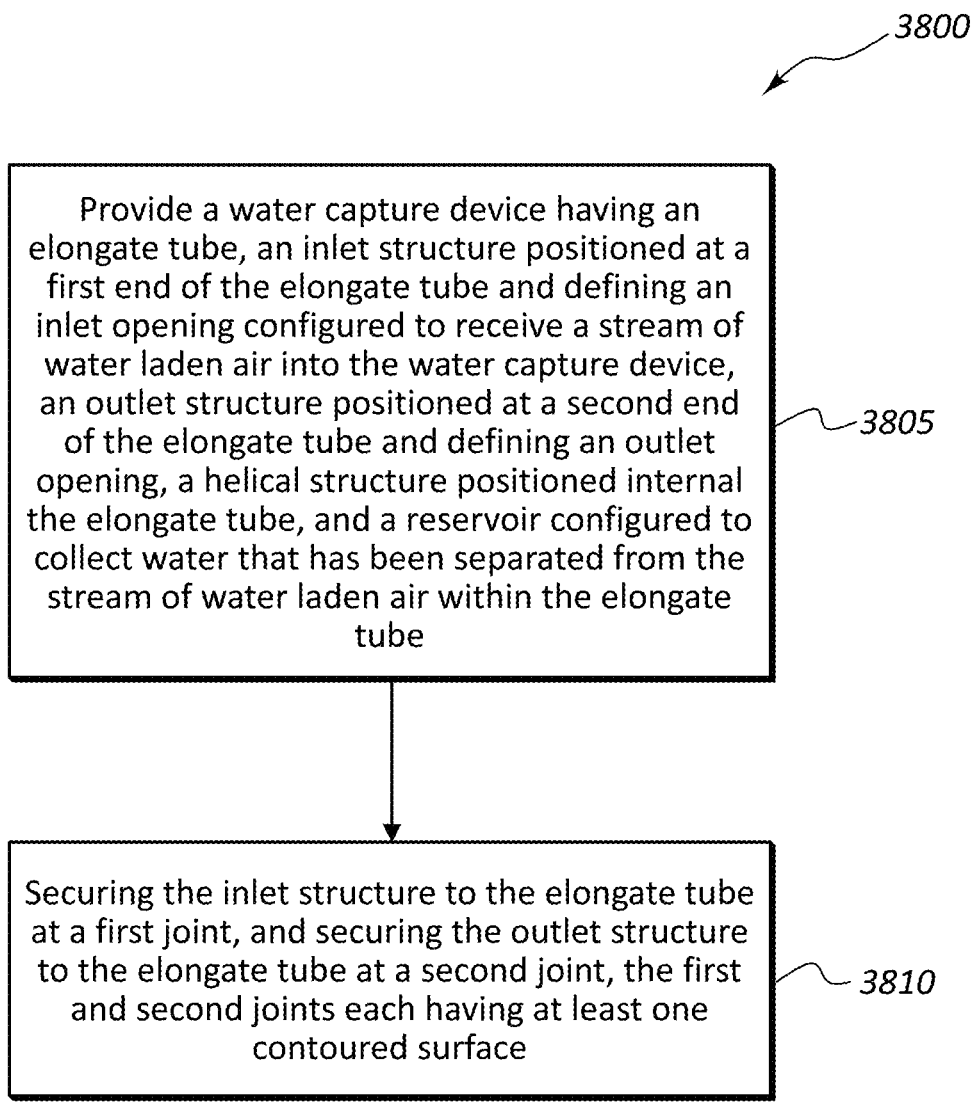
FIG. 38 is a flow diagram illustrating an example method relating to low-gravity water capture devices.

Referring to FIG. 38, an example method 3800 related to assembly or manufacture of a low-gravity water separator is shown and described. The method 3800 may include, at block 3805, the step of providing a water capture device having an elongated tube, an inlet structure position of the first end of the elongated tube and defining an inlet opening configured to receive a stream of water-laden air into the water capture device, an outlet structure positioned at the second end of the elongated tube and defining an outlet opening, a helical structure positioned internal the elongated tube, and a reservoir configured to collect water that has been separated from the stream of water-laden air within the elongated tube.

At block 3810, the method 3800 may include securing the inlet structure to the elongated tube at a first joint, and securing the outlet structure to the elongated tube at a second joint, wherein in the first and second joints each have at least one contoured surface. The contoured surface may include a spherical portion, a hemispherical portion or an arc portion. The method may include forming the elongated tube, inlet structure and/or the outlet structure using 3D printing or other additive manufacturing process. The water capture device may further include first and second air flow paths coupled inflow communication with the outlet opening, the second air flow path being defined at least in part by the first and second tube segments, the method including securing the first and second tube segments together with a slip joint. The water-capture device may further include at least one vane positioned in the reservoir, and the first and second tube segments may be adjustable relative to each other and relative to the elongated tube to align at least one vane with the helical structure. The water-capture device may further include first and second air flow paths coupled in flow communication with the outlet opening, the second air flow path including an orifice, the method including adjusting the size of the orifice to control a rate of air flow through the second air flow path. The first and second joints may be formed in part by applying uncured base material resin to the contoured surfaces, and then curing the resin, such as by using ultraviolet (UV) light.

Figure 39:
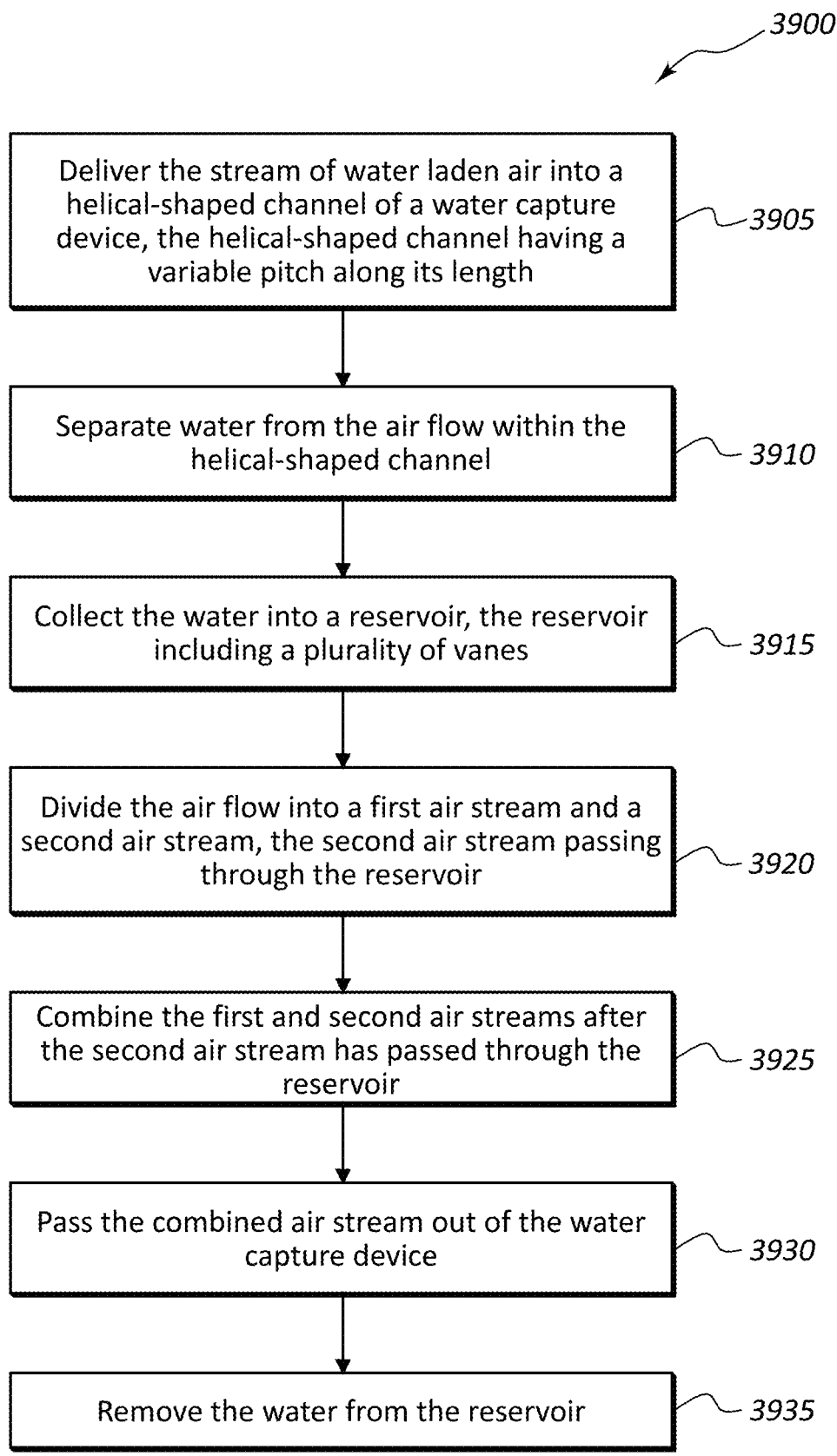
FIG. 39 is a flow diagram illustrating another example method relating to low-gravity water capture devices.

FIG. 39 illustrates an example method 3900 of separating water from a stream of water-laden air. The method 3900 may include, at block 3905, a step of delivering the stream of water-laden air into a helical-shaped channel of a water capture device, the helical-shaped channel having a variable pitch along its length. Block 3910 may include separating water from the air flow within the helical-shape channel. Block 3915 may include collecting the water into a reservoir, the reservoir including a plurality of vanes. Block 3920 includes dividing the air flow into a first air stream and a second air stream, the second air stream passing through the reservoir. Block 3925 includes combing the first and second air streams after the second air stream has passed through the reservoir. The method 3900 includes, at block 3930, passing the combined air streams out of the water-capture device. Block 3935 includes removing the water from the reservoir.

The method 3900 may also include separating water droplets from the air flow by contacting the air flow against one or more surfaces of the helical-shaped channel, and collecting the separated water droplets from the one or more surfaces of the helical-shaped channel in the reservoir. The method may include stabilizing the water within the reservoir using the second air stream. The water capture device may include a helical structure that defines in part the helical-shaped channel, the helical structure extending continuously into the reservoir. The water capture device may include an elongated tube housing the helical-shaped channel, and a portion of the reservoir extends outside of the elongated tube, the portion of the reservoir defining an air channel through which the second air stream passes out of the elongated tube at a tangential angle. Delivering the stream of water laden air into the helical-shaped channel may include delivering the stream of water laden air at a tangential angle relative to a longitudinal axis of the water capture device Any other methods related to manufacturing, assembly, operating and adjusting a low-gravity water separator may be carried out using the various embodiments and functionality disclosed herein. The example methods of FIGS. 38 and 39 are exemplary only and may include more or fewer steps in other embodiments.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. An apparatus to separate liquid droplets from a gas stream, the apparatus comprising:
an elongated outer housing comprising an inlet opening of the elongated outer housing, and an outlet opening of the elongated housing, wherein the inlet opening is arranged to accept the gas stream;
wherein the inlet opening feeds the gas stream into a channel that includes a helix structure, the helix structure comprising a variable pitch and variable interior corner angle configured to separate liquid from the gas stream;
and wherein the channel feeds the gas stream into a first flow path and a second flow path structurally separated from the first flow path, and wherein liquid separated from the gas stream flows into the second flow path;
and wherein the first flow path and the second flow path merge at the second end of the housing, wherein the second flow path includes vanes positioned in a reservoir, and wherein the vanes are configured to direct liquid droplets collected on surfaces of the helix structure.

2. The apparatus of claim 1, wherein the reservoir collects liquid separated from the gas stream.

3. The apparatus of claim 2, wherein the reservoir includes an inlet portion having a first cross-sectional area, and a collection portion having a second cross-sectional area that is greater than the first cross-sectional area.

4. The apparatus of claim 1, wherein the helix structure extends into the second flow path.

5. The apparatus of claim 4, wherein the helix structure extends into the reservoir.

6. The apparatus of claim 1, wherein the second flow path includes vanes positioned in the reservoir and configured to direct liquid droplets collected on surfaces of the helix structure.

7. The apparatus of claim 1, wherein the helix structure at least partially defines a variable interior corner angle configured to separate liquid from the gas stream.

8. The apparatus of claim 1, wherein the apparatus includes at least one vane that guides the liquid droplets from the gas stream to the helix structure.

9. The apparatus of claim 1, wherein the outer housing is cylindrical.

10. The apparatus of claim 1, wherein the inlet opening is at a first end of the elongated outer housing.

11. The apparatus of claim 1, wherein the outlet opening is at a second end of the elongated outer housing.

12. An apparatus to separate liquid droplets from a gas stream, the apparatus comprising:
an elongated outer housing comprising an inlet opening of the elongated outer housing, and an outlet opening of the elongated housing, wherein the inlet opening is arranged to accept the gas stream;
wherein the inlet opening feeds the gas stream into a channel that includes a helix structure, the helix structure comprising a variable pitch and variable interior corner angle configured to separate liquid from the gas stream;
and wherein the channel feeds the gas stream into a first flow path and a second flow path structurally separated from the first flow path, and wherein liquid separated from the gas stream flows into the second flow path;
and wherein the first flow path and the second flow path merge at the second end of the housing, wherein the second flow path includes a reservoir that collects liquid separated from the gas stream and wherein the helix structure extends into the second flow path and the reservoir.

13. The apparatus of claim 12, wherein the second flow path is at least partially external to the outer housing.

14. The apparatus of claim 12, wherein the second flow path includes vanes positioned in the reservoir and configured to direct liquid droplets collected on surfaces of the helix structure.

15. The apparatus of claim 12, wherein the helix structure at least partially defines a variable interior corner angle configured to separate liquid from the gas stream.

16. The apparatus of claim 12, wherein the reservoir includes an inlet portion having a first cross-sectional area, and a collection portion having a second cross-sectional area that is greater than the first cross-sectional area.

17. The apparatus of claim 12, wherein the apparatus includes at least one vane that guides the liquid droplets from the gas stream to the helix structure.

18. The apparatus of claim 12, wherein the outer housing is cylindrical.

19. The apparatus of claim 12, wherein the inlet opening is at a first end of the elongated outer housing.

20. The apparatus of claim 12, wherein the outlet opening is at a second end of the elongated outer housing.

* * * * *